(12) United States Patent
Macvittie et al.

(10) Patent No.: US 12,066,553 B2
(45) Date of Patent: Aug. 20, 2024

(54) OBJECT LOCATION USING OFFSET

(71) Applicants: Kevin Macvittie, Austin, TX (US); John S. McNeely, Sackets Harbor, NY (US); George S. Smith, II, Sackets Harbor, NY (US); Brian Kausler, Island City, OR (US)

(72) Inventors: Kevin Macvittie, Austin, TX (US); John S. McNeely, Sackets Harbor, NY (US); George S. Smith, II, Sackets Harbor, NY (US); Brian Kausler, Island City, OR (US)

( * ) Notice: Subject to any disclaimer, the term of this patent is extended or adjusted under 35 U.S.C. 154(b) by 0 days.

(21) Appl. No.: 18/122,452

(22) Filed: Mar. 16, 2023

(65) Prior Publication Data

US 2023/0221447 A1 Jul. 13, 2023

Related U.S. Application Data

(63) Continuation of application No. 17/566,854, filed on Dec. 31, 2021, now Pat. No. 11,635,526, which is a
(Continued)

(51) Int. Cl.
*G01S 19/26* (2010.01)
*E01C 23/08* (2006.01)
*E01C 23/16* (2006.01)
*E01C 23/18* (2006.01)
*E01C 23/22* (2006.01)
(Continued)

(52) U.S. Cl.
CPC ............ *G01S 19/26* (2013.01); *E01C 23/163* (2013.01); *G01S 19/51* (2013.01); *G01V 3/08* (2013.01); *G06T 7/70* (2017.01); *E01C 23/08* (2013.01); *E01C 23/18* (2013.01); *E01C 23/22* (2013.01); *E01F 9/524* (2016.02); *E01F 9/576* (2016.02); *E01H 3/02* (2013.01); *G01C 15/002* (2013.01);
(Continued)

(58) Field of Classification Search
CPC .......... G01S 19/26; G01S 19/51; G01S 19/49; G01S 19/14; G01S 19/485; E01C 23/163; E01C 23/08; E01C 23/18; E01C 23/22; E01C 23/01; G01V 3/08; G06T 7/70; G06T 2207/30241; G06T 2207/30256; E01F 9/524; E01F 9/576; E01F 9/518; E01H 3/02; G01C 15/002; G01C 21/28; G01C 7/04
USPC .................................................. 324/323–375
See application file for complete search history.

(56) References Cited

U.S. PATENT DOCUMENTS

2005/0286973 A1* 12/2005 Silay ..................... E01C 23/088
404/84.1
2011/0259114 A1* 10/2011 Ullidtz ..................... G01C 7/04
73/784
(Continued)

*Primary Examiner* — Raul J Rios Russo
(74) *Attorney, Agent, or Firm* — The Bilicki Law Firm, PC; James A. Cairns

(57) ABSTRACT

An apparatus for locating an object of interest using offset. The object may be a mobile platform, or portion of same, associated with a vehicle, or a pavement segment or feature of or on a pavement segment on which the mobile platform is located. The vehicle includes first and second fixed points having a known offset from each other. An image sensor whose field of view includes the second fixed point and a segment of the pavement surface provides image data which is used with the known offset to calculate the precise location of the object of interest.

21 Claims, 30 Drawing Sheets

Related U.S. Application Data continuation-in-part of application No. 17/338,105, filed on Jun. 3, 2021, now Pat. No. 11,640,008, which is a continuation of application No. 16/752,809, filed on Jan. 27, 2020, now Pat. No. 11,054,538.

(51) Int. Cl.
| | | |
|---|---|---|
| *E01F 9/524* | (2016.01) | |
| *E01F 9/576* | (2016.01) | |
| *E01H 3/02* | (2006.01) | |
| *G01C 15/00* | (2006.01) | |
| *G01S 19/51* | (2010.01) | |
| *G01V 3/08* | (2006.01) | |
| *G06T 7/70* | (2017.01) | |

(52) U.S. Cl.
CPC .............. *G06T 2207/30241* (2013.01); *G06T 2207/30256* (2013.01)

(56) References Cited

U.S. PATENT DOCUMENTS

| | | | |
|---|---|---|---|
| 2013/0076871 A1* | 3/2013 | Reeves | G01B 11/2545 348/50 |
| 2017/0044728 A1* | 2/2017 | Mennink | G01B 17/08 |
| 2017/0213084 A1* | 7/2017 | Akselrod | G06T 7/0006 |
| 2020/0116484 A1* | 4/2020 | Agouridis | G01S 17/88 |

* cited by examiner

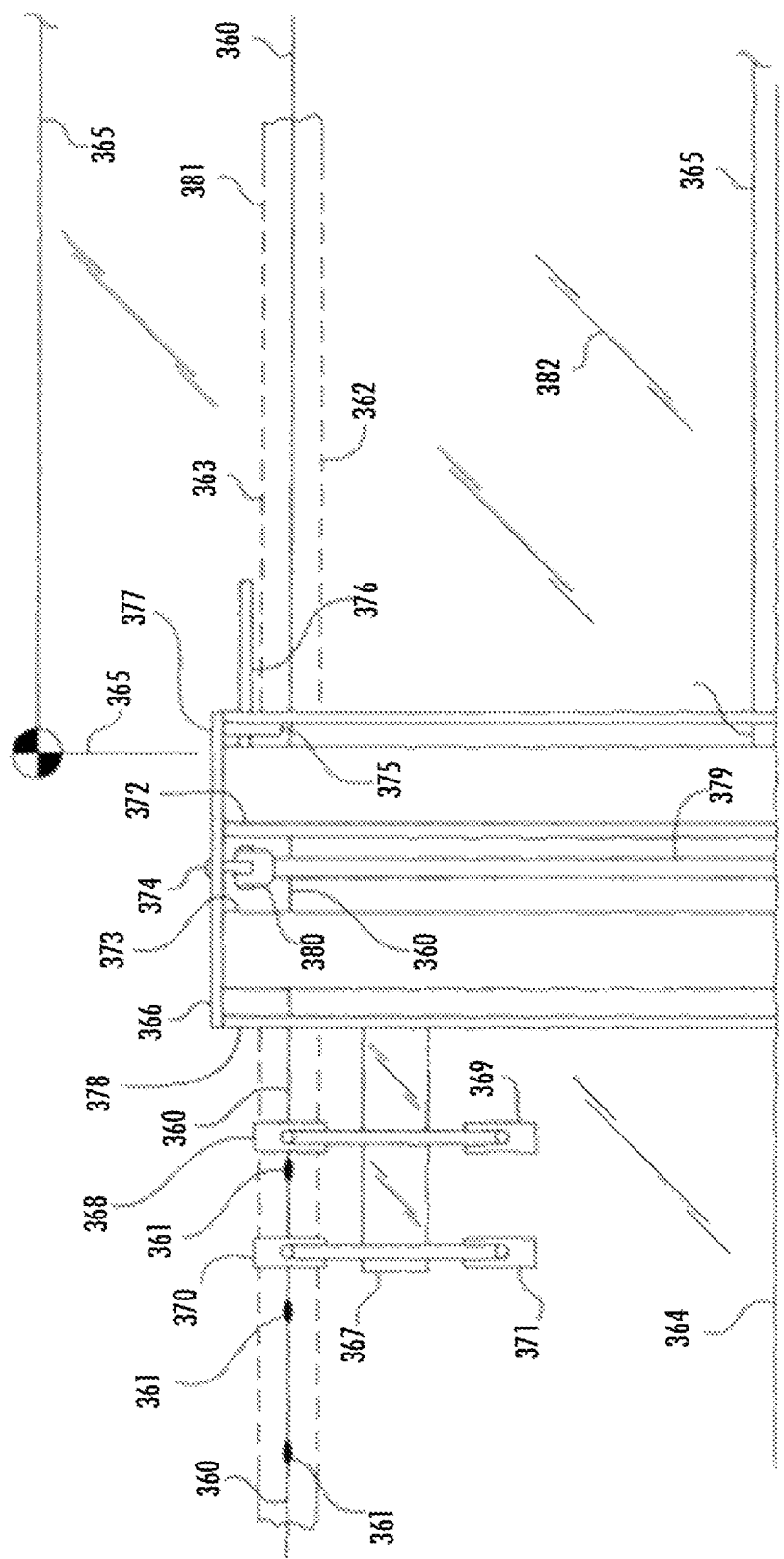

OBJECT LOCATION USING OFFSET

RELATED APPLICATIONS

This application is a continuation of U.S. application Ser. No. 17/566,854, filed on Dec. 31, 2021, which is a continuation-in-part of U.S. application Ser. No. 17/338,105, filed on Jun. 3, 2021, entitled "Modification and Assessment" which is a continuation of U.S. application Ser. No. 16/752,809, filed on Jan. 27, 2020, entitled "Modification and Assessment", now issued as U.S. Pat. No. 11,054,538 on Jul. 6, 2021.

BACKGROUND

In general terms, modification and assessment of pavement may include at least three functions; assessing, marking, and removing. Assessing includes obtaining a representation of the current state of a pavement area, and may relate to, for example, whether paint and/or reflective beads are present or absent on a portion of a pavement surface; the condition of paint and/or reflective beads on a pavement surface; the retro-reflectivity of a pavement area; the presence or absence of pavement surface contaminants, such as rubber marks from vehicle wheels; the presence or absence of foreign object debris (FOD); the presence or absence of structural flaws in the pavement surface, such as cracks or potholes, and the presence, type, and status of elements ambient to pavement such as vegetation, landscaping, lighting, signage, and fences. Marking includes placing a marking material, such as paint and/or a reflective material such as glass beads, on the pavement surface. Removal includes removing contaminants from a pavement surface, such as rubber from vehicle wheels and/or foreign object debris, or unwanted markings.

For purposes of the present disclosure, "pavement" means any surface used or for use by vehicles, including but not limited to runways, roads of any type, and areas where vehicles may be parked or otherwise positioned when not in use; "airfield" means any area of land associated with an airport that includes a runway; and "runway" means any area of land associated with an airport that is intended for the landing, take-off, taxiing, or holding of aircraft.

Modification and assessment of pavement may involve use of a mobile platform associated with a vehicle. The mobile platform may be, for example, a pavement surface modification platform, and/or a data gathering platform. The mobile platform may be physically attached to and controlled by a vehicle, though it is also possible that a mobile platform may be associated with a different vehicle or may operate autonomously.

In using a mobile platform to assess, modify or gather data about a pavement surface, it is generally necessary to align the mobile platform, or a portion of the mobile platform, with the pavement surface, with a segment of the pavement surface, and/or with an object of interest that is on or related to the pavement surface.

BRIEF DESCRIPTION OF DRAWINGS

FIG. 30 is an expanded top view of an extended paint carriage and virtual roadway mark and roadway mark path showing visible indicia, having the paint and bead dispensing nozzles aligned with the virtual roadway mark and dispensing visible guide indicia;

SUMMARY

Figure 1:
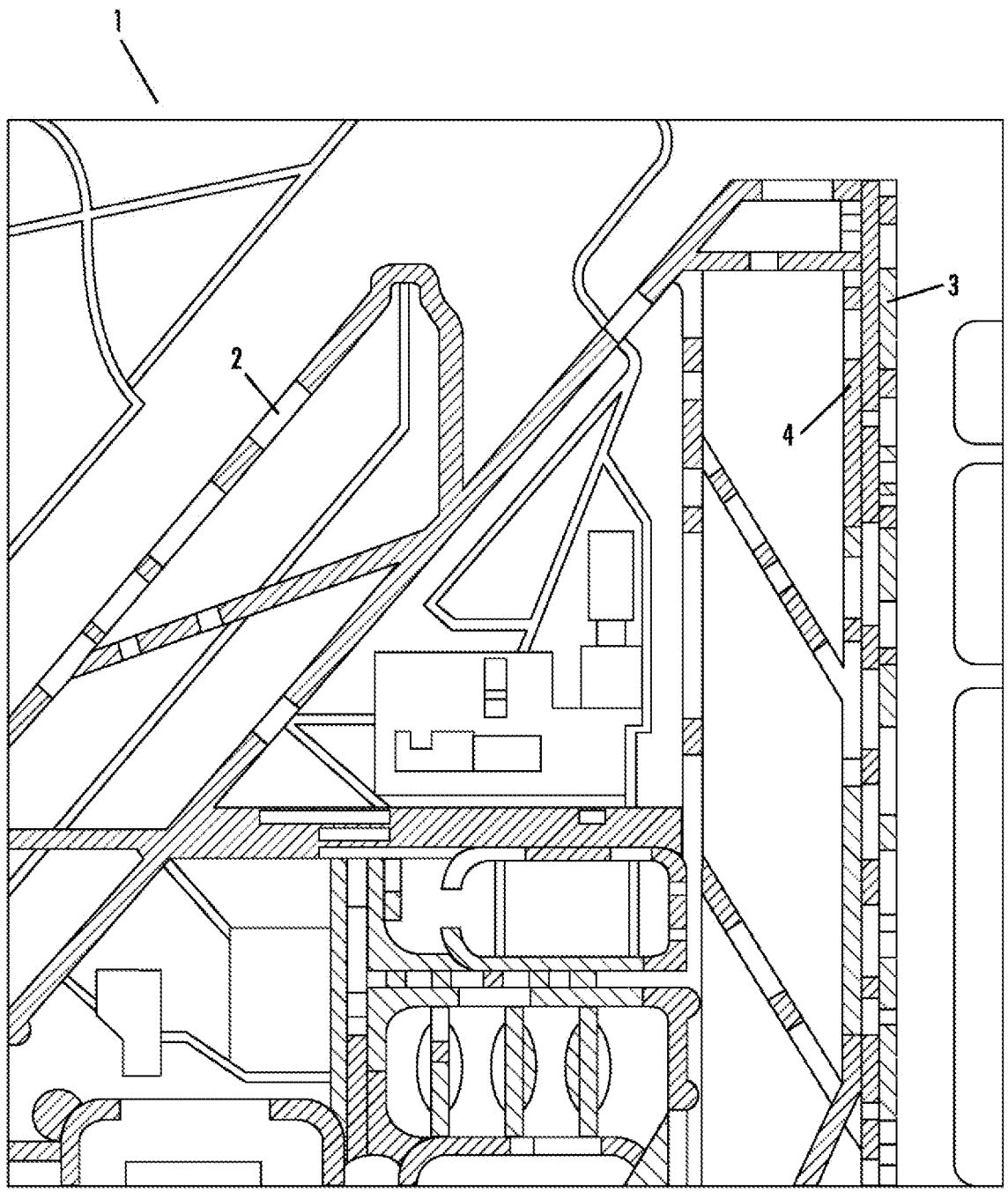
FIG. 1 is a depiction of an airfield, including a runway layout.

In one embodiment the present disclosure is directed to an apparatus for determining the location of a segment of a pavement surface. The apparatus includes a vehicle; a first mobile platform located on a first pavement surface and adjacent to the vehicle; at least a first position sensor, a second position sensor, and a first image sensor located on the vehicle; a data collection system configured to receive first location data from the first position sensor and the second position sensor; a processor configured to calculate, from the first location data, a first location representing a first fixed point on the vehicle; a data collection system configured to receive first image data from the first image sensor, the first image sensor having a field of view that includes (i) a second fixed point which has a first known offset from the first fixed point, and (ii) a segment of the first pavement surface; and, a processor configured to calculate the location of the segment of the first pavement surface using the first location, the first known offset, and the first image data. The second fixed point may be on the vehicle.

The first position sensor may be a Global Navigation Satellite System (GNSS) module, and the second position sensor may be a GNSS module, real-time kinetic system, inertial measurement unit, inertial navigation system, total station system, accelerometer, or gyroscope. The apparatus may include a transmitter operable to transmit the location of the first portion of the first mobile platform to non-transitory computer-readable storage media. The first fixed point may be located on the longitudinal midline of the vehicle, and the second fixed point may be located on an edge of the vehicle.

The present apparatus may include a second mobile platform located on a second pavement surface and adjacent to the vehicle; a second image sensor located on the vehicle and having a field of view that includes (i) a third fixed point on the vehicle which has a second known offset from at least one of the first fixed point and the second fixed point, and (ii) a segment of the second pavement surface; a data collection system configured to receive second image data from the second image sensor; and, a processor configured to calculate the location of the segment of the second pavement surface using the first location, the second known offset, and the second image data.

The first mobile platform may be a pavement surface modification platform which is attached to the vehicle. The first portion of the first mobile platform may be a pavement surface modification module. The pavement surface modification module may be operable to perform at least one of (i) placing paint on a pavement surface, (ii) placing reflective beads on a pavement surface, (iii) placing chemical cleaner on a pavement surface, and (iv) abrading a pavement surface. The second mobile platform may be pavement segment alignment module which is attached to the vehicle. The first mobile platform and the second mobile platform may be located on opposite sides of the vehicle.

In another embodiment the present disclosure is directed to an apparatus for aligning a mobile platform attached to a vehicle with an object of interest. The apparatus includes a vehicle; a first mobile platform adjacent to the vehicle; a first image sensor located on the vehicle whose field of view includes (i) at least a first portion of the first mobile platform, and (ii) an object of interest located externally to both the vehicle and the first mobile platform; a first data collection system configured to receive first image data from the first image sensor; a processor configured to calculate, from the first image data, the actual location of the object of interest in relation to the first portion of the first mobile platform; a processor configured to compare the actual location of the object of interest in relation to the first portion of the first mobile platform to a desired location of the object of interest in relation to the first portion of the first mobile platform, and to calculate the difference between the actual location and the desired location; and a control system configured, if the difference between the actual location and the desired location exceeds a predetermined threshold, to adjust the position of at least one of the vehicle and the first mobile platform to decrease the difference between the actual location and the desired location until that difference is equal to or less than the predetermined threshold.

The apparatus may include a feedback control loop connected to a navigation system of the vehicle and/or the first mobile platform, which is operable to adjust the position of the vehicle and/or the first mobile platform to decrease the difference between the actual location and the desired location. The desired location may be represented by predetermined GNSS coordinates. The first mobile platform may be attached to the vehicle; located on a pavement surface; and include a pavement surface modification module which is operable to perform at least one of (i) placing paint on the pavement surface, (ii) placing reflective beads on the pavement surface, (iii) placing chemical cleaner on the pavement surface, and (iv) abrading the pavement surface, and the object of interest may be a segment of the pavement surface.

The object of interest may be a pavement segment, and the apparatus may include a processor configured to use the actual location of the pavement segment to calculate, using non-Euclidean geometry, a polynomial representation of a trajectory that can be used by a connected and autonomous vehicle in navigating the pavement segment.

In yet another embodiment the present disclosure is directed to an apparatus for determining the location of at least a selected portion of a mobile platform adjacent to a vehicle, and includes a vehicle; a mobile platform adjacent to the vehicle; at least a first position sensor located on the vehicle; a data collection system configured to receive first location data transmitted wirelessly from the first position sensor; at least a second position sensor located on the mobile platform and having a first known offset from a first selected portion of the mobile platform; a data collection system configured to receive second location data transmitted wirelessly from the second position sensor; and a processor configured to determine the location of the first selected portion of the mobile platform using the first location data, the second location data, and the first known offset.

The first position sensor may be a Global Navigation Satellite System (GNSS) module and the second position sensor may be a (GNSS) module, real-time kinetic system, inertial measurement unit, inertial navigation system, total station system, accelerometer, or gyroscope.

The mobile platform may be attached to the vehicle and include a pavement surface modification module operable to perform at least one of (i) placing paint on a pavement surface, (ii) placing reflective beads on a pavement surface, (iii) placing chemical cleaner on a pavement surface, and (iv) abrading a pavement surface. The pavement surface modification module may include a material dispensing nozzle operable to perform at least one of (i) placing paint on the pavement surface, (ii) placing reflective beads on the pavement surface, (iii) placing water on the pavement surface, and (iv) placing chemical cleaner on the pavement surface, and the first selected portion of the mobile platform may be the material dispensing nozzle.

The first selected portion of the mobile platform may be a pavement segment alignment module located on a pavement surface, and the apparatus may include a processor configured to calculate a location of a pavement segment of the pavement surface using the location of the pavement segment alignment module; a processor configured to use the location of the pavement segment to calculate, using non-Euclidean geometry, a polynomial representation of a trajectory that can be used by a connected and autonomous vehicle in navigating the pavement segment; and, a transmitter to transmit at least one of the location of the pavement segment and the polynomial representation of a navigation trajectory to non-transitory computer-readable storage media.

DETAILED DESCRIPTION

In general, the lifecycle of pavement markings may be divided into phases. One phase is the placement of markings on pavement, as by a paint truck or line striper. Another phase is the assessment of a pavement surface, such as to determine the amount, retro-reflectivity, or other condition of markings or of the pavement surface. Another phase is maintenance, where markings are cleaned or modified to extend their lifespan. And another phase is the removal of markings, which may be to prepare for the placement of fresh markings, or because certain markings are no longer desired in their current location. The present description is directed to processes for effecting the marking, assessment, and/or modification of pavement and of environments ambient to pavement.

Pavement modification and assessment equipment may incorporate a number of components configured to perform a desired function including, for example painting, assessing surface markings, removing surface markings, assessing pavement contamination, removing pavement contamination, and assessing retro-reflectivity. Such components may be present in the form of an assessment module, a painting module, and/or a removal module. Each module may itself incorporate and/or be operably connected to a number of components, including a primary controller configured to control a desired function. These modules and/or components may be mounted onto a vehicle or, for components whose physical presence at the location where the function is being performed is not necessary, may be located remotely.

The present description may use terms such as "placing", "directing", "discharging", and "ejecting" materials on, to, or in the direction of a pavement surface to avoid any narrow or specific connotation to "spraying". As used herein, all such terms refer to the action of causing a material to come into contact with the pavement surface in a manner that accomplishes the function for which those materials are intended, such as marking or removal.

It is understood that the action of marking a pavement surface is often referred to as "striping"; for clarity, for purposes of the present application "striping" refers to any marking placed on a pavement surface, regardless of whether the resulting mark may be considered a "stripe". For example, a runway holding position sign may involve a painted area that is several feet on each side, but its placement may be considered as constituting a "striping".

The performance of pavement modification and assessment may be accomplished using a mobile platform capable of being positioned onto pavement, moved to a location on pavement, and removed from pavement. As used herein, a "mobile platform" is an apparatus whose design includes the ability to move or be moved by a motive force, which may be provided by an internal combustion, diesel, or electric motor or engine; by hydraulic or pneumatic mechanisms; by air propulsion such as that provided by a propeller, fan, or rotor; or by any other appropriate mechanism; and, which has the capability to assess and/or modify a pavement surface. A mobile platform may be associated with a vehicle, such as a paint module or carriage associated with a paint truck, an assessment module associated with a van, or a pressure-washing module associated with a truck, or may itself be a vehicle.

A mobile platform may be operated by local control, such as a human driver or operator walking adjacent to or riding on or in the mobile platform or associated vehicle, or may be operated by remote human control, or may operate autonomously, Common mobile platforms include walk-behind vehicles, ride-on vehicles, and ride-in vehicles such as vans and trucks. While use of airborne vehicles, such as drones, would be constrained at least by the need to maintain airspace safety, their use is included within the present scope.

Mobile platform components may include one or more of: an image sensor, retro-reflectometer, or other condition sensor to receive data indicative of a condition of a pavement surface and/or an ambient environment; a motor for controlling a paint carriage; an electronically controlled proportional hydraulic valve; a pressurized air control or other system for controlling the dispensing of materials including paint, reflective beads, water, or chemicals; a paint module position sensor for determining the position of a paint carriage, including "smart cylinder" technology; a speed sensor for determining the speed of the mobile platform and/or associated vehicle; a source of illumination for illuminating the pavement surface; a housing, shroud, or other suitable form of electromagnetic radiation shielding (which may be referred to herein as a "mobile light room") to reduce the effect of ambient electromagnetic radiation on the condition sensor; a laser for assisting with the alignment of a paint carriage and other tasks; a wireless transceiver for transmitting and/or receiving data (including software update data) to and from a local or remote computing platform, including a cloud computing platform; a drive shaft encoder or other means for determining an accurate distance and speed of a mobile platform; a synchronization system for synchronizing the images of a pavement mark with a location and/or time stamp; and other system components.

A mobile platform used for marking or removal may include certain basic components including a source of marking or removal material, such as paint and/or reflective beads, water, or chemicals; a source of motive force to move the marking or removal material from its source to the pavement surface; and one or more spray heads, jets, nozzles, or similar components through which the marking or removal material is directed towards the pavement surface. For convenience, all such components may be referred to herein as "spray heads".

When mounted on a vehicle, one or more spray heads may be provided on a boom, platform, carriage, or similar component that extends away from the vehicle to dispense material as the vehicle moves. The dispensing component may be on a lateral side of the vehicle, or carried in front of or behind the vehicle, to dispense material as the vehicle moves. Such a system can be configured to enable placement of a substantial volume of material on the pavement surface due to the carrying capacity of the vehicle, both in terms of the material to be applied and the sizes and capacities of the associated pumping, mixing, and dispensing or placing equipment.

More specifically, a mobile platform used for marking may include a gas or electric motor for generating pressure that is used to force a marking material, such as paint, reflective beads, or other fluids, from their source onto the pavement surface. The pressure may be provided by a pump which is fed a fluid material, such as paint, from a source, and then pumps the fluid to spray heads that are mounted and disposed so as to discharge the fluid toward the pavement surface. While paint may at times be used herein as an exemplar, it is understood that paint is merely one example of marking material and that other fluid materials, including reflective beads, thermoplastic, water, oil, solvents, chemicals, and the like can be applied in addition to or instead of paint. As used herein, "fluid" includes materials that may not be liquid but can be fluidized by the application of air, stirring, heating, or similar techniques.

Location information may be used in pavement modification and assessment to, for example, determine a starting or current position for a mobile platform, or how much a mobile platform moves in a given direction. Location information may be associated with other data gathered using the mobile platform, such as the location of a marking needing removal or replacement, of a contaminant or object needing removal, or of a portion of pavement surface, lighting, signage, or landscaping needing maintenance. In addition to the primary controller, other system components may therefore include one or more location systems such as a global positioning system (GPS), real-time kinetic (RTK) positioning system, inertial navigation systems (INS), or total station. These systems may provide location information for the proper positioning and operation of the pavement modification and assessment equipment, such as the location of pavement perimeters or areas; of markings that are to be placed or are currently in existence; and of contaminants or other issues that may require monitoring or treatment.

FIG. 1 provides an overview of airfield 1. Airfield 1 may include runway portions in various states. For example, runway portion 2 may represent a portion of runway for which there is no present need to perform or schedule modification, as indicated by its unstriped visual presentation. Runway portion 3 may represent a portion of runway for which there is a present need to schedule future modification, as indicated by its visual presentation of left-to-right downward diagonal lines. Runway portion 4 may represent a portion of runway for which there is a present need for modification, as indicated by its visual presentation of right-to-left downward diagonal lines.

While FIG. 1 represents an airfield area, the present application and its teachings also apply to the ambient airfield environment, including but not limited to landscaping, vegetation, signage, and fencing or other barriers.

Figure 2:
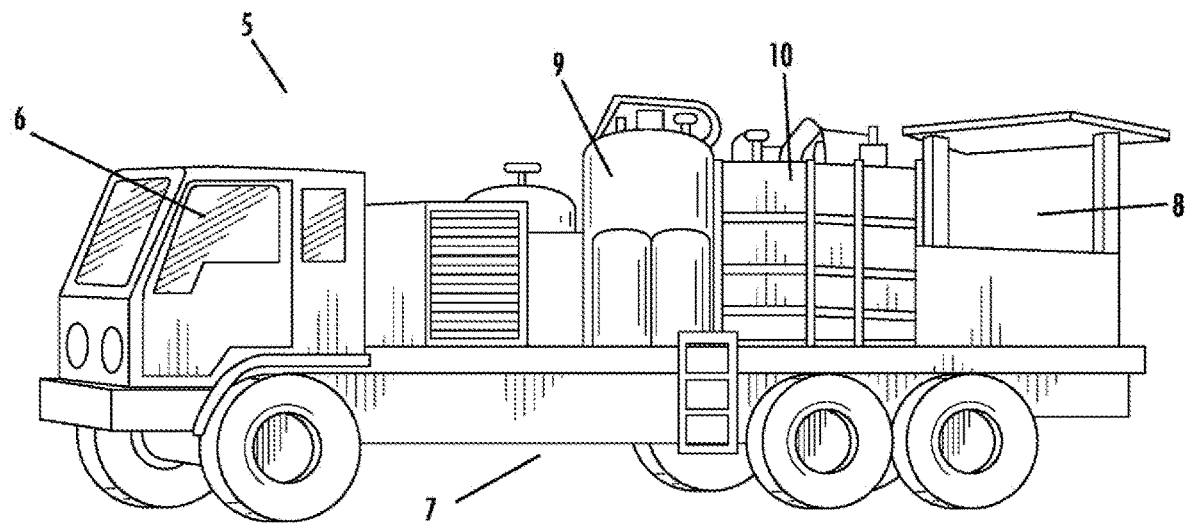
FIG. 2 is a depiction of a mobile platform for material marking.

FIG. 2 presents an embodiment of mobile platform 5 for marking, represented by a truck which includes driver cab 6 in front, main body 7, and operator cab or platform 8 in back. Main body 7 carries paint source 9 and reflective bead source 10, which are placed on the pavement using a paint carriage (not shown).

Figure 3:
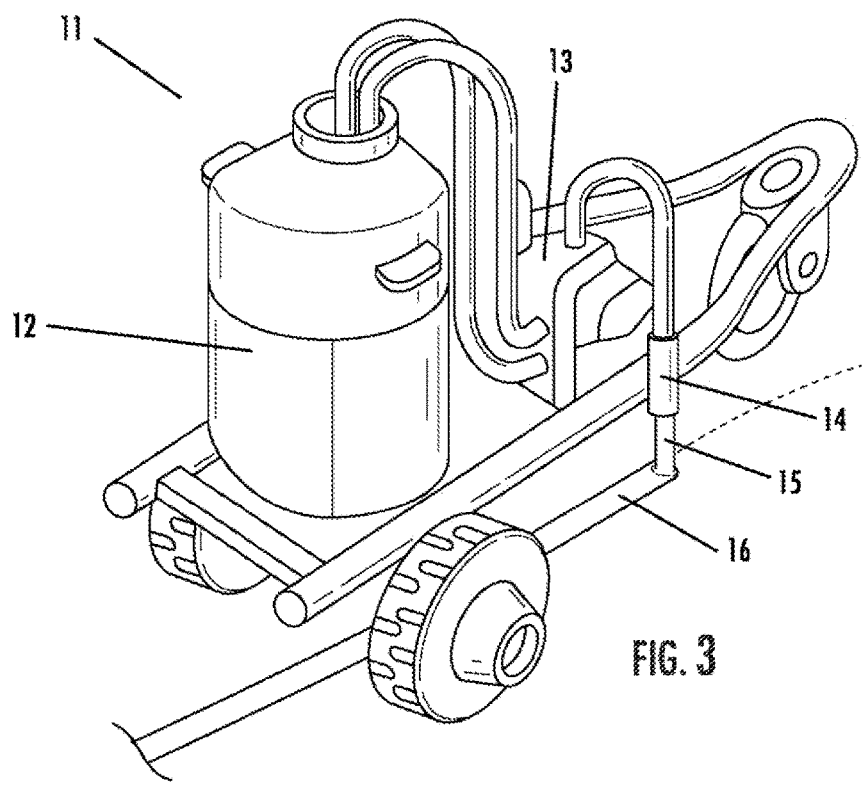
FIG. 3 is a depiction of an alternative mobile platform for material marking.

FIG. 3 presents an embodiment of mobile platform 11 for marking, represented by a self-propelled vehicle such as a walk-behind vehicle. Mobile platform 11 includes material source 12, which may for example be paint or reflective beads 15. Paint or reflective beads 15 are directed towards the pavement surface through spray head 14 using pump 13, to produce marking 16.

Figure 4:
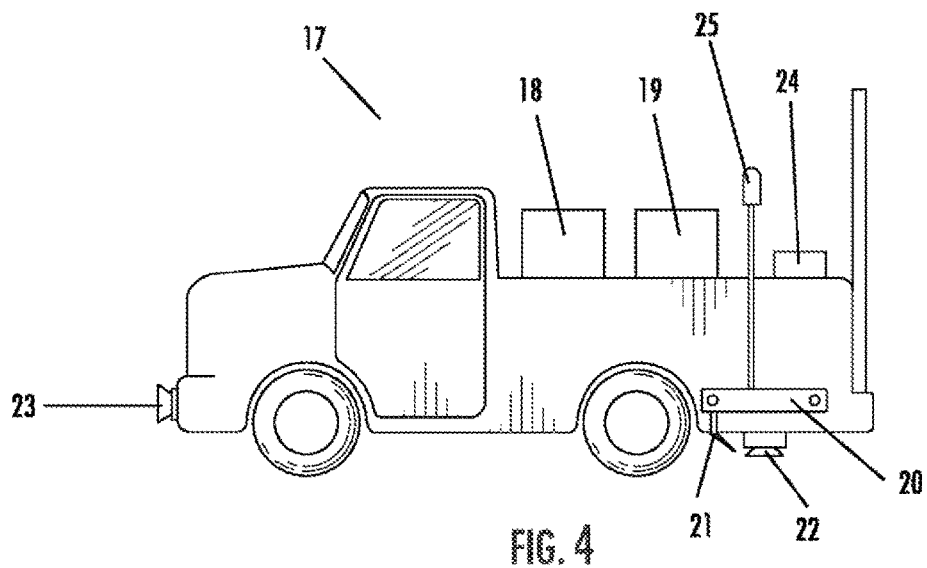
FIG. 4 is a depiction of an alternative mobile platform for material marking.

FIG. 4 presents an embodiment of mobile platform 17 for marking. Mobile platform 17, represented as a truck, includes materials source 18, pumping system 19, and movable platform or paint carriage 20. Movable platform or paint carriage 20 includes spray head system 21. Mobile platform 17 is further provided with first condition sensor 22 and, optionally, second condition sensor 23. Computing platform 24 is provided to process data received from the first and/or second condition sensors. GPS antenna 25 may be used to provide location data, which may be associated with data from the first and/or second condition sensors, and/or may be used to track the location of mobile platform 17.

Plural condition sensors may be used to, for example, provide a before-and-after representation of a portion of pavement surface, such as to enable assessment of whether a marking has been placed in the correct location, or is of the correct color, and/or is of the correct dimensions; or of whether reflective beads have been placed in the correct location or are providing a specified retro-reflectivity or meeting a particular retro-reflectivity requirement or specification; or of whether a removal process has cleaned a portion of pavement surface sufficiently. Plural condition sensors may also be used to provide data in more than one range of the electromagnetic spectrum, such as in more than one of the visible, infrared, ultraviolet, ultrasonic, and microwave spectra.

Figure 5:
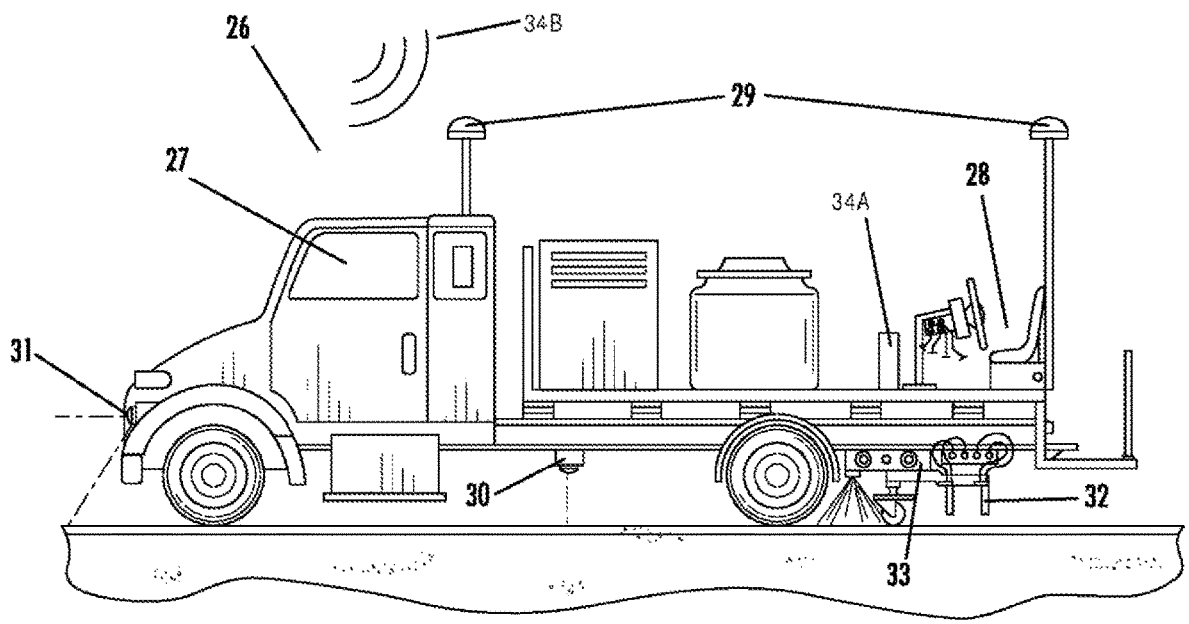
FIG. 5 is a depiction of an alternative mobile platform for material marking.

FIG. 5 presents an embodiment of mobile platform 26 for marking, represented by a truck. Mobile platform 26 may include cab 27 in front for a driver, and operator station 28 in back. Operator station 28 may be used to control aspects of the marking operation other than driving the truck, such as operation of spray head array 32 and movable cross-track carriage 33 on which spray head array 32 is mounted. First condition sensor 30, and optionally second condition sensor 31, provide data on the pavement surface to local computing platform 34A and/or to remote computing platform 34B, which may be a cloud computing platform. One or more GPS antennas 29 may be used to provide location data, which may be associated with data from the first and/or second condition sensors, and/or may be used to track the location of mobile platform 26.

Figure 9:
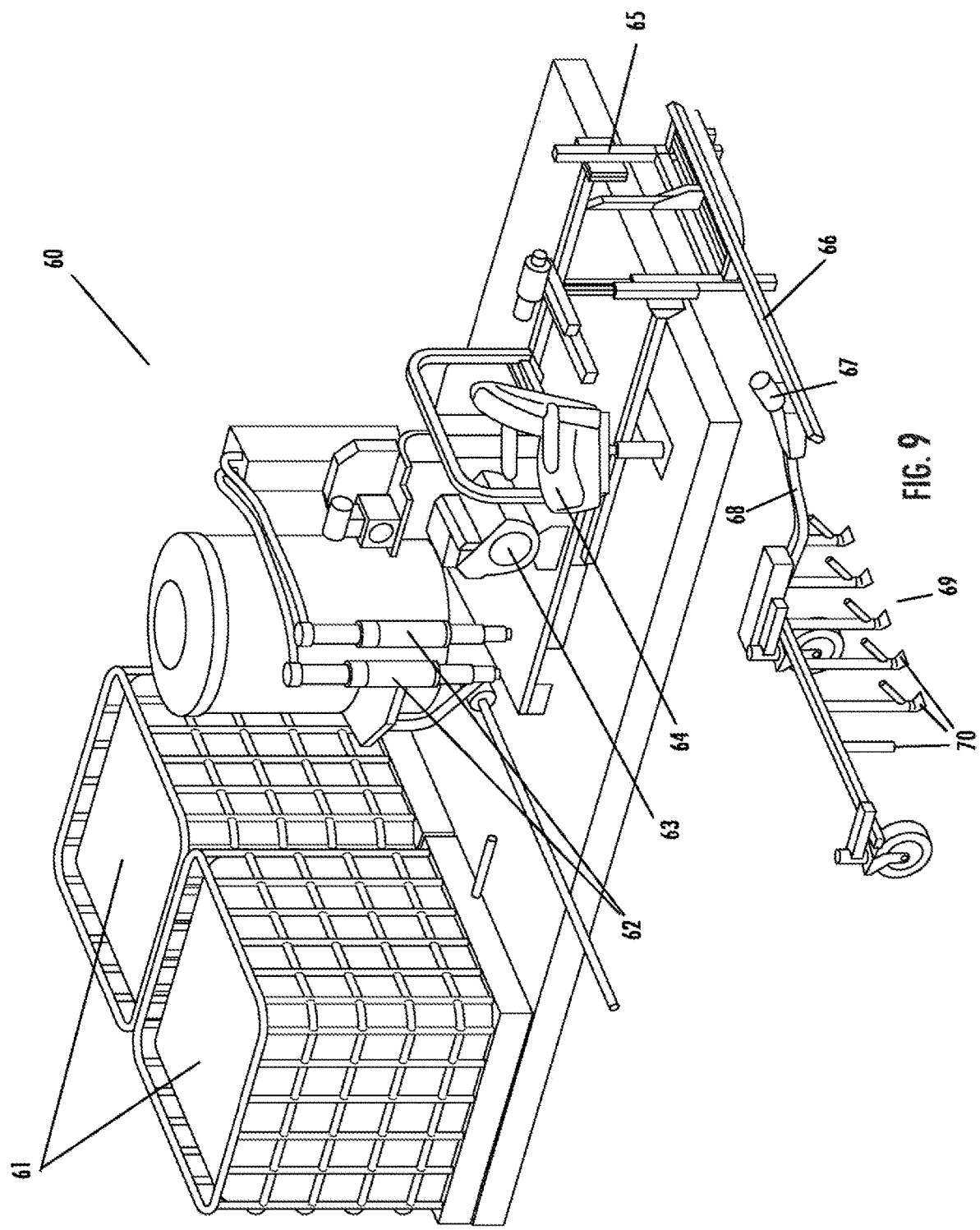
FIG. 9 is a depiction of an alternative mobile platform for material marking.

FIG. 9 presents an embodiment of mobile platform 60 for marking which, as depicted, would be a module associated with a vehicle. Mobile platform 60 includes materials sources 61, from which material is moved by pumps 62 and pump motor 63. Control and/or monitoring of the operation of mobile platform 60 may take place via operator station 64.

Boom mast 65 and beam 66 are used to carry carriage motor 67, which is connected to paint carriage 69 via boom 68. Paint carriage 69 includes spray heads 70, through which material is ejected towards the pavement surface.

Figure 15:
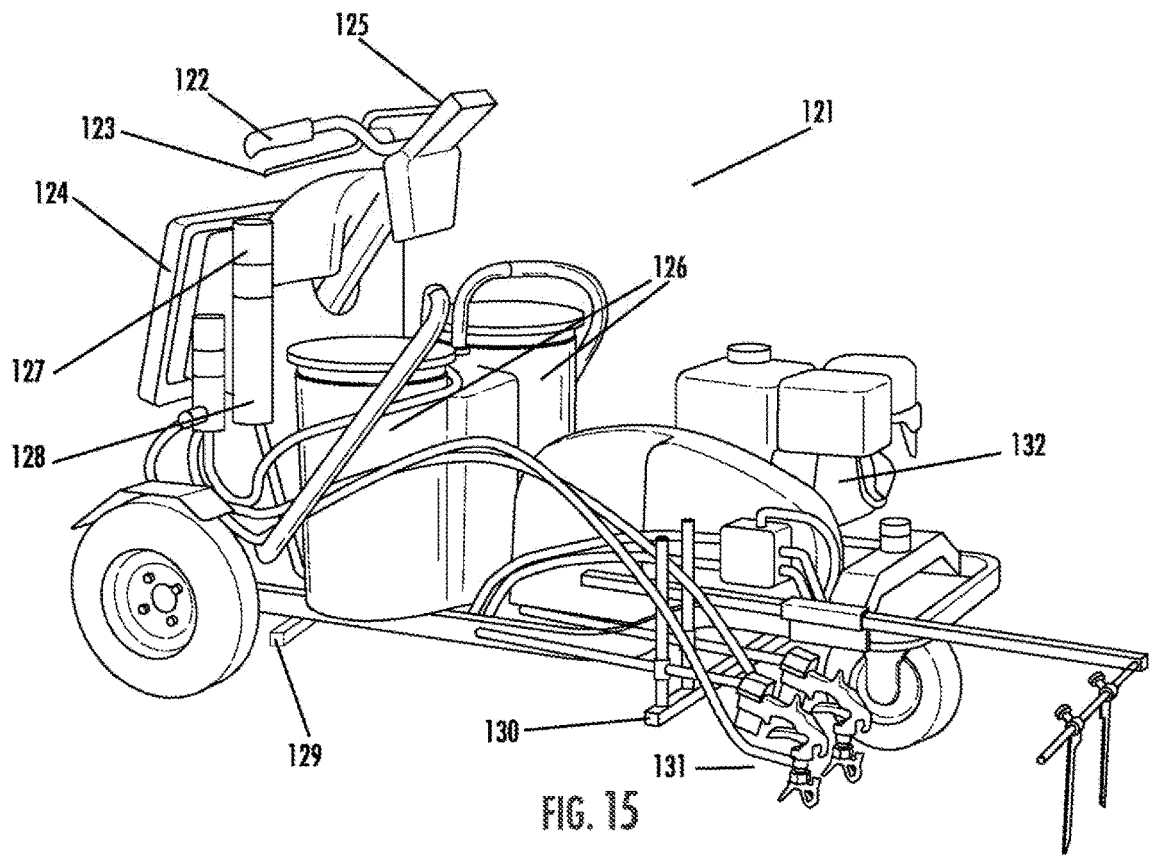
FIG. 15 is a depiction of an alternative mobile platform for material marking

FIG. 15 presents an embodiment of mobile platform 121 for marking in the form of a walk-behind or ride-on self-propelled vehicle. Mobile platform 121 may include handlebar 122, marking material placement controls 123, dashboard 124, display 125, and engine 132. The main body of mobile platform 121 may carry marking material sources 126, hydraulic motor system 127, and pump system 128 by which marking materials are ejected towards the pavement surface via spray head system 131. Rear spray head mounting system 129 and/or front spray head mounting system 130 may be provided for the mounting of respective rear and/or front spray head systems, and/or to mount additional components as desired.

A mobile platform may be used in combination with a system designed to provide information about, and/or control of, the operation of the mobile platform, including its components. Such a system may be capable of providing data collection, analysis, and/or reporting functionalities involving the status and/or operation of the mobile platform. The system may receive visual information, such as from one or more image sensors associated with the mobile platform, as well as data, such as from various sensors associated with the mobile platform. Information and data may be transmitted to a computing platform located on the mobile platform, and/or transmitted to a remote location, which may include a hand-held device, for processing and use. Output from the information system and/or computing platform may be viewed, printed, stored, and/or otherwise handled as needed.

Based on the available sensors, and as representative examples only, the information system may be configurable to receive data on the following: motion of the mobile platform, such as speed, direction, or velocity; location of the mobile platform; amount of remaining and/or used marking material; temperature of marking material; pressure used to pump marking material; flow rate of marking material; vertical, horizontal, and/or lateral position of the spray assembly and/or spray heads used to place marking material relative to the mobile platform and/or pavement surface; ambient conditions such as temperature, humidity, air pressure, air quality, wind speed, wind direction, precipitation, and/or illumination; status of an emitter or condition sensor; flow of current to and/or from peripheral devices; health of switches; input from thermocouples; and 4-20 mA signals.

Such data may be displayed directly to a local and/or remote driver and/or operator. The data may be processed by a computing platform, which may then provide processed data for display, store data, and/or generate alerts, work orders, maintenance requests, records, and any other desired output. The data may be used to provide diagnostic information for components of the mobile platform, which may provide troubleshooting support, and/or to indicate a need for adjustment, maintenance, or replacement of a component of the mobile platform. Diagnostic information may be provided to and used by a local operator, such as a driver, and/or transmitted to a remote location.

The information system may also be configured to control various aspects of the mobile platform, such as turning illumination on and off; adjusting the temperature or flow rate of marking material; operating hydraulic or pneumatic valves on the mobile platform; and adjusting the position and/or orientation of spray heads, of a paint carriage associated with the mobile platform, or of a vehicle associated with the mobile platform.

The information system may be configured to receive, process, and/or display visual information and data based upon the mobile platform with which it is used, the type of pavement assessment or modification being performed, and the particular pavement or portion of pavement being assessed or modified. Such configuration may then be stored in a configuration file for later use.

Figure 16:
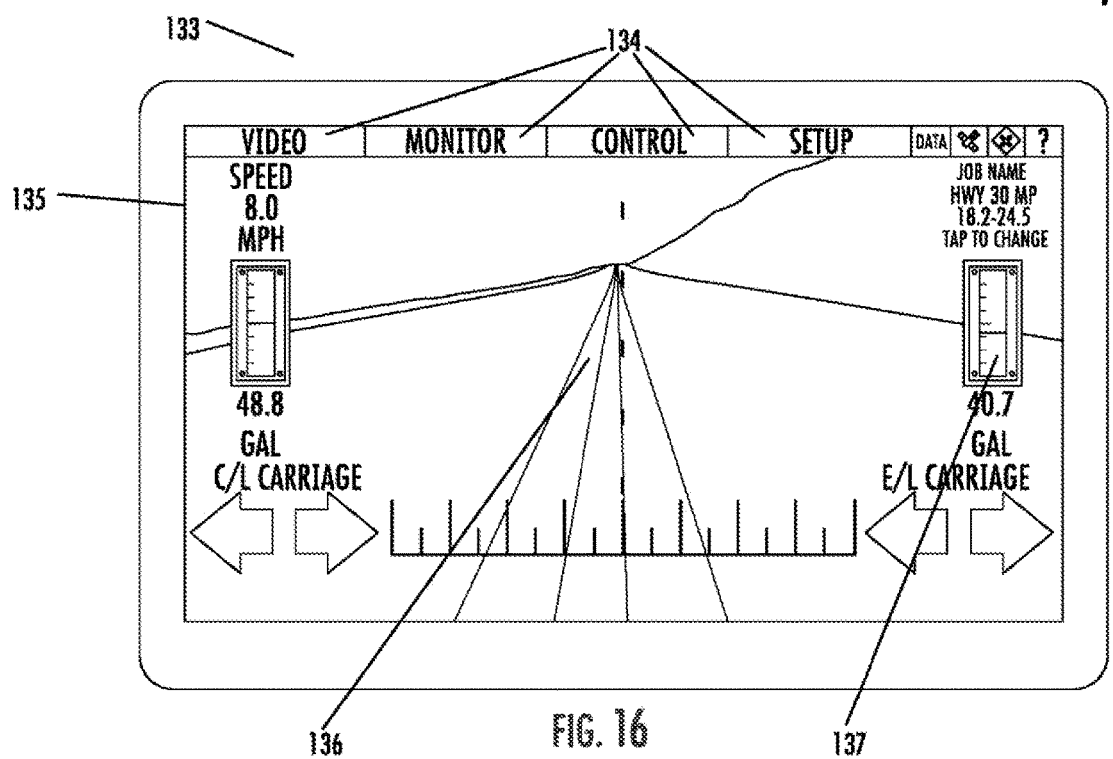
FIG. 16 is a depiction of a mobile platform control system and display.

FIG. 16 presents a representative view of a control and display system 133 that may be used in connection with a mobile platform, including but not limited to a mobile platform of the type shown in FIG. 15. Control and display system 133 may include display 135, which may include one or more visual display elements 136, such as the view from an image sensor associated with the mobile platform, as well as one or more data display elements 137, which may provide data on the mobile platform and/or its components as described hereinabove. Display 135 may include one or more tabs, or similar design element, 134, allowing an operator or other person using the system to select views and functionalities as desired. Display 135 may include the ability to accept user input, such as by touchscreen, physical or virtual keyboard, voice, and/or gesture. User input may be used to operate the functionalities of display 135 itself, and/or to modify the operation of the mobile platform, including its components. Control and display system 133 may include additional outputs to provide information and/or alerts to an operator, including visual cues such as by illuminating, changing color, blanking, or flashing the display or one or more lights associated with the mobile platform; providing audible alerts; and/or providing haptic feedback, vibration, or other tactile output.

Figure 6:
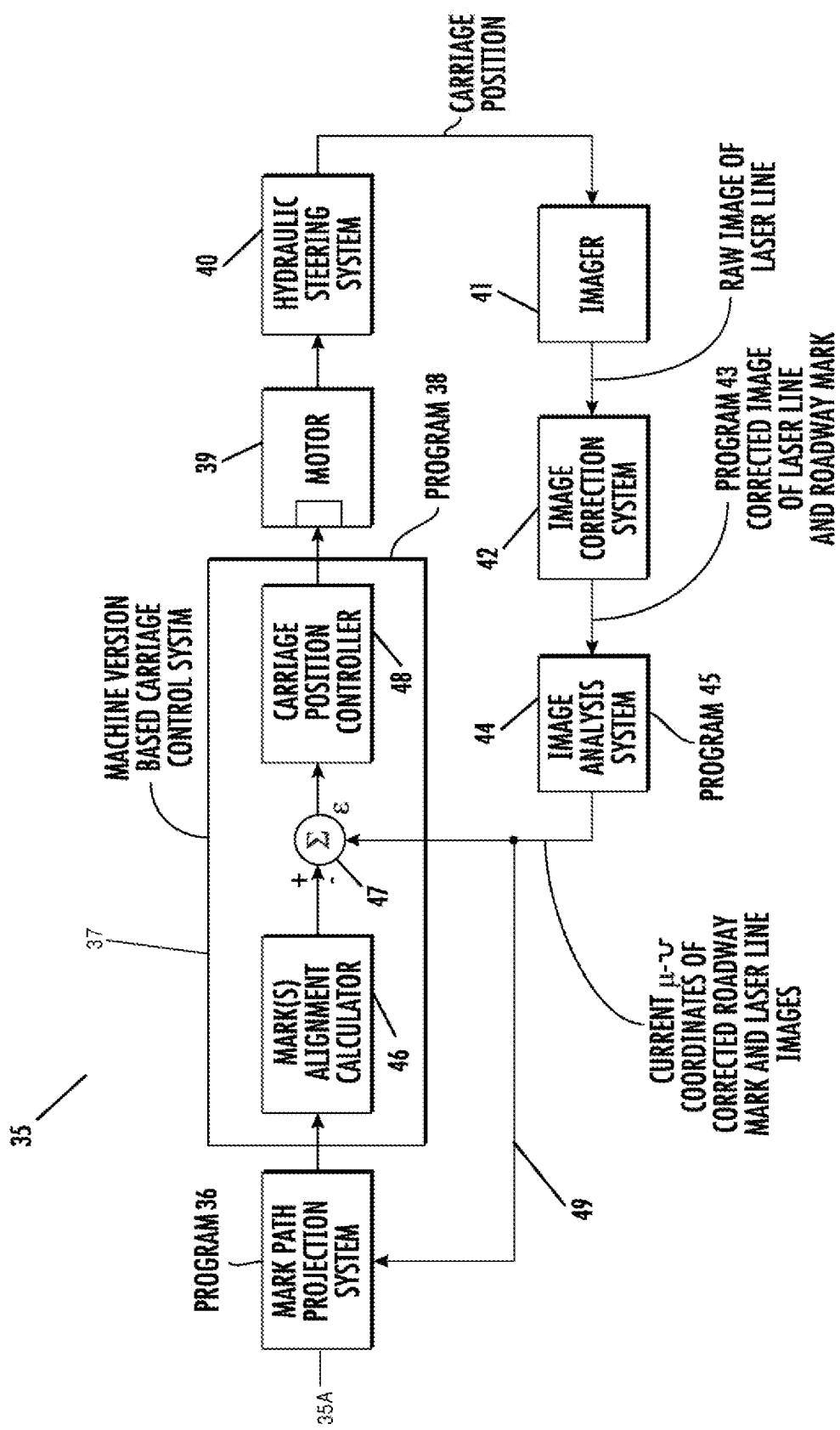
FIG. 6 is a depiction of a machine vision-based control system for material marking.

FIG. 6 presents a block diagram of a machine vision-based carriage control system 35 which may be used in connection with a mobile platform. Machine vision-based carriage control system 35 may, in cooperation with programs 43, 45, 36, and 38, command motor 39 to move mobile platform 60 and/or spray assembly 69 via hydraulic steering system 40 in a direction to align spray head assembly 69 and spray heads 70 over a given portion of pavement.

Control system 35 includes a mark path projection system 35A (which may comprise mark path projection program 36), a machine vision-based carriage control system 37 (which may comprise machine vision and carriage control program 38), motor 39, hydraulic steering system 40, condition sensor 41, image correction system 42 (which may comprise image correction program 43), and image analysis system 44 (which may comprise image analysis program 45). Machine vision-based carriage control system 37 further comprises mark alignment calculator 46, comparator 47, and carriage position controller 48. Systems 35A, 37, 42, and 44 may be implemented in software, hardware (such as an FPGA), or a combination of software and hardware.

The mark path projection system 35A inputs data from image analysis system 44 via a line 49 and creates a pavement mark path mathematical projection model in image (and also object) space. This model may then be used by mark alignment calculator 46 to calculate the intersection point between a lateral projection line image space equation and a pavement mark segment image space path projection equation to predict the image space lateral position of the actual pavement mark segment as it passes under or adjacent the mobile platform at the position of the spray head lateral projection line in image space, which has been previously determined. This intersection point is the desired lateral position in image space of the spray head assembly and its respective spray head to dispense marking material directly over and onto the pre-existing pavement mark segment. The desired lateral position image space coordinate data are then input into the positive (+) input of comparator 47.

In order to have information on the current condition of pavement, it may be necessary or desirable to assess the pavement surface. As used herein, "assessment" includes, with respect to a portion of pavement surface, determining whether paint is present on a portion of pavement surface; determining the condition of paint that is present, which may include color, thickness, cure state, adherence, and reflectivity; determining whether contamination is present, including the presence and location of rubber or other markings from aircraft, or of foreign object debris; and determining whether structural flaws are present in the pavement surface, including cracks or potholes.

Figure 8:
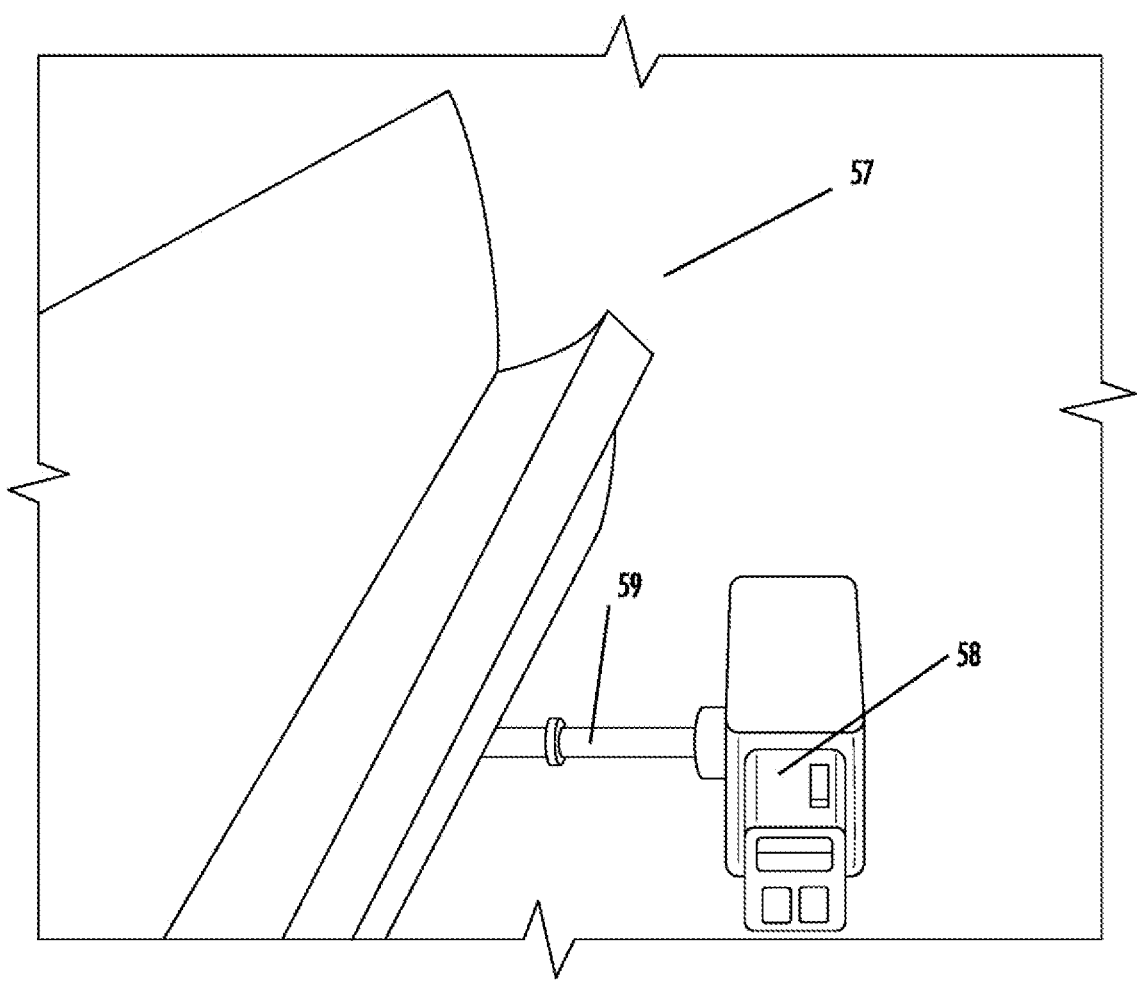
FIG. 8 is a depiction of a mobile platform for assessment.

FIG. 8 presents an embodiment of mobile platform 57, which includes assessment module 58 carried on boom 59. Assessment module 58 may include one or more condition sensors and/or emitters configured to provide data on a target condition of the pavement surface. Data from a condition sensor may be transmitted by wire to a computing platform on mobile platform 57, and/or transmitted wirelessly to a remote computing platform, which may be local to the pavement location or may be a cloud computing platform.

The computing platform may analyze the condition sensor data to provide information such as the presence or absence of markings; the color of markings; the retro-reflectivity of markings; the color of the pavement surface; the retro-reflectivity of the pavement surface; the presence or absence of pavement surface flaws, such as cracks or potholes; and the friction characteristics of the pavement surface. This data may be used for any desired purpose, including identifying the need for current or scheduled future pavement surface modification; scheduling pavement modification; preparing work orders for pavement modification; determining the type and/or amount of materials needed for pavement modification; and checking the type and/or amount of materials needed for pavement modification against an inventory and, optionally, ordering additional materials if and as needed.

Assessment may involve aspects of a pavement environment other than or in addition to a pavement surface. For example, assessment may be used with regard to elements regarding landscaping of the pavement area, such as the presence, location, type, and height of grass or other vegetation, the presence and type of wildlife, or the condition or integrity of fencing. Alternatively, assessment may be used to determine the condition of elements used to provide visual information to pilots and/or air traffic controllers, such as lights and signs.

To perform assessment and/or modification, an emitter may be associated with a mobile platform. The emitter generates electromagnetic waves, which may be directed at a portion of the pavement surface being assessed or modified. The portion of the pavement surface then emits electromagnetic radiation that is received by a condition sensor associated with the mobile platform. This electromagnetic radiation may involve reflection of the electromagnetic waves from the emitter. Alternatively or in addition, this electromagnetic radiation may involve a different form, wavelength, or spectrum of radiation resulting, for example, from excitation by the radiation of the pavement surface and/or of material on the pavement surface, such as fluorescence. The condition sensor then converts that electromagnetic radiation to a first electronic signal that is representative of a current condition of the portion of the pavement surface.

The emitter may be configured to generate electromagnetic waves in any portion of the electromagnetic spectrum that is compatible with the condition sensor being used and the condition being assessed. Generally, the emitter will generate electromagnetic waves in the visible, infrared, ultraviolet, ultrasonic, or microwave spectra, and both the current condition and the target condition will be one or more of the location of a paint band, the location of an edge of a paint band, the width of a paint band, the color of a paint band, the thickness of a paint band, the reflectivity of the portion of the surface, and the cleanliness of the portion of the surface.

In one approach, the emitter may be configured to generate electromagnetic waves in the visible, infrared, or ultraviolet spectra, and the condition being assessed will be one or more of color (which may be, without limitation, the color of paint, pavement surface, vegetation, lighting, or signs); the presence of paint; the absence of paint; the presence of a contaminant; the absence of a contaminant; a dimension of a paint marking; and the retro-reflectivity of the portion of the pavement surface, which may or may not be painted.

The emitter may, without limitation, include an incandescent bulb, a halogen bulb, a fluorescent bulb, a high-intensity discharge light, or a light-emitting diode, and the condition sensor may be an image sensor. Alternatively, the emitter may include a magnetron or a semiconductor, and generate electromagnetic waves in the microwave spectrum, or an ultrasonic transducer, to generate electromagnetic waves in the ultrasound spectrum.

The mobile light room may be comprised of an enclosed chamber or shroud, an appropriate mounting apparatus for the condition sensor, an illumination apparatus for illuminating the target, and mounting or mobility equipment for the mobile light room itself. The emitter and/or condition sensor may be associated with a component designed to reduce any interference by ambient electromagnetic waves with those generated by the emitter and/or with electromagnetic radiation received by the condition sensor from the portion of the pavement surface. For example, when the emitter is one that generates electromagnetic waves in the visible light spectrum and the condition sensor is an image sensor, the emitter and/or image sensor may be associated with a component designed to reduce the amount of ambient visible light reflecting from the portion of the pavement surface being imaged, and/or the amount of ambient visible light received by the image sensor. This component may be, by way of non-limiting example, a housing, shroud, or similar structure. A second emitter may also be used to emit electromagnetic waves that have the effect of reducing or cancelling out ambient or otherwise undesired electromagnetic radiation from reaching the condition sensor.

When the emitter and condition sensor are configured for use of electromagnetic waves in the visible spectrum, the light source should be mounted at a distance from the surface to be analyzed that will provide sufficient illumination at the surface to produce accurate condition data from the condition sensor, while minimizing the potential for ambient contamination, such as by ambient light and/or airborne particulates, of the electromagnetic radiation reaching the condition sensor; by way of non-limiting example, a distance of about one foot from the surface to be analyzed may be appropriate. It should be noted that the emitter must be mounted in such a way so as to not obstruct the view of the condition sensor.

The system comprised of the emitter, condition sensor, and mobile light room may be constructed to enable mounting of the same or substantially the same system on different types of mobile platforms, such as a van or truck as well as a stand-alone assessment mobile platform such as a trailer or modified vehicle.

A location sensor associated with the mobile platform generates an additional electronic signal, which includes location data corresponding to the portion of the pavement surface. The location sensor may obtain location data from any suitable source, including but not limited to a global positioning system, a real-time kinetic positioning system, an inertial navigation system, and a total station. The second electronic signal may further include time-of-day data.

The first electronic signal and the second electronic signal are transmitted to a computing platform, which is used to associate the location data with the first electronic signal to create a current pavement condition data point. The computing platform may also create a record of the current pavement condition data point.

Electromagnetic radiation can be used to determine the density of solid materials, such as marking material and the surface on which it has been applied. When the portion of the pavement surface being assessed includes a layer of paint, the electromagnetic waves may be configured to produce electromagnetic radiation from the layer of paint to the condition sensor that enables a determination of the depth of the layer of paint. The presence and intensity of lower density regions between this paint and the surface can also be indicative of decreased adhesion of the marking to the surface.

When plural layers of paint are present on the portion of the pavement surface, the electromagnetic waves may be configured to provide electromagnetic radiation from the layers of paint to the condition sensor that enable a determination of the density of at least one layer of paint. Density data may be used to determine the relative or absolute degree of bonding between layers of paint, or between a layer of paint and a pavement surface, and to determine whether a layer of paint is separating or delaminating from an adjacent layer of paint and/or from the pavement surface, indicating the need for present or future maintenance. Additionally, the "banding" of low- and high-density regions over a depth of paint can be counted and used to determine the number of layers of paint present. When the electromagnetic waves and condition sensor are configured to provide data regarding the density of paint, such data may be used to determine the cure state of paint. This data is associated with location data, such as GPS coordinates, in order to associate the readings with a specific marking on the airfield.

One example of a process that may be used to measure layers of material, such as paint, is as follows:

1. An emitter directs electromagnetic waves in the ultrasound spectrum towards the surface of the layers of material
2. The electromagnetic waves penetrate the surface, travel at least partially through the layers of material towards the underlying pavement surface, and ultrasound radiation is reflected based on the condition of the material
3. A condition sensor receives the reflected ultrasound radiation, which is converted to an electronic signal
4. A computing platform analyzes the electronic signal to generate data on the density of the layers of material through which the ultrasound waves/radiation traveled prior to being reflected
5. The density data is associated with location data, such as GPS coordinates, to associate the density data with a specific marking
6. If a single low-density band is detected, this indicates the presence of a single layer of material
7. If plural low-density bands are detected, the size and number of bands are analyzed to determine the number of layers, and either the density of each layer is assigned a value, or the layers are ranked in relative terms based on density.
8. The difference in density between adjacent layers is compared to a predetermined value or threshold
   a. If the difference in density is below a predetermined threshold, no action is taken
   b. If the difference in density is at or above a predetermined threshold, indicating a relatively weak bond, the marking is identified as failing or failed.

Note that, in addition to assessing the bonding between plural layers of material, this approach may be used or readily adapted to assess the bonding between a single layer of material and a pavement surface, and/or between that layer of plural layers of material that is adjacent the pavement surface and the pavement surface.

The computing platform may be used to compare the first electronic signal against a reference that is representative of a target condition of the portion of the pavement surface. Based on this comparison, the computing platform may determine if there is a condition variance between the current condition of the portion of the pavement surface, and the target condition of the portion of the pavement surface.

If a condition variance is found, the computing platform may determine whether the condition variance exceeds a predetermined threshold and, if so, generate a condition variance record based on the condition variance.

Alternatively or in addition to generating a condition variance record if a condition variance is found and is determined to exceed a predetermined threshold, the computing platform may be used to generate condition control signals based on the condition variance. The condition control signals may be transmitted to a pavement surface modification system, where they will modify operation of the pavement surface modification system to reduce the condition variance.

The pavement surface modification system may be operable to perform one or more of placing paint on the pavement surface, placing reflective beads on the pavement surface, placing water on the pavement surface, and placing chemical cleaner on the pavement surface.

The condition control signals may be operable to modify at least one of the flow rate of paint, the temperature of paint, the flow rate of reflective beads, the flow rate of water, the flow rate of chemical cleaner, the horizontal position of the surface modification system in relation to the portion of the pavement surface, the vertical position of the surface modification system in relation to the portion of the pavement surface, or the velocity of the pavement surface modification system.

The removal of features from pavement may involve removing surface features such as paint, or rubber from vehicle wheels, including but not limited to rubber on runways from aircraft landings and/or takeoffs. Alternatively, removal may involve removing foreign object debris, such as vegetation, live animals or birds, animal or bird carcasses, pieces from broken lighting fixtures or signs, misplaced tools or supplies, or dislodged pieces of pavement material.

Removal of markings previously placed on pavement, and removal of rubber marks on runways resulting from aircraft landings and/or takeoffs, are part of routine pavement maintenance. Both the removal of markings previously placed on pavement, and of rubber, may be accomplished by spraying or otherwise placing or directing fluids on or to the markings or rubber at high pressure. Because of the volume of fluid that may be involved, removal usually involves the use of a truck carrying a large tank of fluid, pumps to pressurize the fluid, and a movable boom or similar extension from the truck provided with spray heads through which the fluid may be directed at the pavement surface. While fluid may be provided to a vehicle on the pavement from a remote location through an umbilicus or similar arrangement this is generally less desirable, in part because the umbilicus restricts the range of the removal vehicle, constitutes an obstacle on the pavement surface and/or in the pavement environment, and presents the risk of leaks.

Removal may include recovery of fluid after it has been placed onto the pavement surface by using suction to pull fluid off the pavement surface into a collection or holding container. This can have the advantage of also recovering at least a portion of the displaced material, such as paint or rubber, being removed, rather than having it remain on or near the pavement surface. The recovered fluid may be collected locally, as in a tank or other container carried or towed by a vehicle, or pumped off the pavement through a hose, umbilicus, or similar arrangement to a remote location.

Because the pumps used to pressurize fluids, such as water, used for removal of markings operate at relatively high pressures, structural flaws may develop in the pumps and/or associated equipment over time. If such flaws are not detected they may eventually result in failure of the pumping system, including catastrophic failure. Microfractures can occur that are not readily detected during typical pump maintenance. Failure of the pumping system can result in disruption of a maintenance schedule because the affected parts will need to be replaced or repaired, or a replacement truck or other removal device will have to be brought on site to complete the intended removal process, which may incur additional cost and/or cause delay. Both cost and service interruptions are drastically decreased when maintenance on flawed components is performed prior to catastrophic failure. In addition, catastrophic failure presents the risk of personal injury, damage to components not directly affected by flaws, and environmental impacts, such as unintended release of cleaning fluid, requiring remediation.

The present process includes configuring an emitter to generate ultrasound waves directed at those areas of the pump equipment likely to experience such flaws, and a condition sensor, such as an ultrasound transducer, configured to receive ultrasound waves that have passed through or been reflected by those areas. Multiple emitter/transducer arrays or sweeping sensor techniques combined with inertial measurement sensors can be used to produce high-resolution three-dimension density maps. Other techniques for providing density data, such as acoustic sensing, may also be used. Characteristic anomalies present in these density maps can be used to identify flaws before they are significant enough to disrupt operation, or are visible by visual inspection. As degradation patterns are developed through continued use, a point of "just in time" maintenance can be determined, allowing for operation after the first detection of a flaw. A computing platform may analyze information from the received waves to detect flaws such as microfractures, and generate data points, records, alerts, and/or other output as desired.

One example of a process for detecting possible pump failure is as follows:
1. Continuous or intermittent sensing is performed on a pump component identified as presenting a risk of failure.
    a. An emitter or plural emitters generate ultrasound, acoustic, or other suitable electromagnetic waves;
    b. The electromagnetic waves interact with the material to be analyzed and are reflected, refracted, and scattered based on the equipment condition and conformation;
    c. An appropriate sensor, such as a transducer for ultrasound waves, detects the reflected electromagnetic waves
2. A computing platform analyzes the data to detect the presence of an anomaly
3. If no anomaly is detected, no action is taken
4. If an anomaly is detected, its level of severity is determined based on known degradation patterns
    a. If the level of severity does not exceed a predetermined threshold the equipment may be allowed to continue operation, and, if the sensing has been intermittent, the frequency of sensing is increased
    b. If the level of severity exceeds a predetermined threshold or if no determination is able to be made, pump operation may be discontinued and maintenance performed to remedy any detected anomaly.

Figure 7:
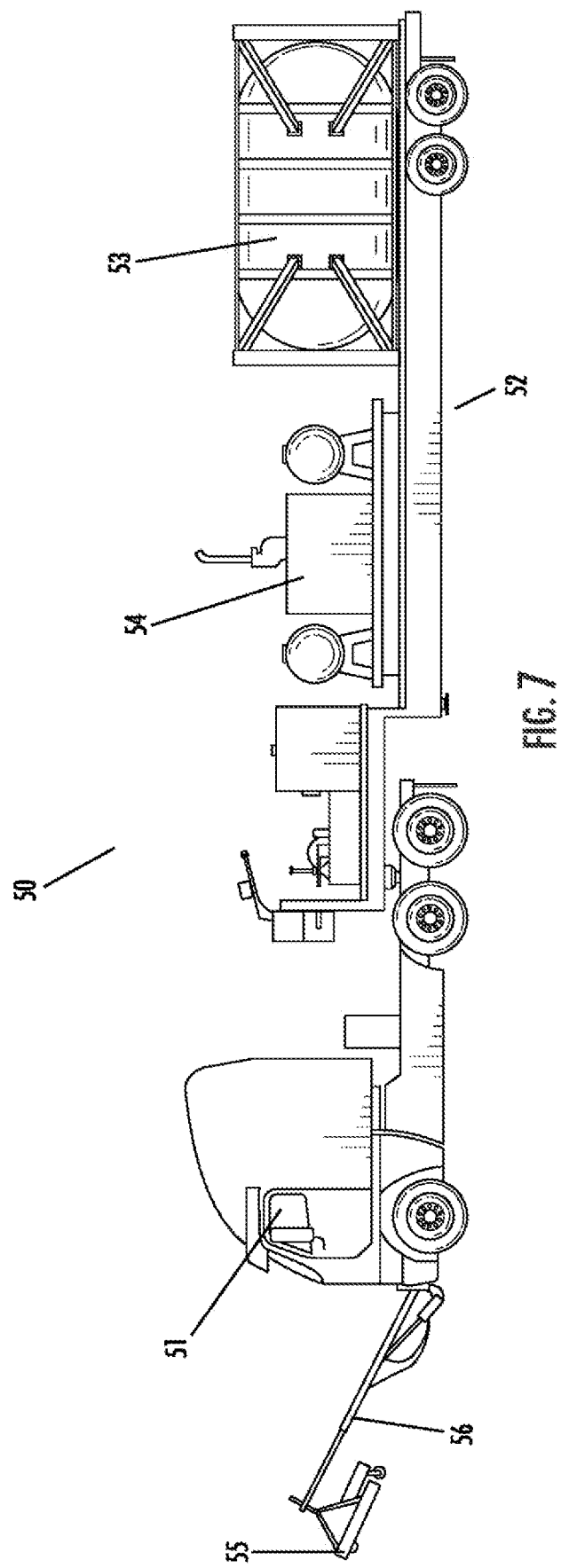
FIG. 7 is a depiction of a mobile platform for material removal.

FIG. 7 presents an example of a mobile platform 50, shown here in the form of a truck, that may be used in the removal process. Mobile platform 50 includes removal module 55, cab 51, and trailer or main body 52. Trailer or main body 52 is provided with material source 53, which may be water, chemicals, or any other fluid or fluidizable material, and with pump system 54 to move the material from material source 53 to removal module 55. Removal module 55 may be carried by a movable boom 56, which enables placement of the removal platform as desired. Removal module 55 may include a spray head assembly through which material is ejected at sufficiently high pressure to accomplish the desired removal process which, by way of non-limiting example, may involve removing paint markings or rubber marking from aircraft take-offs and landings. Removal module 55 may also include or be accompanied by a recovery module operable to recover material that has been ejected onto the pavement surface, and which may include paint and/or rubber removed by this process.

The computing platform used in the present process may include a processor located on the mobile platform, including a processor located in or integral to the condition sensor, and the first electronic signal, second electronic signal, and condition control signals may each be transmitted by wired connection or wirelessly to or from the processor as applicable. Alternatively, the computing platform may be a cloud computing platform, in which case the first electronic signal and second electronic signal may be wirelessly transmitted to the cloud computing platform, and the condition control signals may be wirelessly transmitted to the pavement surface modification system.

Wireless transmission may take place by any appropriate method, including but not limited to GSM, WiFi, WiMax, WPAN, LR-WPAN, WLAN, WMAN, Bluetooth, Zigbee, or LTE transmission. The selection of the appropriate wireless technology will be readily made based on factors such as existing wireless capabilities/communications, geographic location, signal availability, distances, data rates, location and construction of nearby buildings, and the like.

The pavement surface modification system may be operable to place at least one of paint and reflective beads on the pavement surface, with the condition control signals being operable to modify at least one of the quantity of paint being placed, the color of paint being placed, the location of paint being placed, the quantity of reflective beads being placed, and the location of reflective beads being placed.

During any of assessment, marking, or removal, it may be desirable or necessary to measure the width of markings with accuracy. This may be accomplished, for example, by using an image sensor to capture a digital image of a portion of the pavement surface, and processing the resulting electronic signal to detect and/or measure one or more dimensions of a marking contained in the captured digital image.

The captured digital image may be a grey scale digital image or a color digital image. A color digital image may be converted to a grey scale image, where each pixel in the image is assigned a value between 0 and 255. This is often referred to as the brightness value.

Methods to convert a color digital image to a grey scale digital image are commonly known and include the lightness, average, and luminosity methods. Each resulting grey scale value represents the intensity of light detected by each pixel. For example, a value of 0 may represent no light detection, or black, and 255 may represent maximum light detection, or white.

The grey scale image may represent a painted marking by a localized grouping of pixels with similar grey scale values that are significantly different in magnitude from surrounding pixels.

The measuring of line width from a grey scale digital image may require edge detection and width determination. The Canny edge detector is well known and frequently used in machine vision applications to detect edges. Other edge detector algorithms may be used, though may require more parameters and higher computational capacity than the Canny edge detector. Once the pixels are identified that represent the edges, width is determined by counting the number of pixels between subsequent edge pixels in the direction of measurement.

Alternatively or in addition to determining the dimension of a marking or other pavement feature by analysis of information from the image sensor or other condition sensor, a physical measurement reference may be provided within the field of view of the condition sensor. The physical measurement reference may include a series of marks providing an absolute or relative measurement of length, width, and/or height of a target, which may be without limitation a line, stripe, or geometric shape such as a square or rectangle; a crack, pothole, or other structural flaw in a pavement surface; foreign object debris; the height of vegetation; or the dimensions of a sign, lighting fixture, or fence or other barrier. A human operator and/or computing platform may compare the dimensions of the target with the physical measurement reference, such as to determine: whether a paint marking on a pavement surface is of the correct dimension or dimensions; the type, severity, progression, and/or appropriate corrective action for a structural flaw in a pavement surface; the nature of foreign object debris and/or the need for and type of action to address it; the need for and/or type of action to address vegetation growth; and the need and/or type of action to repair or replace a damaged or missing sign, lighting fixture, or fence or other barrier. The physical measurement reference may be integral to or attached to a housing, shield, or other structure used to reduce the effect of ambient electromagnetic radiation on the condition sensor in a manner that places it within the field of view of the condition sensor, or may be a separate component.

With regard to assessing reflectivity, pavement markings may have enhanced reflectivity of light due to the deposit of glass or other reflective beads in a painted area during the marking process. For purposes of the present discussion reflectivity means the intensity of white light, which may also be referred to as broad spectrum light, detected by the pixels of a digital imager or image sensor, and retroreflectivity means the intensity of white light detected by the pixels of a digital imager or image sensor and which originate from, and are directed back to, a source of directed illumination.

A captured color digital image may be converted to a grey scale image, where each pixel in the image is assigned a value between 0 and 255. This is often referred to as the brightness value. For example, a value of 0 may represent no light detection, or black, and 255 may represent maximum light detection, or white. Methods to convert a color digital image to grey scale are commonly known and include the lightness, average, and luminosity methods.

The reflectivity measurement in the present process may use a pre-determined histogram of pixels from a desired or target outcome, which is compared to a histogram of a real-time digital image captured during the marking process. The histogram may be a bar graph representing the frequency distribution of the pixel values in an image. Comparing the predetermined histogram to the real-time histogram may include determining if the real-time histogram counts the same number or more pixels above a threshold brightness value established by the predetermined histogram. In addition, this comparison may include a measure to determine if a pixel, or collection of pixels, in the real-time histogram meet or exceed a maximum brightness threshold established in the predetermined histogram.

While assessment of reflectivity has been described above in relation to a marking on the pavement surface, it may be readily adapted to measure the reflectivity of other aspects of a pavement surface, such as an unmarked portion, a portion with incorrect modification, or a portion having contamination such as from aircraft tire rubber.

The determination of color in pavement markings may be made by comparison to a color reference. When an image sensor captures a color digital image, each pixel of the image sensor may be assigned three brightness values indicating the pixel's detection of red, green, and blue light wavelengths. For example, the pixels of an image sensor capturing an image of a pure red target would result in brightness values of 255, 0, and 0, to indicate the relative detection of red, green, and blue wavelength light, respectively.

The color measurement may use a predetermined histogram of pixels from a desired or target outcome, and compare it to a histogram from a color image of the portion of pavement surface being assessed. The histogram may be a bar graph representing the frequency distribution of all pixel values in an image. Comparing the predetermined histogram to the histogram of an image from an actual portion of pavement surface may measure the similarity or degree of correlation between the two histograms. Color measurement may be used to determine whether a paint marking present on the pavement is within specification, or to assess the condition of a portion of the pavement that has not been deliberately marked, such as to detect the presence of rubber markings from aircraft tires on a runway, or of flaws in the pavement surface exposing material beneath the surface layer. Color measurement may also be used in connection with assessing the status of lighting adjacent to the pavement, including whether a light is active or is emitting light in the desired spectrum or of the desired wavelength(s) or of a certain intensity or range of intensity.

Alternatively or in addition to determining color by analysis of information from the image sensor or other condition sensor, a physical color reference may be provided within the field of view of the condition sensor. The physical color reference may include any desired range of colors, including multiple colors and/or multiple hues, shades, tints, and/or tones of a single color. A human operator and/or computing platform may compare the color of a target, which may be without limitation a marked portion of pavement surface, an unmarked portion of pavement surface, foreign object debris, a lighting fixture, a sign, or vegetation, with the physical color reference. The comparison may be used, for example, to determine whether a marking is of the correct color; whether a portion of pavement surface is marked or unmarked; whether a lighting fixture is providing illumination of a desired intensity and/or color; or whether a sign is of a desired color or colors, including whether a sign has weathered or otherwise faded to a point where repair or replacement may be indicated. The physical color reference may be integral to or attached to a housing, shield, or other structure used to reduce the effect of ambient electromagnetic radiation on the condition sensor in a manner that places it within the field of view of the condition sensor, or may be a separate component.

The techniques described herein may be used to determine the color of any desired target, included a marked runway surface, an unmarked pavement surface, foreign object debris, lighting adjacent to pavement, pavement signs (such as runway and roadway signs), and vegetation.

The techniques described herein may also be used to detect, and alternatively to also correct, the presence of banding between adjacent paint stripes. Banding can occur when plural, adjacent spray heads are used to place paint, reflective beads, or other marking materials on a pavement surface. Each spray head places a certain width or footprint of marking material on the pavement surface. When plural spray heads are used, each places a discrete strip of marking material on the pavement surface; however, when the spray heads are properly positioned, the edge of one strip aligns with the adjacent edge of the next strip to present the visual appearance of a single, wider strip. For example, if the use of a single spray head would produce a strip of paint approximately three inches wide, the use of two such spray heads adjacent each other would ideally produce a single, uniform strip six inches wide.

Figure 12:
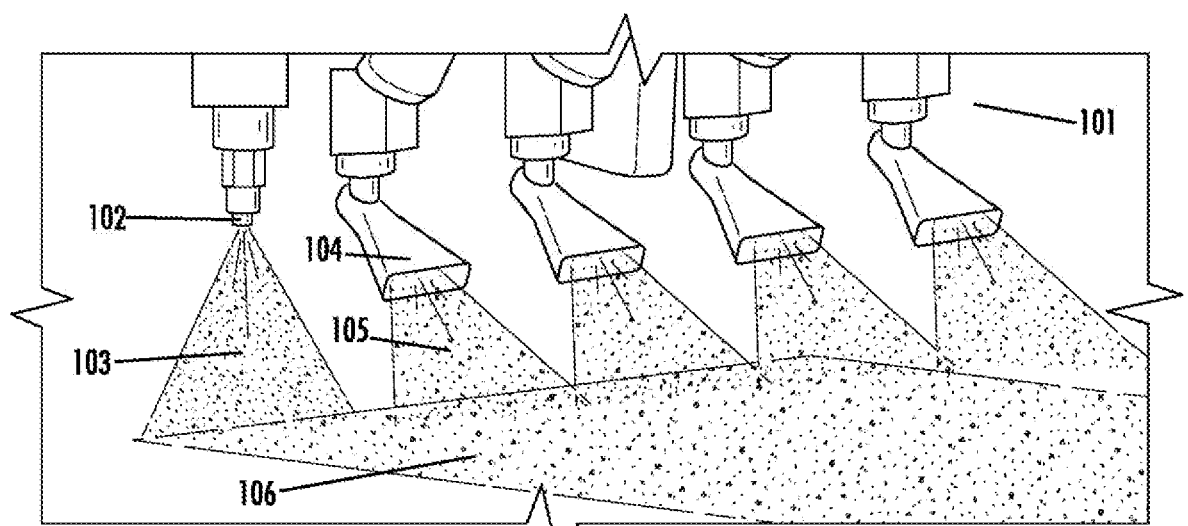
FIG. 12 is a depiction of the spray head system of a marking assembly.

With reference to spray assembly 101 in FIG. 12, as first marking material 103 leaves first spray head 102 and moves toward the pavement surface, the leading or forward edge of the first marking material may become progressively wider than the first spray head aperture from which the first marking material was ejected. Because first marking material 103 is exiting first spray head 102 under pressure, the pattern of first marking material 103 as it leaves first spray head 102 and moves towards pavement surface 106 tends to widen until it contacts the pavement surface. Such widening may be a desired characteristic of the marking process, and spray heads may be designed to produce or increase the widening effect, as seen in the approximately triangular geometry of second spray head 104 being used to eject second marking material 105 in the direction of pavement surface 106.

Figure 13:
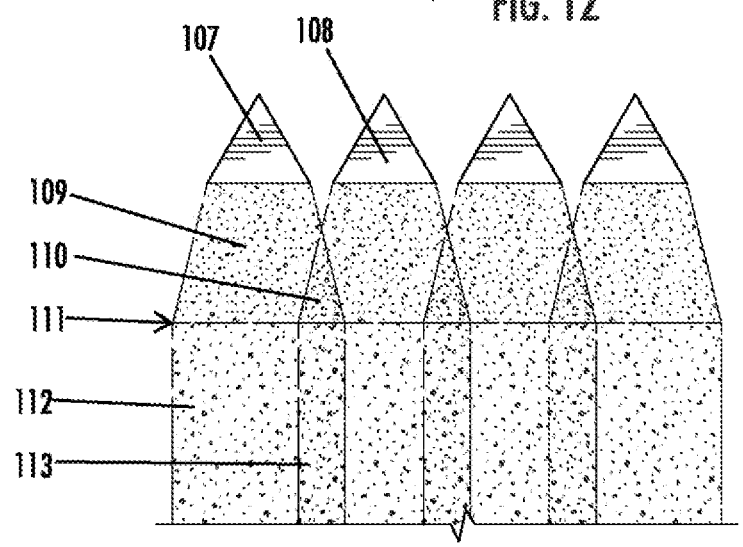
FIG. 13 is a first depiction of spray heads producing a marking pattern.

As seen in FIG. 13, if spray heads 107 and 108 are distanced too far from the point at which the materials they are spraying contact the pavement surface at 111, spray head 107 will produce a non-overlapping zone 109 of making material in the air, and spray heads 107 and 108 will produce an overlapping zone 110 of marking material in the air. As the marking material reaches the pavement surface at 111, these will produce a marking material stripe 112 from non-overlapping spray on the pavement surface, as well as a marking material stripe 113 from overlapping spray on the pavement surface. Marking material stripe 113 will be denser than marking material stripe 112, resulting in an undesirably non-uniform pattern of marking material on the pavement surface.

Figure 14:
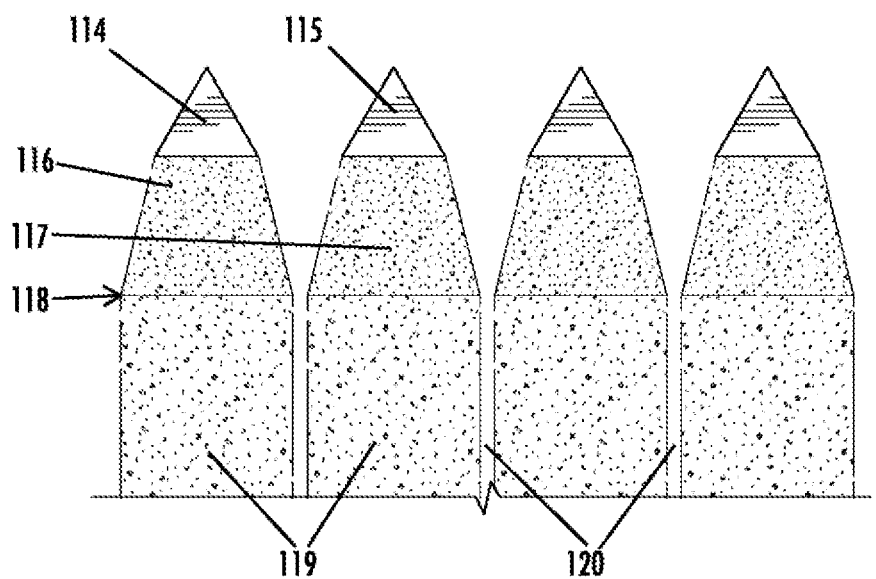
FIG. 14 is a second depiction of spray heads producing a marking pattern.

As shown in FIG. 14, If spray heads 114 and 115 are not distanced far enough from the point of contact 118 of the marking material with the pavement surface, spray head 114 will produce a zone 116 of marking material in the air, spray head 115 will produce a zone 117 of marking material in the air, and the adjacent edges of zones 116 and 117 will not converge prior to reaching the pavement surface at 118. This will result in stripes 119 having a target density of marking material, and regions 120 having a lighter density of marking material or no marking material, resulting in an undesirably non-uniform pattern on the pavement surface.

The techniques described herein regarding the use of and processing of data from image sensors may be used to detect either of the above conditions, and to generate condition control signals that will, applicable, increase or decrease the distance between the spray heads and the pavement surface, and/or change the orientation of one or more spray heads relative to the surface and/or each other, depending on the capabilities of the equipment, to reduce or eliminate the detected condition. These techniques may also be used to identity the specific spray head or heads creating either condition, assisting in effective identification and correction of the problem.

Excessive and insufficient density of marking may also occur on a transient basis as the result of temporary issues such as inconsistencies in the density of material being sprayed from moment to moment, or the occasional presence of air bubbles in the flow of material being sprayed. It may therefore be desirable or necessary to provide a threshold of excessive or insufficient marking density below which no corrective action will be indicated. Such a threshold may be based on a determination of the degree, duration, or physical dimensions of excessive or insufficient marking on the pavement surface.

Figure 10A:
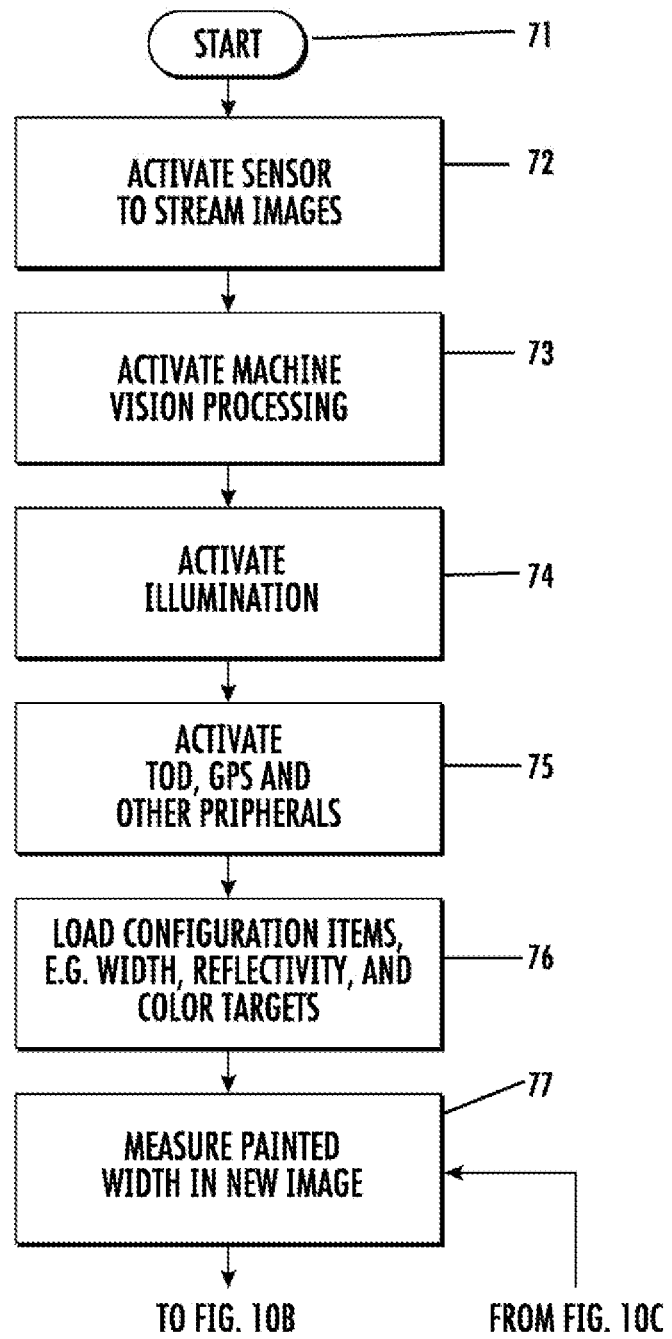
FIGS. 10A-10C are a depiction of a process for material marking.
Figure 10B:
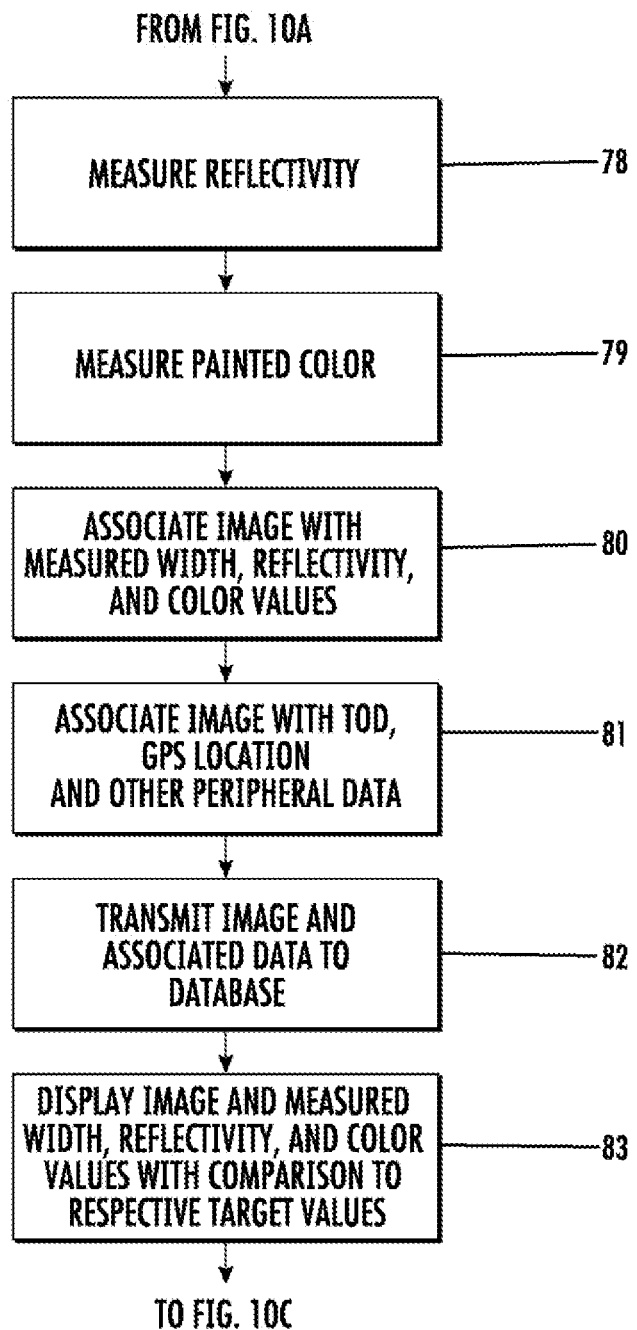
Figure 10C:
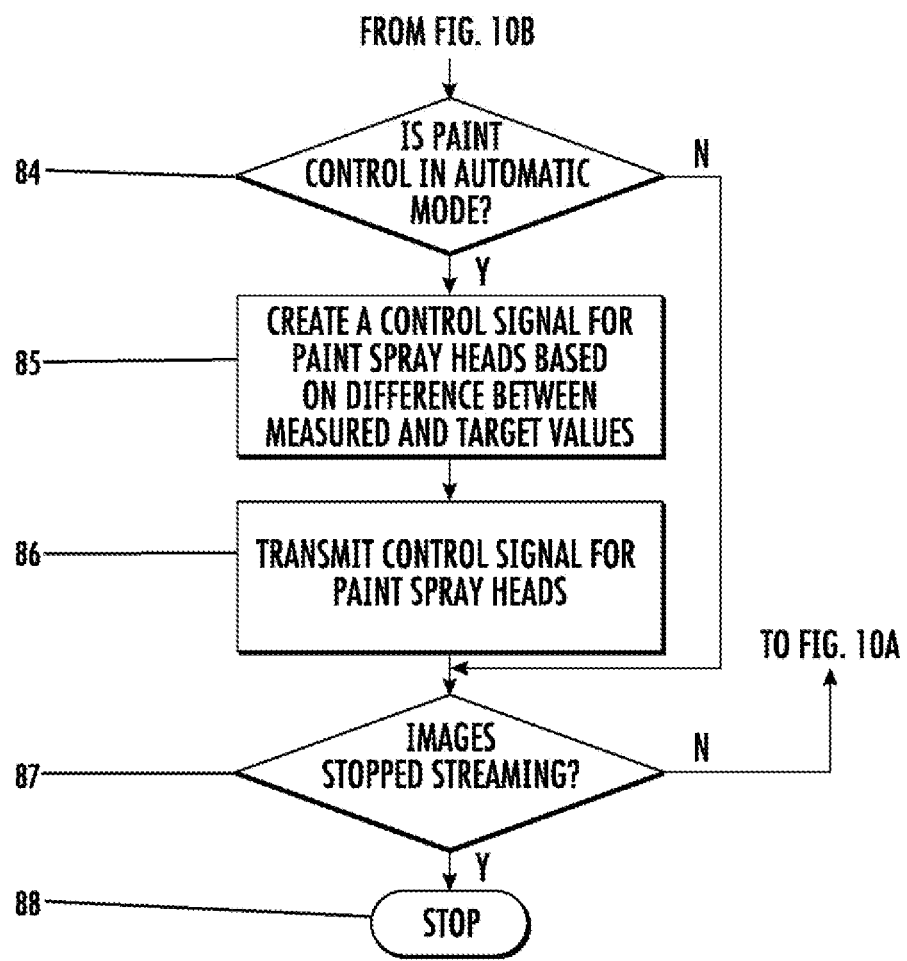

FIGS. 10A-10C present an exemplary approach by which the present process may be practiced for marking, using a camera as an example of a condition sensor. After starting the process in step 71, the camera is activated in step 72 to stream images of the portion of the pavement surface within its field of view to the computing platform, where machine vision processing is activated in step 73. Illumination is activated in step 74 to illuminate the portion of the pavement surface being captured. Additional sensor inputs are also activated in step 75, such as time-of-day and location, and configuration parameters such as line width, reflectivity, and color targets are loaded in the processor in step 76.

Once marking starts, the width, reflectivity, and color of the resulting paint line or stripe, as captured by the image sensor, are measured in steps 77, 78, and 79, respectively, and associated with the image in step 80. The image is similarly associated with the corresponding time-of-day, location, and other peripheral data in step 81. The image and associated data may then be transmitted to a central server, database, or other location in step 82, and displayed in connection with their respective target values in step 83. The process then checks whether the paint control is in automatic mode in step 84 and, if it is not, skips to step 87 below.

If the measured data varies from the target value by a predetermined threshold and the painting system is under automatic control as determined in step 84, the computing platform may generate one or more condition control signals in step 85 based on the measured variance or variances, and transmit the condition control signal or signals to the marking system in step 86. The process then determines whether images from the image sensor have stopped streaming in step 87. If images have stopped streaming, the process stops at step 88. If images have not stopped streaming, the process goes to step 77 and iterates by again measuring the width, reflectivity, and color of a paint line or stripe captured by the image sensor; associating those with the image; associating the image with the corresponding time-of-day, location, and other peripheral data; transmitting the image and associated data to a server, database, or other location; displaying the image in connection with comparison to its respective target values; creating one or more condition control signals if there is a variance that exceeds a predetermined threshold; transmitting the one or more condition control signals to the marking system; and determining whether images from the image sensor have stopped streaming.

Although the process steps described in this application have of necessity been presented in a certain order, the use of a specific order is not limiting on, or necessarily required to practice, the present method. Rather, any order may be used that is logically possible and consistent with the desired outcome.

Figure 11A:
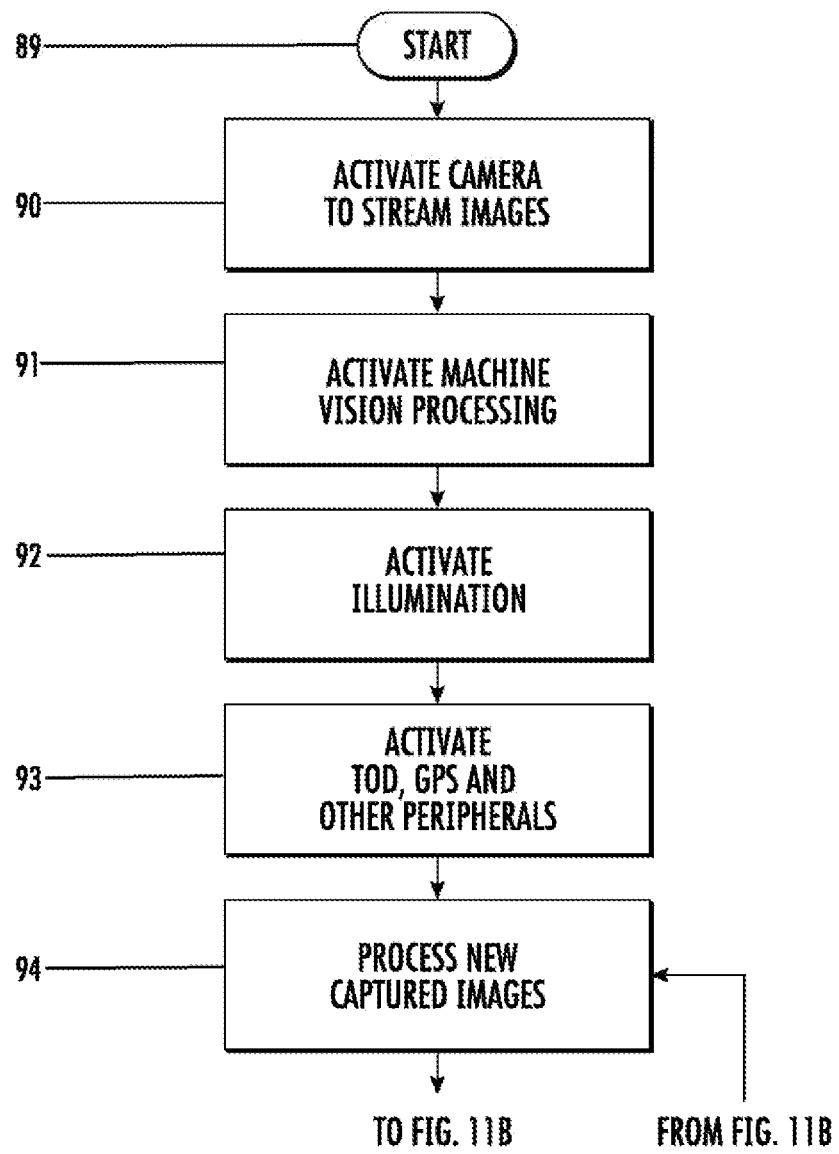
FIGS. 11A-11B are a depiction of a process for assessing the condition of a portion of a runway surface.
Figure 11B:
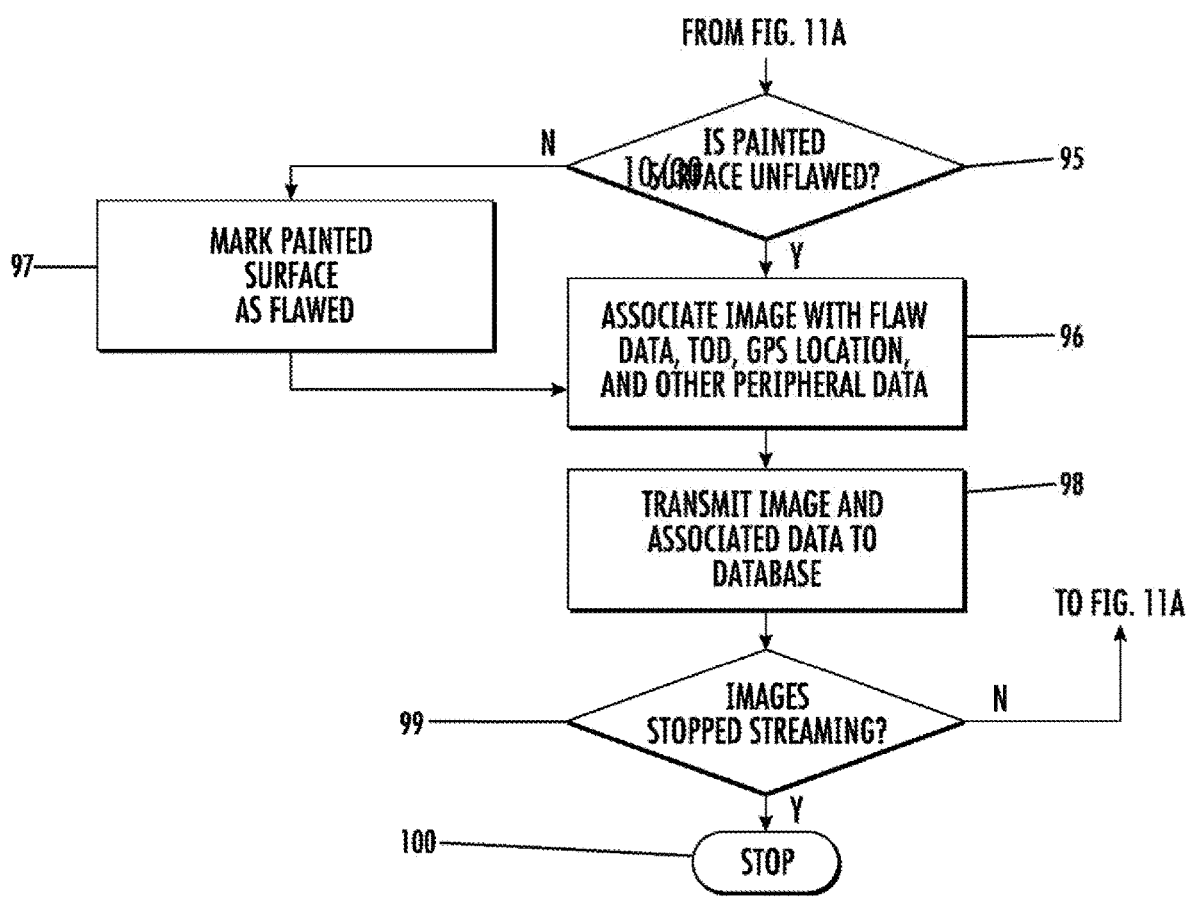

FIGS. 11A-11B present an exemplary approach by which the present process may be practiced for assessment of a painted surface, using a camera as an example of a condition sensor. After starting the process in step 89, the camera is activated in step 90 to stream images of the portion of the painted pavement surface within its field of view to the computing platform, where machine vision processing is activated in step 91. Illumination is activated in step 92 to illuminate the portion of the painted pavement surface being captured. Additional sensor inputs are activated in step 93, such as time-of-day and location. A new captured image is processed by the computing platform in step 94 and analyzed in step 95 to determine whether a flaw is present, such as missing paint or paint of the wrong color. If a flaw is detected the image is tagged as such in step 97, and associated with one or more of flaw data, time-of-day, location, and possibly other peripheral data in step 96. If no flaw is detected the image is associated with one or more of flaw data, time-of-day, location, and possibly other peripheral data in step 96. In either event the image is then transmitted to a server, database, or other location in step 98. The process then determines whether images from the image sensor have stopped streaming in step 99. If images have stopped streaming, the process stops at step 100.

If images have not stopped streaming, the process goes to step 94 and iterates by again processing a new captured image using the computing platform; analyzing the image to determine whether a flaw is present; if so, tagging the image with flaw data; whether or not a flaw is present, associating the image with one or more of flaw data, time-of-day, location, and possibly other peripheral data; transmitting the image to a server, database, or other location; and determining whether images from the image sensor have stopped streaming.

It will be apparent that the above examples may be readily adapted to use for other functions, including but not limited to measuring paint depth, assessing the cure state of paint, assessing paint layer delamination, assessing reflectivity, detecting pavement surface contamination, removing pavement surface contamination, and detecting foreign object debris.

The data generated and collected using the present process may find a number of uses. Data may be used in real time to ensure proper placement, or correction, of markings to ensure that they are present at the correct location, of the right dimensions, having the correct color, and/or possessing the correct retro-reflectivity. Alternatively, data may be used in real time to ensure proper removal of pavement markings or pavement surface contaminants by assessing the condition of a pavement surface before and/or after cleaning.

Such data may also be stored for later use, such as to generate work orders for pavement maintenance; to estimate material and/or manpower requirements for pavement maintenance; to check against and/or, as needed, replenish inventory of supplies needed for pavement maintenance; to create design, as-built, or other maps of pavement such as runways, runway areas, roadways, or roadway areas; or to document compliance with applicable rules and regulations. A historical record of such data may be used to generate a predictive model of which areas of pavement will need what types of maintenance at what times. Such data may also be used to better understand, and anticipate or mitigate against, degradation of pavement conditions. For example, a pattern of pavement surface cracks that grows over time may indicate the presence and location of a subsurface fault, or of defective pavement material; or, the data may indicate a correlation with a pattern of aircraft landings and/or take-offs, including aircraft types; or a correlation with weather conditions, such as the directions of prevailing winds or recurring storm fronts.

In another embodiment, the present disclosure is directed to a method and apparatus for locating the position of a mobile platform associated with a vehicle, using a known offset.

Figure 17:
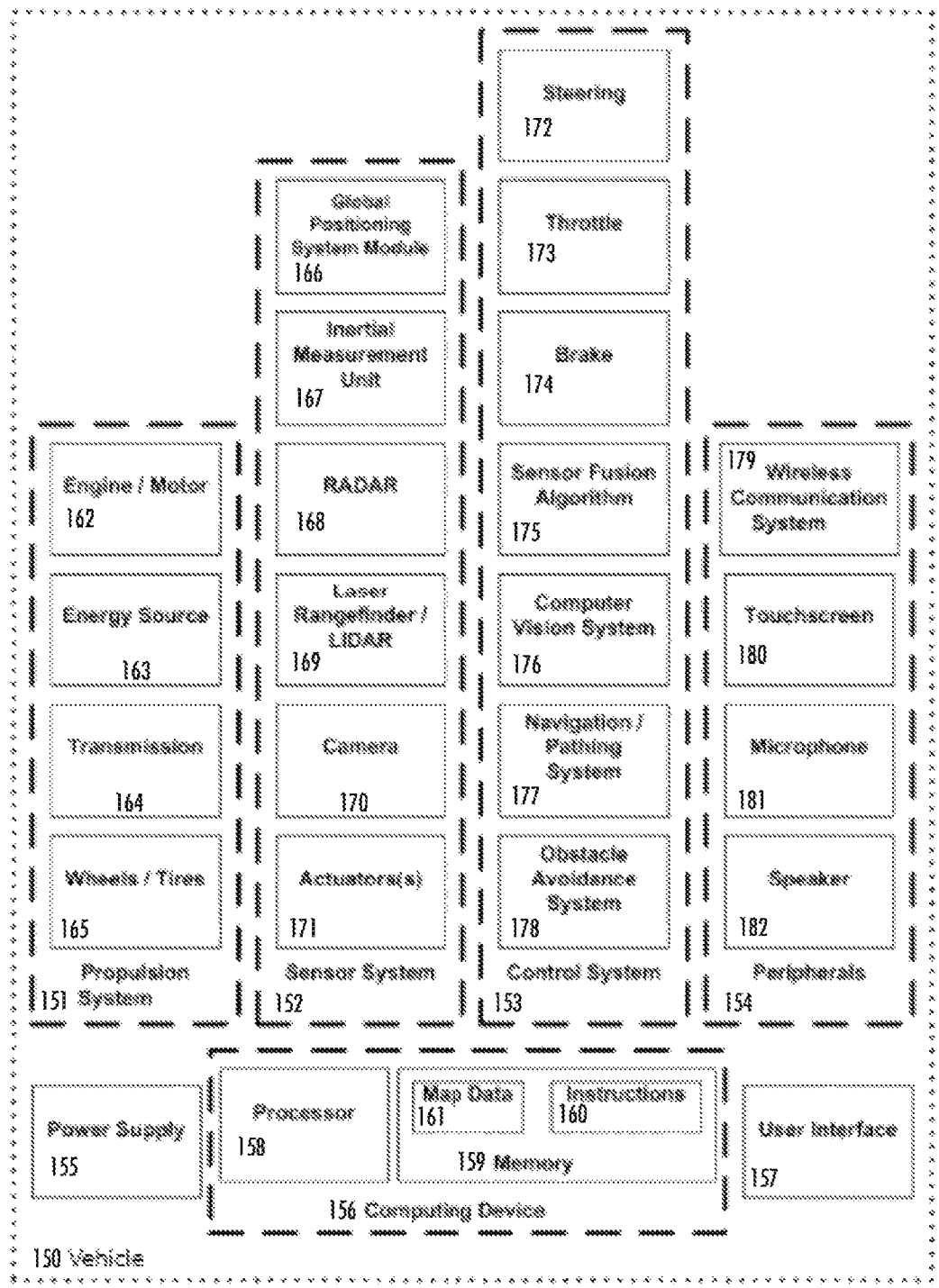
FIG. 17 is a representative block diagram of a connected/autonomous vehicle.

FIG. 17 is a simplified block diagram of an example vehicle 150, in accordance with an example embodiment. Components coupled to or included in the vehicle 150 may include a propulsion system 151, a sensor system 152, a control system 153, peripherals 154, a power supply 155, a computing device 156, and a user interface 157. The computing device 156 may include a processor 158, and a memory 159. The computing device 156 may be a controller, or part of the controller, of the vehicle 150. The memory 159 may include instructions 160 executable by the processor 158, and may also store map data 161. Components of the vehicle 150 may be configured to work in an interconnected fashion with each other and/or with other components coupled to respective systems. For example, the power supply 155 may provide power to all the components of the vehicle 150. The computing device 156 may be configured to receive information from and control the propulsion system 151, the sensor system 152, the control system 153, and the peripherals 154. The computing device 156 may be configured to generate a display of images on and receive inputs from the user interface 157.

In other examples, the vehicle 150 may include more, fewer, or different systems, and each system may include more, fewer, or different components. Additionally, the systems and components shown may be combined or divided in any number of ways.

The propulsion system 151 may be configured to provide powered motion for the vehicle 150. As shown, the propulsion system 151 includes an engine/motor 162, an energy source 163, a transmission 164, and wheels/tires 165.

The engine/motor 162 may be or include any combination of an internal combustion engine, an electric motor, a steam engine, and a Stirling engine, etc. Other motors and engines are possible as well. In some examples, the propulsion system 151 could include multiple types of engines and/or motors. For instance, a gas-electric hybrid car could include a gasoline engine and an electric motor. Other examples are possible.

The energy source 163 may be a source of energy that powers the engine/motor 162 in full or in part. That is, the engine/motor 162 may be configured to convert the energy source 163 into mechanical energy. Examples of energy sources 163 include gasoline, diesel, other petroleum-based fuels, propane, other compressed gas-based fuels, ethanol, solar panels, batteries, and other sources of electrical power. The energy source(s) 163 could additionally or alternatively include any combination of fuel tanks, batteries, capacitors, and/or flywheels. In some examples, the energy source 163 may provide energy for other systems of the vehicle 150 as well. The transmission 164 may be configured to transmit mechanical power from the engine/motor 162 to the wheels/tires 165. To this end, the transmission 164 may include a gearbox, clutch, differential, drive shafts, and/or other elements. In examples where the transmission 164 includes drive shafts, the drive shafts could include one or more axles that are configured to be coupled to the wheels/tires 165.

The wheels/tires 165 of vehicle 150 could be configured in various formats, including a unicycle, bicycle/motorcycle, tricycle, or car/truck four-wheel format. Other wheel/tire formats are possible as well, such as those including six or more wheels. The wheels/tires 165 of vehicle 150 may be configured to rotate differentially with respect to other wheels/tires 165. In some examples, the wheels/tires 165 may include at least one wheel that is fixedly attached to the transmission 164 and at least one tire coupled to a rim of the wheel that could make contact with the driving surface. The wheels/tires 165 may include any combination of metal and rubber, or combination of other materials.

The propulsion system 151 may additionally or alternatively include components other than those shown.

The sensor system 152 may include a number of sensors configured to sense information about an environment in which the vehicle 150 is located. As shown, the sensors of the sensor system include a Global Positioning System (GPS) module 166, an inertial measurement unit (IMU) 167, a radio detection and ranging (RADAR) unit 168, a laser rangefinder and/or light detection and ranging (LIDAR) unit 169, a camera 170, and actuators 171 configured to modify a position and/or orientation of the sensors. The sensor system 152 may include additional sensors as well, including, for example, sensors that monitor internal systems of the vehicle 150 (e.g., an $O_2$ monitor, a fuel gauge, an engine oil temperature, etc.). Other sensors are possible as well.

The GPS module 166 may be any sensor configured to estimate a geographic location of the vehicle 150. To this end, the GPS module 166 may include a transceiver configured to estimate a position of the vehicle 150 with respect to the Earth, based on satellite-based positioning data. In an example, the computing device 156 may be configured to use the GPS module 166 in combination with the map data 161 to estimate a location of a lane boundary on road on which the vehicle 150 may be traveling on. The GPS module 166 may take other forms as well.

The IMU 167 may be any combination of sensors configured to sense position and orientation changes of the vehicle 150 based on inertial acceleration. In some examples, the combination of sensors may include, for example, accelerometers and gyroscopes. Other combinations of sensors are possible as well.

The RADAR unit 168 may be considered as an object detection system that may be configured to use radio waves to determine characteristics of the object such as range, altitude, direction, or speed of the object. The RADAR unit 168 may be configured to transmit pukes of radio waves or microwaves that may bounce off any object in a path of the waves. The object may return a part of energy of the waves to a receiver (e.g., dish or antenna), which may be part of the RADAR unit 168 as well. The RADAR unit 168 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 169 may include a sensor configured to sense or detect objects in an environment in which the vehicle 150 is located using light. Generally, LIDAR is an optical remote sensing technology that can measure distance to, or other properties of, a target by illuminating the target with light. As an example, the LIDAR unit 169 may include a laser source and/or laser scanner configured to emit laser pukes and a detector configured to receive reflections of the laser pukes. For example, the LIDAR unit 169 may include a laser range finder reflected by a rotating mirror, and the laser is scanned around a scene being digitized, in one or two dimensions, gathering distance measurements at specified angle intervals. In examples, the LIDAR unit 169 may include components such as light (e.g., laser) source, scanner and optics, photo-detector and receiver electronics, and position and navigation system.

In an example, the LIDAR unit 169 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically, light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and NA/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high-speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 169.

A point cloud may include a set of vertices in a 3D coordinate system. These vertices may be defined by X, Y, and Z coordinates, for example, and may represent an external surface of an object. The LIDAR unit 169 may be configured to create the point cloud by measuring a large number of points on the surface of the object, and may output the point cloud as a data file. As the result of a 3D scanning process of the object by the LIDAR unit 169, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud, Other example techniques may include converting the point cloud into a volumetric distance field and reconstructing an implicit surface so defined through a marching cubes algorithm.

The camera 170 may be any camera (e.g., a still camera, a video camera, etc.) configured to capture images of the environment in which the vehicle 150 is located. To this end, the camera may be configured to detect visible light, or may be configured to detect light from other portions of the spectrum, such as infrared or ultraviolet light. Other types of cameras are possible as well. The camera 170 may be a two-dimensional detector, or may have a three-dimensional spatial range. In some examples, the camera 170 may be, for example, a range detector configured to generate a two-dimensional image indicating a distance from the camera 170 to a number of points in the environment. To this end, the camera 170 may use one or more range detecting techniques. For example, the camera 170 may be configured to use a structured light technique in which the vehicle 150 illuminates an object in the environment with a predetermined light pattern, such as a grid or checkerboard pattern and uses the camera 170 to detect a reflection of the predetermined light pattern off the object. Based on distortions in the reflected light pattern, the vehicle 150 may be configured to determine the distance to the points on the object. The predetermined light pattern may comprise infrared light, or light of another wavelength.

The actuators 171 may, for example, be configured to modify a position and/or orientation of the sensors.

The sensor system 152 may additionally or alternatively include components other than those shown.

The control system 153 may be configured to control operation of the vehicle 150 and its components. To this end, the control system 153 may include a steering unit 172, a throttle 173, a brake unit 174, a sensor fusion algorithm 175, a computer vision system 176, a navigation or pathing system 177, and an obstacle avoidance system 178.

The steering unit 172 may be any combination of mechanisms configured to adjust the heading or direction of the vehicle 150.

The throttle 173 may be any combination of mechanisms configured to control the operating speed and acceleration of the engine/motor 162 and, in turn, the speed and acceleration of the vehicle 150.

The brake unit 174 may be any combination of mechanisms configured to decelerate the vehicle 150. For example, the brake unit 174 may use friction to slow the wheels/tires 165. As another example, the brake unit 174 may be configured to be regenerative and convert the kinetic energy of the wheels/tires 165 to electric current. The brake unit 174 may take other forms as well.

The sensor fusion algorithm 175 may include an algorithm (or a computer program product storing an algorithm) executable by the computing device 156, for example. The sensor fusion algorithm 175 may be configured to accept data from the sensor system 152 as an input. The data may include, for example, data representing information sensed at the sensors of the sensor system 152, The sensor fusion algorithm 175 may include, for example, a Kalman filter, a Bayesian network, or another algorithm. The sensor fusion algorithm 175 further may be configured to provide various assessments based on the data from the sensor system 152, including, for example, evaluations of individual objects and/or features in the environment in which the vehicle 150 is located, evaluations of particular situations, and/or evaluations of possible impacts based on particular situations. Other assessments are possible as well.

The computer vision system 176 may be any system configured to process and analyze images captured by the camera 170 in order to identify objects and/or features in the environment in which the vehicle 150 is located, including, for example, lane information, traffic signals and obstacles, To this end, the computer vision system 176 may use an object recognition algorithm, a Structure from Motion (SFM) algorithm, video tracking, or other computer vision techniques. In some examples, the computer vision system 176 may additionally be configured to map the environment, follow objects, estimate speed of objects, etc.

The navigation and pathing system 177 may be any system configured to determine a driving path for the vehicle 150. The navigation and pathing system 177 may additionally be configured to update the driving path dynamically while the vehicle 150 is in operation. In some examples, the navigation and pathing system 177 may be configured to incorporate data from the sensor fusion algorithm 175, the GPS module 166, and one or more predetermined maps so as to determine the driving path for the vehicle 150.

The obstacle avoidance system 178 may be any system configured to identify, evaluate, and avoid or otherwise negotiate obstacles in the environment in which the vehicle 150 is located.

The control system 153 may additionally or alternatively include components other than those shown.

Peripherals 154 may be configured to allow the vehicle 150 to interact with external sensors, other vehicles, and/or a user. To this end, the peripherals 154 may include, for example, a wireless communication system 179, a touchscreen 180, a microphone 181, and/or a speaker 158.

The wireless communication system 179 may be any system configured to be wirelessly coupled to one or more other vehicles, sensors, or other entities, either directly or via a communication network. To this end, the wireless communication system 179 may include an antenna and a chipset for communicating with the other vehicles, sensors, or other entities either directly or over an aft interface. The chipset or wireless communication system 179 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 179 may take other forms as well.

The touchscreen 180 may be used by a user to input commands to the vehicle 150, To this end, the touchscreen 180 may be configured to sense at least one of a position and a movement of a user's finger via capacitive sensing, resistance sensing, or a surface acoustic wave process, among other possibilities. The touchscreen 180 may be capable of sensing finger movement in a direction parallel or planar to the touchscreen surface, in a direction normal to the touchscreen surface, or both, and may also be capable of sensing a level of pressure applied to the touchscreen surface. The touchscreen 180 may be formed of one or more translucent or transparent insulating layers and one or more translucent or transparent conducting layers. The touchscreen 180 may take other forms as well.

The microphone 181 may be configured to receive audio (e.g., a voice command or other audio input) from a user of the vehicle 150. Similarly, the speakers 158 may be configured to output audio to the user of the vehicle 150.

The peripherals 154 may additionally or alternatively include components other than those shown.

The power supply 155 may be configured to provide power to some or all of the components of the vehicle 150. To this end, the power supply 155 may include, for example, a rechargeable lithium-ion or lead-acid battery. In some examples, one or more banks of batteries could be configured to provide electrical power. Other power supply materials and configurations are possible as well. In some examples, the power supply 155 and energy source 163 may be implemented together, as in some all-electric cars.

The processor 158 included in the computing device 156 may comprise one or more general-purpose processors and/or one or more special-purpose processors (e.g., image processor, digital signal processor, etc.). To the extent that the processor 158 includes more than one processor, such processors could work separately or in combination. The computing device 156 may be configured to control functions of the vehicle 150 based on input received through the user interface 157, for example.

The memory 159, in turn, may comprise one or more volatile and/or one or more non-volatile storage components, such as optical, magnetic, and/or organic storage, and the memory 159 may be integrated in whole or in part with the processor 158. The memory 159 may contain the instructions 160 (e.g., program logic) executable by the processor 158 to execute various vehicle functions, including any of the functions or methods described herein.

The components of the vehicle 150 could be configured to work in an interconnected fashion with other components within and/or outside their respective systems. To this end, the components and systems of the vehicle 150 may be communicatively linked together by a system bus, network, and/or other connection mechanism (not shown).

Further, while each of the components and systems is shown to be integrated in the vehicle 150, in some examples, one or more components or systems may be removably mounted on or otherwise connected (mechanically or electrically) to the vehicle 150 using wired or wireless connections.

The vehicle 150 may include one or more elements in addition to or instead of those shown. For example, the vehicle 150 may include one or more additional interfaces and/or power supplies. Other additional components are possible as well. In these examples, the memory 159 may further include instructions executable by the processor 158 to control and/or communicate with the additional components.

Figure 18:
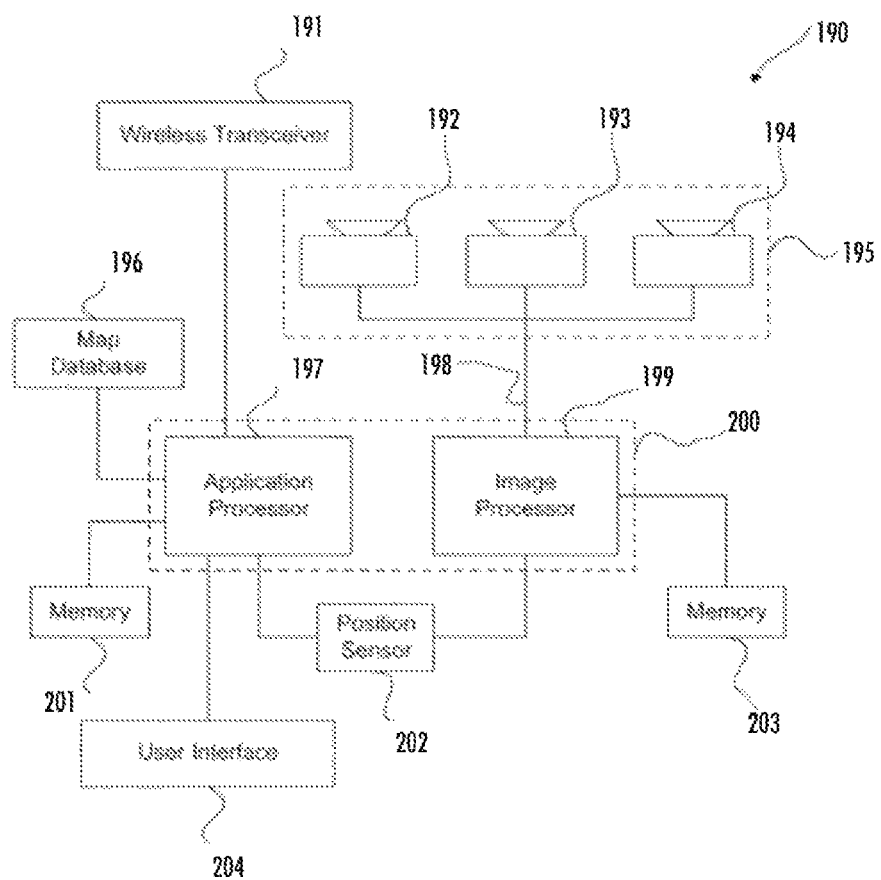
FIG. 18 is a representative block diagram of a connected/autonomous vehicle system.

FIG. 18 is a block diagram representation of a system 190 which may include various components depending on the requirements of a particular implementation. In some embodiments, system 190 may include a processing unit 200, an image acquisition unit 195, a position sensor 202, one or more memory units 201, 203, a map database 196, a user interface 204, and a wireless transceiver 191. Processing unit 200 may include one or more processing devices. In some embodiments, processing unit 200 may include an application processor 197, an image processor 199, and/or any other suitable processing device. Similarly, image acquisition unit 195 may include any number of image acquisition devices and components depending on the requirements of a particular application. In some embodiments, image acquisition unit 195 may include one or more image capture devices (e.g., cameras), such as image capture device 192, image capture device 193, and image capture device 194. System 190 may also include a data interface 198 communicatively connecting processing unit 200 to image acquisition unit 195. For example, data interface 198 may include any wired and/or wireless link or links for transmitting image data acquired by image accusation unit 195 to processing unit 200.

Figure 19:
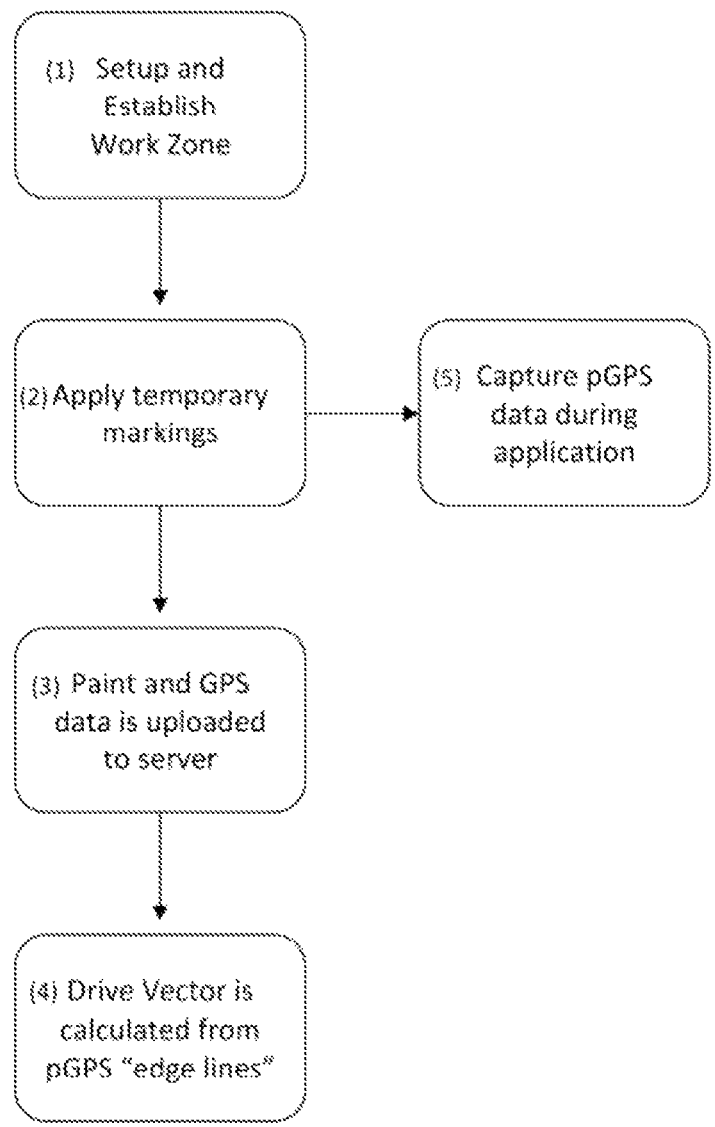
FIG. 19 is BIB a representative flow chart showing capture of VMX data during creation of a work zone.

FIG. 19 shows one process for capturing pGPS data and calculating a drive vector when a work zone is set up. pGPS data is captured and stored as temporary pavement segment markings are applied in the work zone. The paint and pGPS data are transmitted to a server, which may be but is not necessarily cloud-based, and provided to a processor for calculation of a drive vector from pGPS data representing edge lines of the pavement segment.

Once collected, VMX data representing actual or virtual markings can be used for various purposes, not only by a CAV, but also by standard modern vehicles with lane-keeping and similar awareness technology. In the case of CAVs this coordinate data can be continuously downloaded, to simplify the on-vehicle navigation calculations. This redundant dataset can be used in conjunction with the sensors, such as radar, imager, and LiDAR, to determine the safest and most efficient route through which to navigate a typical roadway.

In the case of non-CAVs, the VMX dataset can be used to assist navigation by the human driver, particularly in environments where visibility is restricted, such as during inclement weather like a snowstorm. The left and right edge lines, as well as a predetermined drive vector, can be used for the safe navigation of the off-ramp of a highway. With the appropriate hardware on-board, the VMX data shown in this figure could be displayed on a semi-transparent "Heads Up Display" (HUD), or windshield. The VMX data would be represented as lines on the HUD indicating the actual location of the markings in the real world. This would provide the additional context of where the edge markings are in relation to the vehicle's current position, assisting in safe navigation of the off-ramp. This can be used in any situation where overlaid representation of marking location would be useful, not just the off-ramp example shown here.

Figure 20:
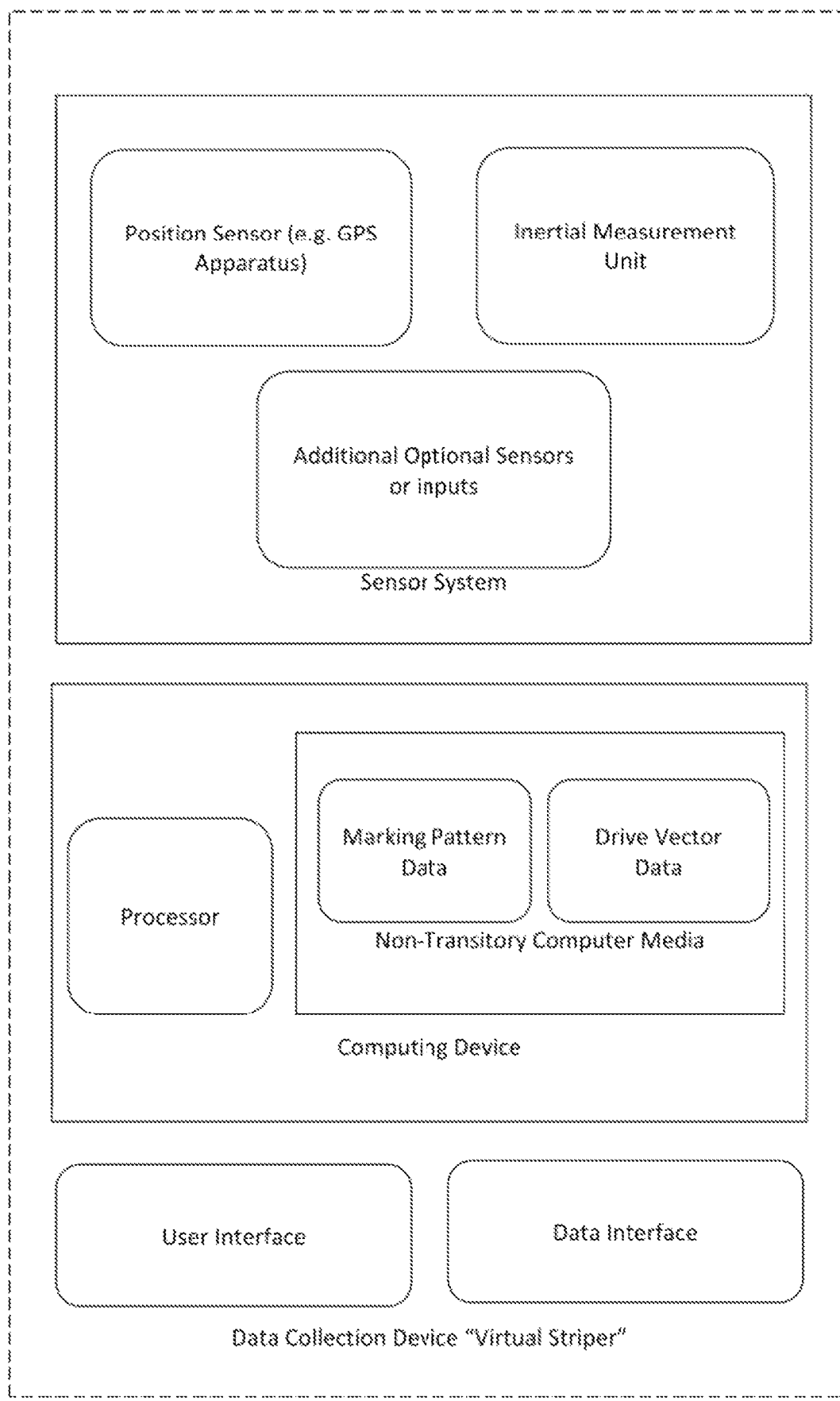
FIG. 20 is a representative block diagram of a device for use in collecting VMX data relating to markings.

With reference to FIG. 20, the exemplary data collection system, referred to for purposes of convenience only as a "Virtual Striper", may include a sensor system having a position sensor, such as a GNSS sensor; an inertial measurement unit; and additional sensors and/or inputs. The system may further include a computing device with a processor, and non-transitory computer media in which marking pattern data and drive vector data is stored, and which is accessible via a user and data interfaces.

Figure 21:
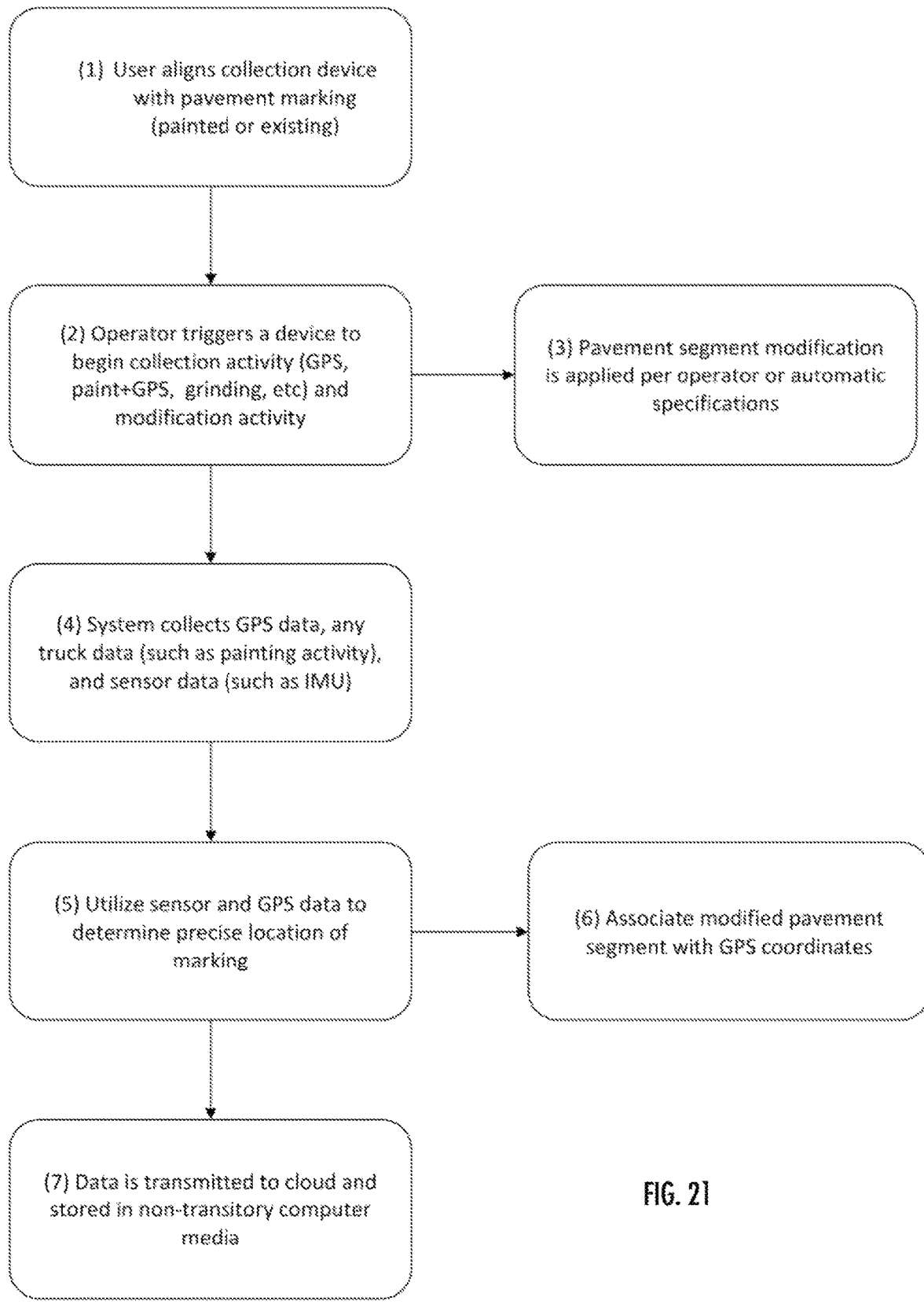
FIG. 21 is a representative flow chart showing a process for pavement segment modification using VMX data.

FIG. 21 provides approach to capturing VMX data during the process of modifying a pavement segment, as by painting or removal of markings. Here, an operator might (1) align a collection device, such as a GPS antenna, with the pavement segment marking. (2) The operator then triggers the device to both begin collecting data, and initiate modification of the pavement segment. At this stage the operator would manually enter any relevant data such as marking pattern, direction of travel, road name, and so on via the user interface. (3) Depending on the modification being carried out, painting, removal, or other modification is applied to the pavement segment. (4) The present system would begin logging all available data from the various information sources and sensors, including marking, removal, or other modification data. As the operator navigates along the length of the marking, the system continues to log the data, gathering a trail of information for the duration of the measurement. (5) Whether during or following the collection, the data from the various sources is then used to determine the precise location of the markings or other modification. The system may use a Bayesian model-based filter which accounts for the raw geographical location of the GPS antenna and the data collected by the plurality of sensors. (6) The location of the modified pavement segment is associated with location/position information, such as GPS coordinates. (7) Lastly, this data is transmitted to the remote server via a wireless transceiver which may include one or more devices configured to exchange transmissions over an air interface to one or more networks (e.g., cellular, the Internet) by use of a radio frequency, infrared frequency, magnetic field, or an electric field. As previously discussed, the wireless transceiver may use any known standard to transmit and/or receive data, including but not limited to P2P, V2V, Wi-Fi, Bluetooth®, Bluetooth Smart, 802.15.4, ZigBee, and cellular including 5G.

The present disclosure includes a pavement segment location data collection system for obtaining VMX data as described herein. Such data may be obtained without using the system to perform any pavement segment modification, and the system may not include any pavement segment modification capability. One example of such a pavement segment location data collection system includes a pavement segment alignment portion to be aligned with a pavement segment for which VMX data is desired. The system also includes a GNSS module and at least one additional position sensor. The GNSS module and additional position sensor are configured to provide location data to at least one processor. The at least one processor uses the location data to (a) calculate a location of the pavement segment alignment module; (b) using the location of the pavement segment alignment module, calculate a location of the pavement segment; and (c) using the location of the pavement segment, calculate, using non-Euclidean geometry, a polynomial representation of a trajectory that can be used by a connected and autonomous vehicle in navigating the pavement segment.

In order to use the system, the pavement segment alignment module is aligned with a pavement segment; the data collection system is activated to initiate calculation of the location of the pavement segment and of the polynomial representation of a trajectory that can be used by a connected and autonomous vehicle in navigating the pavement segment; and at least one of the location of the pavement segment, and the polynomial representation of a navigation trajectory, is transmitted to non-transitory computer-readable storage media, which may be local to or remote from the pavement segment data collection system.

Figure 22:
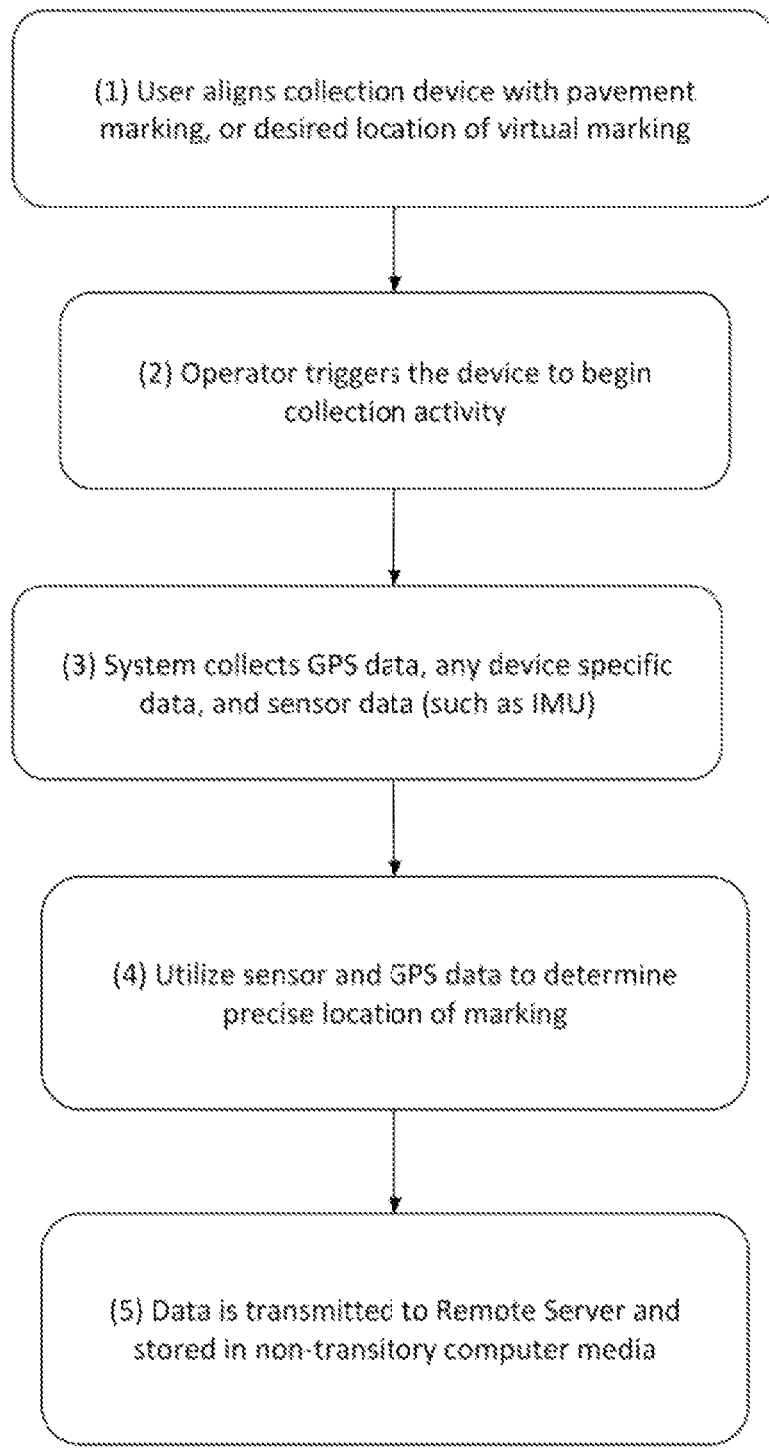
FIG. 22 is a representative flow chart showing a process for capturing and storing VMX data regarding existing or virtual marking.

With reference to FIG. 22, an operator might (1) align a collection device, such as a GPS antenna, with the pavement segment marking. (2) The operator then triggers the device to begin collecting data. At this stage the operator would manually enter any relevant data such as marking pattern, direction of travel, road name, and so on via the user interface. (3) The present system would begin logging all available data from the various information sources and sensors. As the operator navigates along the length of the marking, the system continues to log the data, gathering a trail of information for the duration of the measurement. (4) Whether during or following the collection, the data from the various sources is then used to determine the precise location of the markings. The system may use a Bayesian model-based filter which accounts for the raw geographical location of the GPS antenna and the data collected by the plurality of sensors. (4) Lastly, this data is transmitted to the remote server via a wireless transceiver which may include one or more devices configured to exchange transmissions over an air interface to one or more networks (e.g., cellular, the Internet) by use of a radio frequency, infrared frequency, magnetic field, or an electric field. The wireless transceiver may use any known standard to transmit and/or receive data, as previously discussed.

Figure 23:
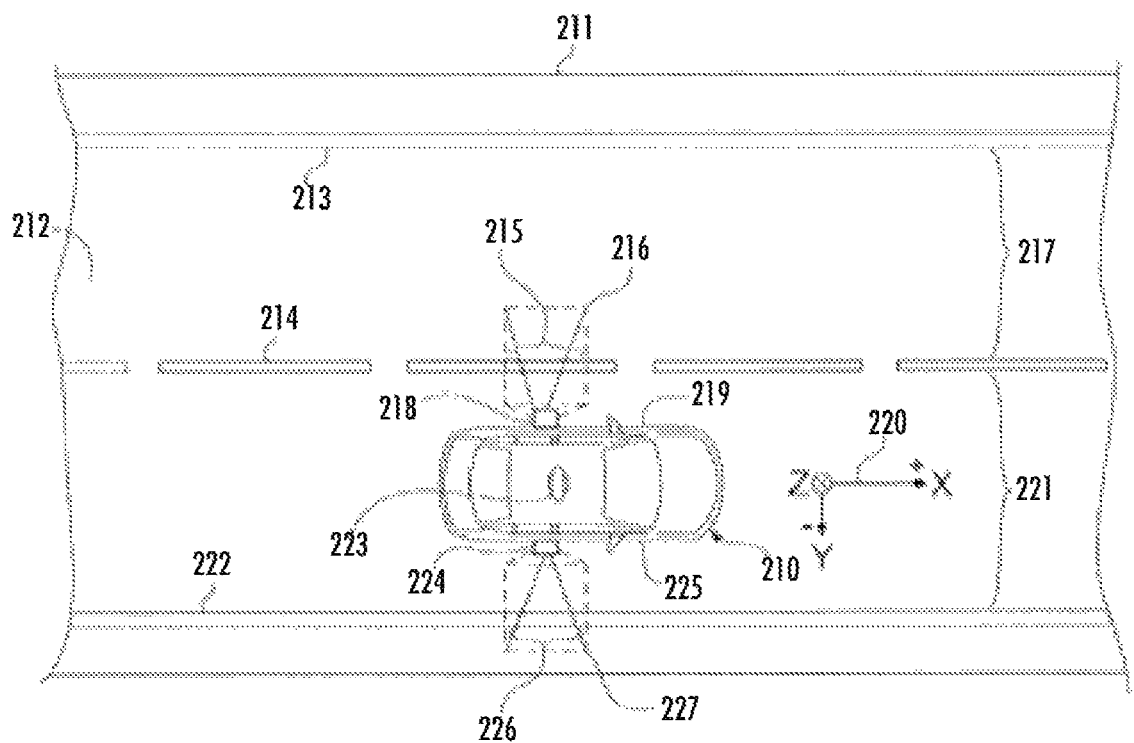
FIG. 23 is a top view of a vehicle having one embodiment of the invention and moving along a roadway lane defined by roadway marks.

FIG. 23 illustrates a top view of a moving vehicle 210 travelling along the X-axis defined by Cartesian coordinate system 220 and within a demarcated traffic lane 221 of a roadway 211. The roadway 211 has a paved top surface 212. The traffic lane 221 is demarcated with the pre-existing roadway dashed center mark 214 and the pre-existing roadway edge mark 222. In addition, a traffic lane 217 is demarcated also by the dashed center mark 214 and the roadway edge mark 213. The center mark 214 and the edge marks 213 and 222 are located on the top surface 212 of the roadway 211 and are usually composed of epoxy, paint (with or without reflective glass beads), thermoplastic markings, or other materials commonly used in the roadway marking industry. The center mark 214 and the edge mark 222 are visible from the moving vehicle 210. A left side panel 219 (conventionally referred to as the driver's side for American-built vehicles) of the vehicle 210 faces the center mark 214 and a right side panel 225 (conventionally referred to as the passenger's side for American-built vehicles) of the vehicle 210 faces the edge mark 222.

Figure 24:
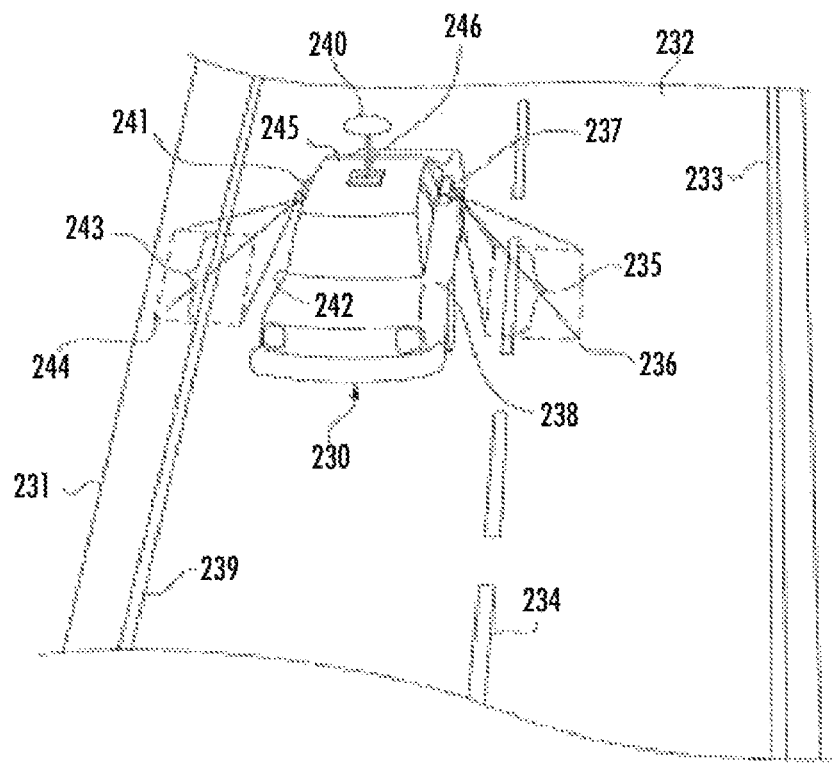
FIG. 24 is a front view of the vehicle shown in FIG. 6 illustrating the placement of the GPS antenna and side mounted imagers.

Referring now to FIGS. 23 and 24, the vehicle 210 has the fixed GPS antenna 223 supported above a roof 245 of the vehicle 210 by a support 246. The first imager 218 is mounted on the left side of vehicle 210 and is adjustably positioned to image an area 216 of the roadway top surface 212 to the left of the direction of travel of the vehicle 210 which includes a section 215 of the center mark 214. The second side mounted imager 224 is adjustably positioned onto the right side of vehicle 210 to image an area 227 of roadway top surface 212 which includes a section 226 of the edge mark 222. Further, it is understood that the first and second imagers 218 and 224 could be mounted in any suitable location (e.g., on the roof 245 of the vehicle 210 in close proximity to the left and right sides of vehicle 210 and similarly positioned to image the areas 216 and 227, respectively). The GPS receiver 240 is electrically connected to the GPS antenna 223 and is contained within the vehicle 210.

The description above refers to the standard direction for vehicular traffic defined for United States roadways. The preferred embodiment also applies to roadways having the direction of vehicle traffic defined opposite that of the United States such as that found in Europe. In this case, the second imager 224 would image the center mark 214 and the first imager 218 would image the edge mark 213. Further, the lane 217 could carry traffic in the opposite direction of the vehicle 210, or could be a second lane of a multi-lane highway carrying additional traffic in the same direction as the vehicle 210.

Figure 25:
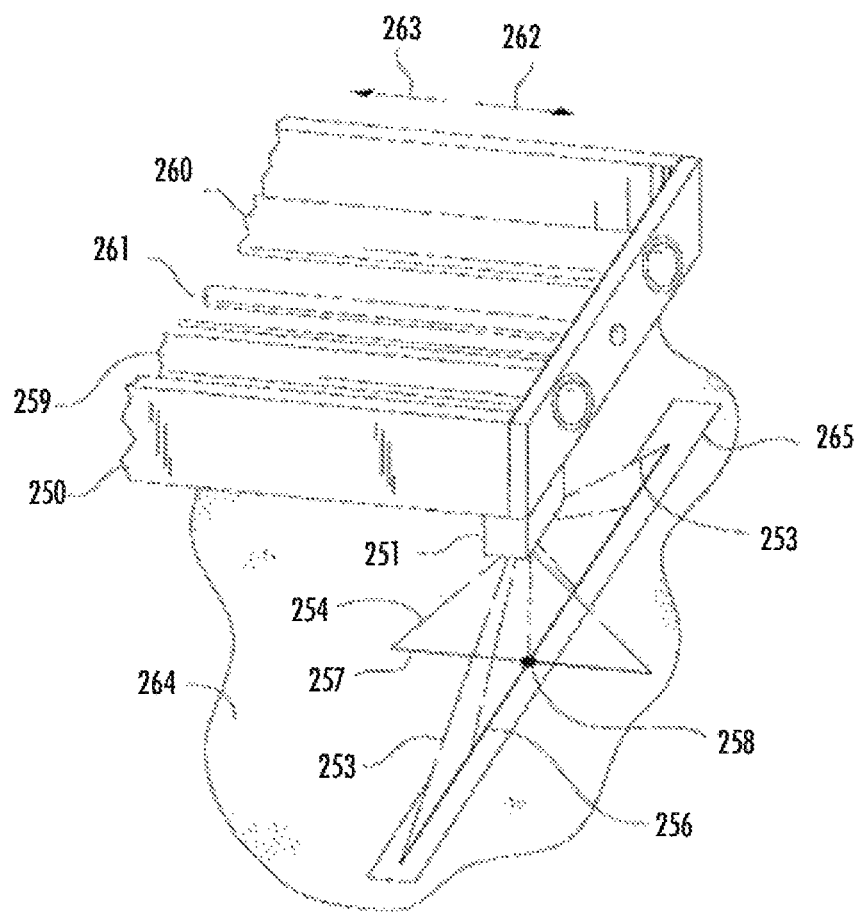
FIG. 25 illustrates a laterally extended carriage having a downwardly directed laser line positioned over and intersecting a roadway mark is
Figure 26:
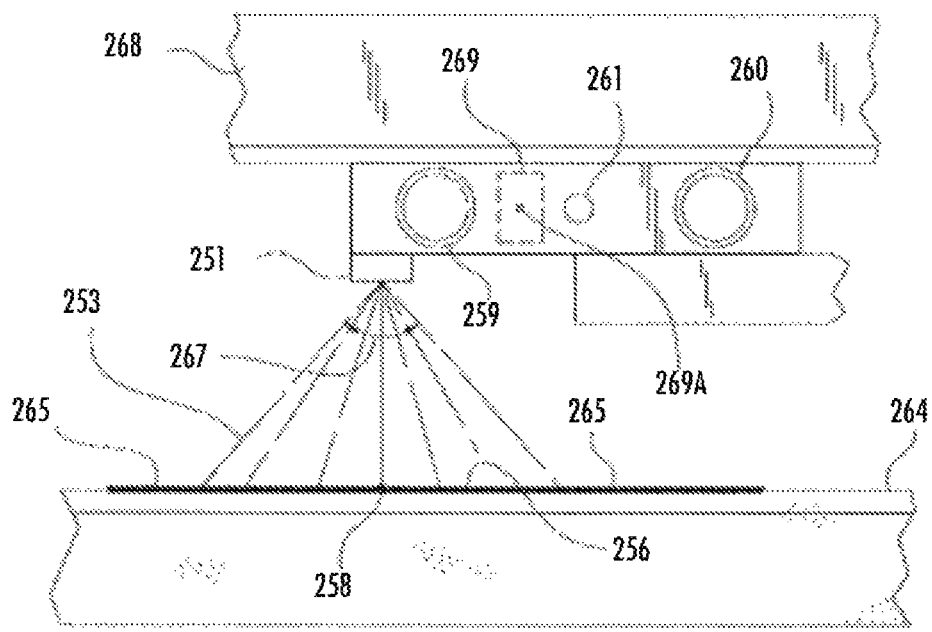
FIG. 26 illustrates a side planar view of the laterally extended carriage with the downwardly directed laser lines intersecting the roadway mark and surface.

According to another embodiment, the present invention provides an apparatus for manually determining the geographical location of a roadway mark using a visual projected laser cross hair line (or dot). Referring to FIGS. 25 and 26, a roadway surface 264 is shown having a pre-existing roadway mark 265. A carriage 250 is shown in a laterally extended position away from a body 268 of an associated vehicle (not shown). Attached to the outermost point of the carriage 250 is a conventional downwardly focused laser cross hair line generator 251 producing projected laser lines 253 and 254 (perpendicular to each other). The laser cross hair line generator 251 is rotatably positioned on the carriage 250 so that the projected laser line 253 is substantially parallel to the x-axis of the vehicle 1.

The projected laser line 253 is also characterized by a fan angle 267, and the laser line 254 is also characterized by a fan angle (not shown). The intersection of the laser lines 253 and 254 with the road surface 264 produces visual line patterns 256 and 257, respectively, which can be observed by the carriage operator (the projected laser lines 253 and 254 are reflected off of the roadway surface 264). The intersection of the projected laser lines 253 and 254 produce a visual intersection point 258.

Also shown in FIGS. 25 and 26 are lateral carriage support arms 259 and 260 and a hydraulic piston rod 261. The carriage operator has lateral control of the position of the carriage 250 in directions noted by arrows 262 and 263 (i.e., the lateral position of the carriage 250 can be manually adjusted) by controlling a hydraulic system which extends or retracts the hydraulic piston rod 261. Thus, the operator can laterally align the carriage 250 so that the visual line patterns 256 and 257 and intersection point 258 can be positioned over the lateral center of the roadway mark 265. The lateral position of the visual intersection point 258 is therefore determined by the linear distance sensor 269.

Figure 27:
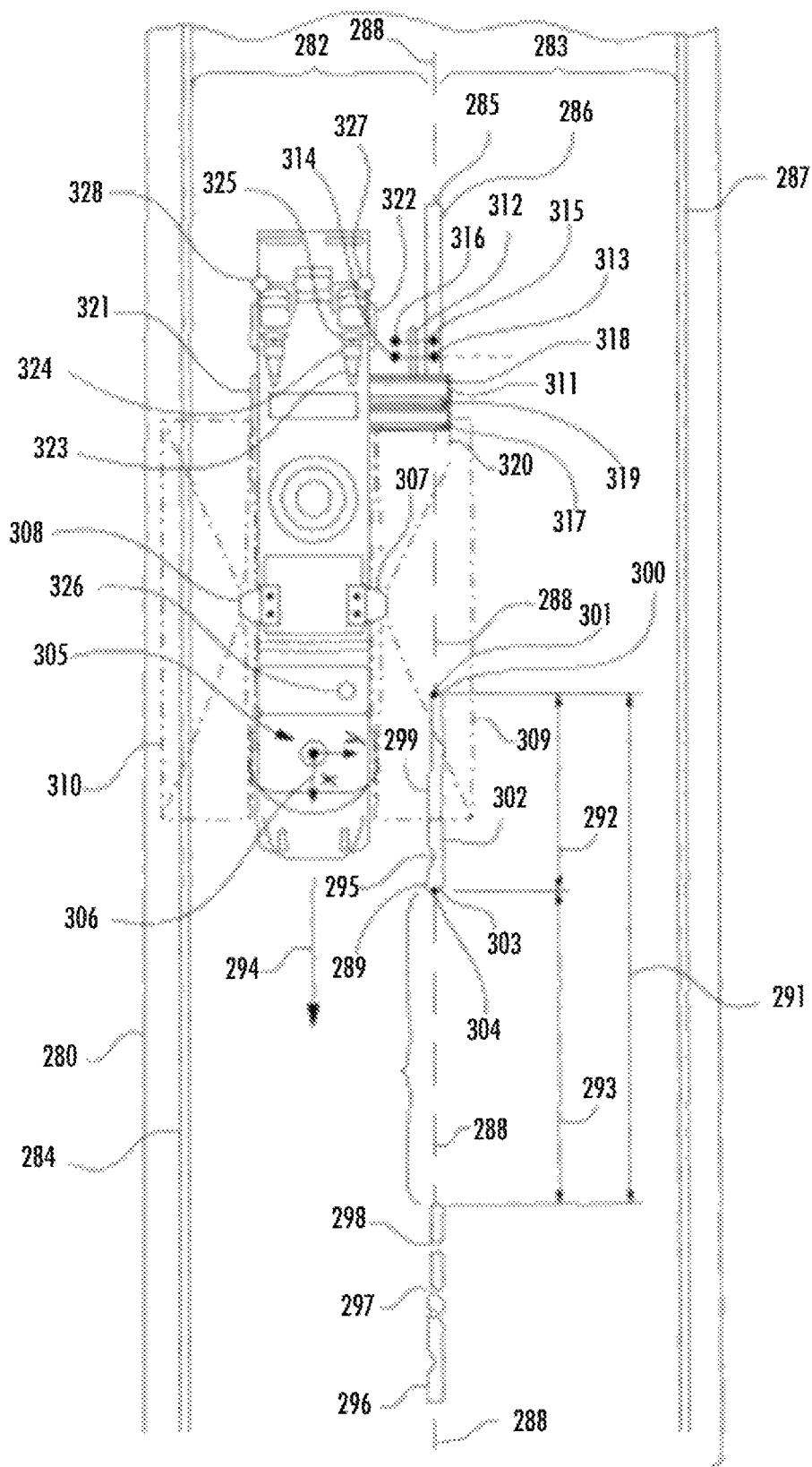
FIG. 27 is a diagrammatic plan view of a vehicle fitted with an apparatus according to an embodiment of the present invention and moving along a road having a center skip-line roadway mark pattern and roadway edge lines.

FIG. 27 shows a two-lane roadway 280 having roadway surface 281 and conventional right and left traffic lanes 282 and 283 respectively, as commonly referred to in the United States. The right lane 6 is defined by continuous edge line 284 and a conventional center skip line 285. The left lane 8 is defined by a continuous edge line 287 and the center skip line 285. The traffic lanes 282 and 283 could have vehicle traffic flow in the same or opposite directions. It is further understood that the invention can be practiced on multi-lane roadways.

The center skip line 285 usually follows the longitudinal directed roadway mark path 288 shown as a dashed line on the roadway surface 281, and the edge lines 284 and 287 are usually offset a given distance in the lateral direction from the longitudinal directed roadway mark path 288, and therefore substantially parallel to the center skip line 285. It is understood that the longitudinal roadway mark path 288 is not visible on the roadway surface 281 but only illustrates and indicates the longitudinal center line of the roadway 280. A single roadway mark would usually be placed in close proximity to the roadway mark path (roadway center) and a double roadway mark would typically straddle the center line of the roadway.

Usually the roadway lane edge lines 284 and 287 are continuous lines, but may have breaks or otherwise segments which are not marked. Roadway traffic exit lanes are good examples of where the edge lines 284 and 287 may have breaks or may otherwise not be parallel with the longitudinal directed roadway mark path 288. Likewise, the center skip line 285 could be single solid line, or a double solid line, or a combination of these or other lines.

The center skip line 285 includes a cyclic pattern of roadway line mark segment 289 followed by an unmarked gap segment 290. This cycle of the roadway line mark segment 289 and the unmarked gap segment 290 is repeated continuously on roadway surface 281 along the roadway mark path 288, but may change depending upon the roadway mark specifications. For example, the center skip line pattern may change to a solid single or double line or even a roadway mark comprising one solid line mark parallel to a skip line, such as a conventional roadway passing mark. The invention is not limited to the particular type of center or edge line patterns, and includes solid, single, and double line patterns, skip-line (dashed) patterns, other patterns, or various combinations of these and other line patterns.

The center skip line 285 has a cyclic length 291 with the roadway line mark segment 289 having a length 292 and gap segment 290 having a length 293. Skip line patterns may be noted as two numbers separated by a delimiter, the first number indicating the length 292 followed by the second number which indicates the length 291. For example, a 15/40 (the delimiter is the character '/') skip line pattern defines the length 292 of 15 feet and the length 291 of 40 feet, yielding a computed gap segment 290 length 292 of 25 feet. Many other skip line patterns exist and may include 10/40, etc.

A paint vehicle 305 having a right-handed Cartesian coordinate system 306 is further shown moving in a forward longitudinal direction 294 within the right traffic lane 282 and along the roadway mark path 288, restriping existing roadway mark line segments of the center skip line 285. It is understood that the term "vehicle" is given its broadest meaning, including any conveyance, motorized device, or moving piece of mechanical equipment for transporting passengers or apparatus. More specific and preferred examples of vehicles are trucks and road marking machines.

As indicated in FIG. 27, the roadway line mark segment 289 has a partially worn-away portion 295, while the following mark segment 296 has discontinuous breaks 297 and 298. Other mark segments may have a combination of worn away portions, breaks, or areas which have had their respective reflective elements removed from the surface of the roadway mark segment.

Restriping of the mark segments applies new roadway marking material substantially over each roadway mark segment and applies new roadway mark material (including reflective media (elements) if specified) especially over the worn away portion 295 of the mark segment 289 and the discontinuous breaks 297 and 298 of the following mark segment 296, thereby rehabilitating and maintaining the contrast visibility of the mark segments for a given skip line, or over an entire single or double line, or combination thereof.

However, striping newly constructed or newly paved roadway surfaces requires a predetermined or defined roadway mark path to reestablish the previous roadway marks in their original position on the new roadway surface. For example, if the roadway 280 was repaved, the center skip line 285 as well as the continuous edge lines 284 and 287 would not be visible (i.e., removing the roadway surface 281 also removes the roadway marks). If the GPS position of the roadway mark path 288 was previously determined, however, the center line of roadway 280 and its GPS position would be known and, knowing further the edge line offsets from the center line, the GPS positions of the continuous edge lines 284 and 287 could also be determined.

Roadway mark segments are usually characterized by rectangular shaped marks defined by near and far longitudinal edge lines, and beginning and ending lateral edge lines. For example, the roadway line mark segment 289 is substantially rectangular having a near longitudinal edge line 299 (i.e., the longitudinal edge line closest to the vehicle 305) and a far longitudinal edge line 302 (i.e., the longitudinal edge line farthest from the vehicle 305), and a beginning lateral edge line 300 (i.e., the first lateral edge line approached by the vehicle 305) and an ending lateral edge line 303 (i.e., the second lateral edge line approached by vehicle 305). The edge lines 299, 300, 302, and 303 form a rectangular shaped boundary of the roadway mark line segment 289. The lateral edge lines 300 and 303 define the beginning and ending lines, respectively, of the roadway mark line segment 289, and points 301 and 304 define the center points of the lateral edge lines 300 and 303, respectively, and are substantially located on the roadway mark path 288 (for a single line roadway mark).

Further shown in FIG. 27 are downwardly focused and enclosed imaging systems 307 and 308 mounted on the driver and passenger sides of the vehicle 305 respectively. The imaging system 307 is positioned on vehicle 305 to image area 309, and the imaging system 308 is positioned to image a similar area 310 on the passenger side of the vehicle 305. The enclosed imaging systems 307 and 308 may be identical or different.

Figure 29:
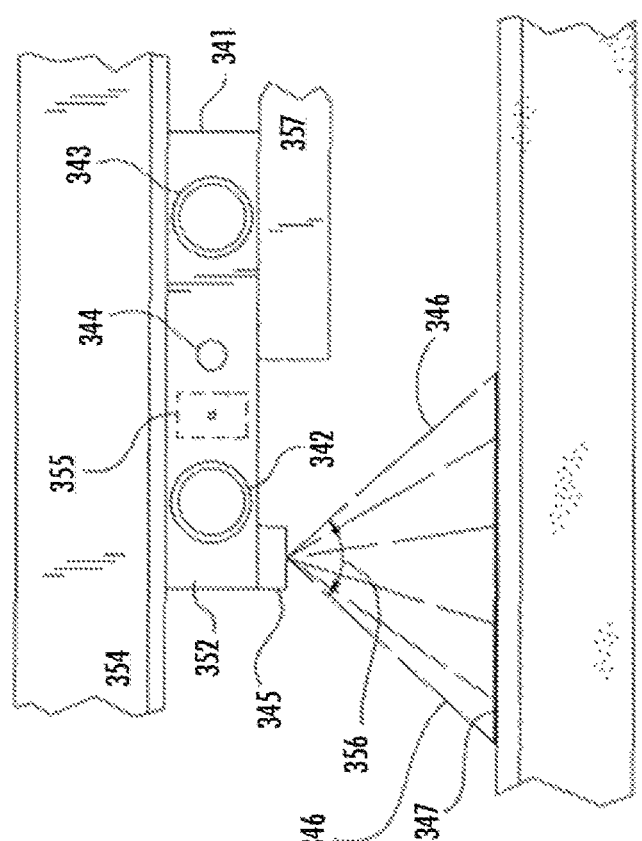
FIG. 29 is a side view of a paint carriage showing a laser line generator projecting a line onto a roadway surface in addition to a linear motion and position sensor mounted onto the frame of a vehicle.
Figure 28:
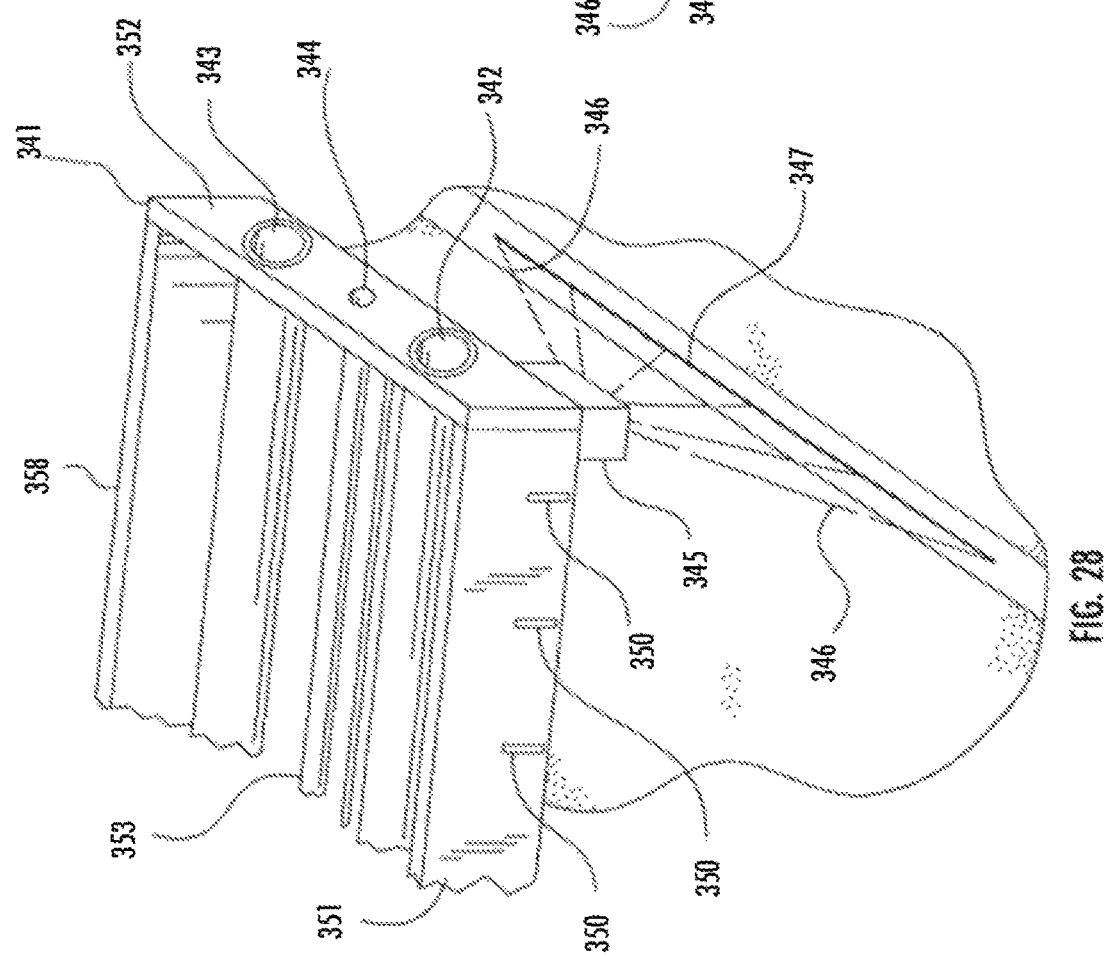
FIG. 28 is a perspective view of a paint carriage having a laser line generator mounted on the carriage frame and projecting a line onto a roadway surface and additionally showing the connection point of a linear motion and position sensor steel wire onto the carriage frame.

Referring now additionally to FIGS. 28 and 29, further attached to the paint carriage 311 are laterally extendable cylindrically shaped support arms 317 and 318. A hydraulic cylinder having a piston connected to a piston rod (not shown) may be attached to the frame of vehicle 305 and positioned between support arms 317 and 318. The distal end of the piston rod may be attached to the extendable end of paint carriage 311 at an attachment point 319. Hydraulically powering of the piston provides the necessary force to laterally extend or retract the carriage piston rod 353 (and therefore laterally extend or retract paint carriage 311) from or toward paint vehicle 305, thereby controlling the lateral positioning of paint nozzles 313 and 314 and respective bead nozzles 315 and 316 and their respective vertical projections over a desired roadway mark position.

Further shown in FIGS. 28 and 29 is a laser line generator 345 mounted underneath the frame of the paint carriage 311 (which includes front, side and rear frame members 351, 352 and 358, respectively) having a fanned pattern of laser light 346 downwardly focused onto, and intersecting with, the roadway surface 281 thereby producing a line pattern 320. The fanned pattern of laser light 346 is further characterized by a fan angle 356. The line generator 345 may also include infrared and ultra-violet lasers, or any other focusable electromagnetic radiation sources. The line pattern 320 is positioned such that it is within the driver side area 309 (as shown in FIG. 27) and may be imaged by driver side imaging system 307. The driver side imaging system 307 may then determine the lateral position of the paint carriage 311 (imaging system 307 has been previously corrected for lens and perspective distortion and is GPS calibrated). The driver side imaging system 307 is electromagnetically responsive to the laser line generator 345.

Thus, as the paint carriage 311 moves in a lateral direction inward and outward from the vehicle 305, the line pattern 320 also moves giving a visual indication (for a visible laser line generator) of the lateral position on the paint carriage 311. The lateral positions of the paint nozzles 313 and 314 and the reflective bead nozzles 315 and 316 (and their respective projections onto roadway surface 281) are therefore also visually indicated by the line pattern 320 taking into consideration any fixed offsets between the paint nozzles 313 and 314 and the reflective bead nozzles 315 and 316 and the line pattern 320. The laser generator 345 may also be moved laterally along the frame of the paint carriage 311 and positioned so that line pattern 320 is laterally aligned with one of the paint nozzles 313 and 314, for example the paint nozzle 313.

The laser line generator 345 may also be mounted to the frame 364 projecting the fanned pattern of laser light 346 first horizontally with respect to the roadway surface 281 and then being subsequently reflected downward by a mirror mounted on the paint carriage 311 again forming line pattern 320 with the roadway surface 281. The paint carriage 311 may further have reflective ruler markings 350 placed onto a front frame member 351 of the paint carriage 311, which may be imaged by the imaging system 307 and which then may also indicate the lateral position of the paint carriage 311. The lateral positions of the paint nozzles 313 and 314 and the bead nozzles 315 and 316 and their projections onto the roadway surface 281 may then be determined.

The laser line generator 345 may also include a laser pointer projecting a substantially circular 'spot' pattern onto the roadway surface 281 and within the driver side area 309 and may also be used to determine the lateral positions of the paint nozzles 313 and 314 and the reflective bead nozzles 315 and 316 and their projections onto the roadway surface 281 (offset corrected). Additionally, the laser line generator 345 may also include a cross hair producing optic which projects two perpendicular lines onto the roadway surface 281. The intersection of these lines produces a dot onto the roadway surface 281 within the driver side area 309.

A laterally moveable paint carriage 321 identical to the paint carriage 311 is attached to the passenger side of the vehicle 305 and is shown in a slightly extended position beyond the passenger's side of vehicle 305 in FIG. 27. The paint carriage 321 is located on the opposite side of the vehicle 305 and is identical to the paint carriage 311.

The driver side imaged area 309 includes the center skip line 285 (or any other center line which may include single or double solid, or combination of a skip and a solid line, or any combination thereof) with the vehicle 305 travelling anywhere within the right traffic lane 282. The passenger side area 310 includes the continuous edge line 284 with vehicle 305 travelling anywhere within right traffic lane 282. Both imaged areas 309 and 310 laterally extend past the full lateral extension of their respective paint carriages 311 and 321, and also image their respective line pattern 320 or the spot and carriage ruler markings.

For striping newly constructed or repaved or resurfaced roadway surfaces, the imaged areas 309 and 310 will only include their respective portions of the roadway surface 281 and laser lines or laser spot images and carriage ruler markings, which can be used to determine the absolute GPS location of the carriage as discussed below (offset corrected).

Further attached to the paint vehicle 305 is a real time kinematic (RTK) enabled global positioning system (GPS) including one or more GPS antennas, for example GPS antennas 326, 327 and 328, externally mounted onto the vehicle 305, and one or more GPS receiver modules, which may be internally mounted within the cab of vehicle 305.

The GPS antennas 326, 327 and 328 all receive satellite GPS signals and each is in communication with a GPS receiver.

The GPS antenna 326 is mounted on the forward driver's side of the vehicle 305, the antenna 327 is longitudinally aligned with the antenna 326 and is mounted on the rearward driver's side of the vehicle 305, and the antenna 328 is mounted on the rearward passenger's side of the vehicle 305 and the laterally opposite antenna 327.

The GPS antennas 326, 327 and 328 may form a vehicle Cartesian coordinate system which may include the Cartesian coordinate system 306 (accounting for offsets), or other vehicle-based coordinate systems (Cartesian or other coordinate systems) having different origins (again accounting for offsets). Other vehicle mounted GPS systems may be used to construct a local vehicle coordinate system, such as inertial navigation systems (INS) having one or more GPS antennas and corresponding receivers. One such system, for example, is the Spatial Dual INS manufactured by Advanced Navigation of New South Wales, Australia, having two GPS antennas and cooperating GPS receivers.

Referring to FIG. 30, the paint carriage 311 is shown extended and positioned over the roadway surface 281 which has been newly resurfaced/repaved having the outward positioned paint nozzle 313 and outward positioned reflective bead nozzle 315 laterally aligned with a virtual roadway mark outline 381 of pre-existing obliterated roadway mark line segment 289 (which has been removed from the new roadway surface 281 as the result of the repaving process). The virtual roadway mark outline 381 is not visible but has been recreated from roadway mark geographical location and characteristic data previously obtained either by manually laser tracing the pre-existing line or automatically imaging the pre-existing line. In either case, the GPS location of the roadway mark line has been previously determined.

Also shown is roadway mark path 288. As shown in FIG. 30, the virtual roadway mark outline 381 is centered along the roadway mark path 288. As previously stated, the virtual roadway mark outline 381 may include skip, solid or a combination of double lines, but is shown in FIG. 30 as a single roadway mark line for clarity. The laser line pattern 320 is positioned (offset adjusted) to align and position the outward positioned paint nozzle 313 and the outward positioned reflective bead nozzle 314, respectively, over the virtual roadway mark outline 381. Alternatively, the linear motion and position sensor 355 may be used to accurately determine the position of the paint carriage 311 and hence position of the outward positioned paint nozzle 313 and the outward positioned reflective bead nozzle 314, respectively (offset adjusted).

As the driver of the vehicle 305 proceeds along the roadway mark path 288, visible indicia (dots) 361 are dispensed upon the resurfaced/repaved roadway surface 281. The visible indicia 361 is a roadway line characteristic (similar to a solid or dashed line, but comprises dots) and may be later used as a visual guide by the operator of the vehicle 305 for manually placing the new roadway mark onto the roadway referenced to the roadway mark path 288. Alternatively, the actual roadway mark segment 289 may be duplicated using previously obtained roadway mark characteristic data such as skip line pattern etc. previously determined and stored in data memory along with the absolute GPS location of the roadway mark.

Figure 31:
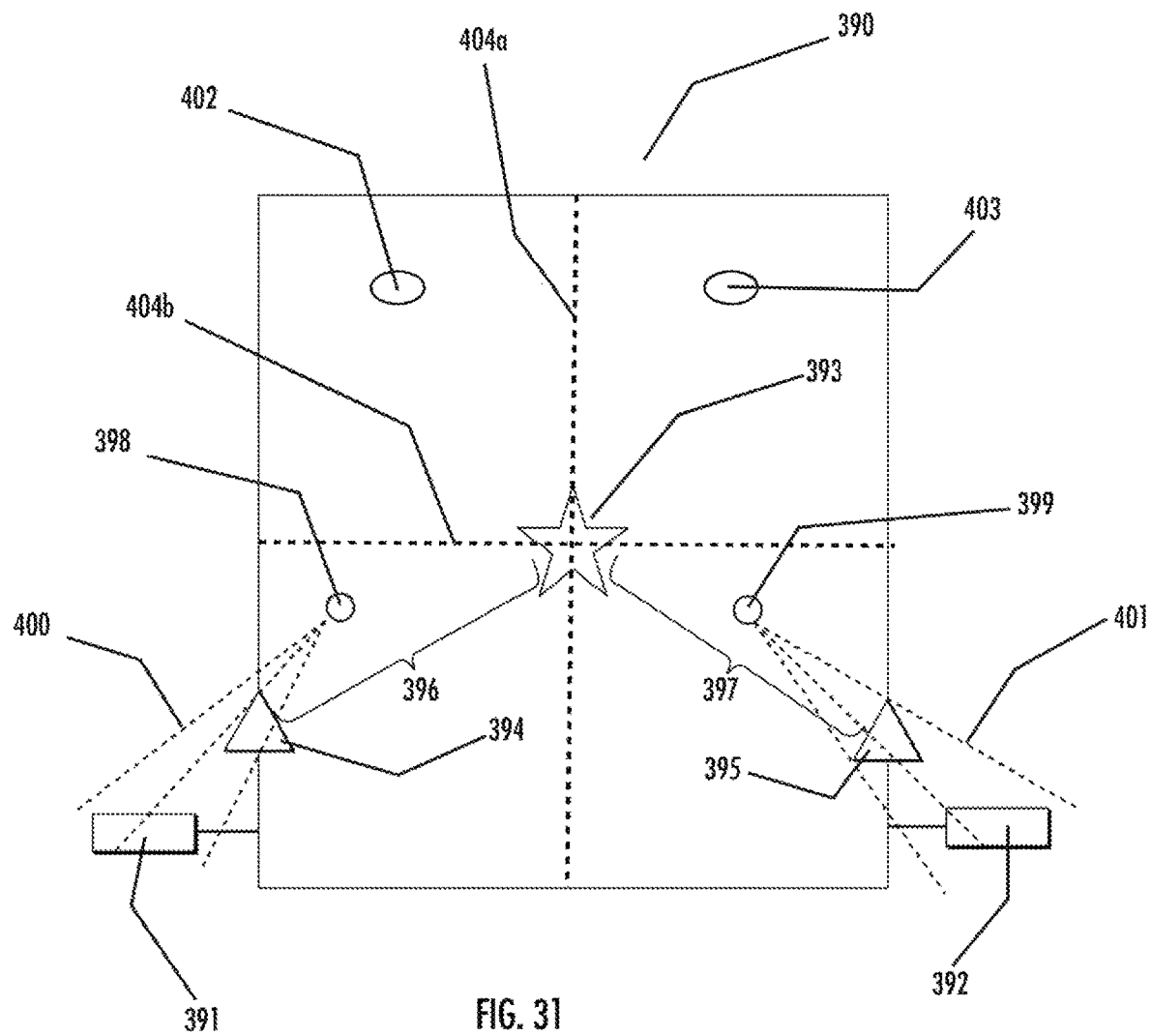
FIG. 31 is a representative schematic of a vehicle having attached mobile platforms, in which known fixed points and imagers may be used to calculate the location of a portion of a mobile platform.

FIG. 31 is a simplified schematic of an apparatus that may be used to practice the method for location of an object using offset as described herein. It will be understood by those skilled in the art that the various elements or components depicted in FIG. 31 may be in a variety of locations other than those illustrated or discussed herein while remaining within the scope of the present disclosure and claims, provided that their individual and relative locations enable the functionalities described herein.

As an overview, the apparatus may include a vehicle having a first fixed point and a second fixed point located at a known offset from the first fixed point. At least a first position sensor located on the vehicle and a second position sensor also located on the vehicle each provide location data to a first data collection system. The location data is used to calculate a first location representing the location of the first fixed point. A mobile platform is adjacent the vehicle, and an image sensor is located on the vehicle such that its field of view includes the second fixed point and at least a portion of the mobile platform. The image sensor provides image data to a second data collection system. The first location, the known offset between the first fixed point and the second fixed point, and the image data are then used to calculate the location of the portion of the first mobile platform, or of a desired specific feature or point on the portion of the mobile platform.

As shown for illustrative purposes only in FIG. 31, vehicle 390 is associated with first mobile platform 391 and second mobile platform 392. As shown, mobile platforms 391 and 392 are on opposite sides of vehicle 390 and near the lower end of the vehicle, but may be on the same side and may be located at any position along a side as desired. Also, first mobile platform 391 and second mobile platform 392 are shown as physically connected to vehicle 390 but either or both may instead be associated with a different vehicle, or may be autonomous, such as being a CAV or attached to a CAV.

First fixed point 393 is located on vehicle 390. As shown, first fixed point 393 is located on both the longitudinal midline 404a and the lateral midline 404b of vehicle 390, shown as dotted lines, but may be located at any position on vehicle 390 consistent with the operating principles described herein. In one embodiment, first fixed point 393 is located on about longitudinal midline 404a of vehicle 390, with "about" meaning within twenty-five percent of the overall width of vehicle 390 to either side of the longitudinal midline. For example, if the width of vehicle 390 is 8.5 feet, which is 102 inches, in this embodiment first fixed point 393 could be located at any point up to 25.5 inches to either side of longitudinal midline 404a. First fixed point 393 may further be located at any point above or below lateral midline 404b, up to and including the top or bottom edge of vehicle 390.

Second fixed point 394 is located on the left side of vehicle 390 as shown, and third fixed point 395 is located on the right side of vehicle 390 as shown. These second and third fixed points may also be located at any position on vehicle 390 consistent with the operating principles described herein, including at any position along the respective left and right sides of vehicle 390, and may be located inward of their respective sides rather than on them as shown for purposes of illustration. In one embodiment, second fixed point 394 is located on about the left edge of vehicle 390, with "about" meaning within twenty-five percent of the overall width of vehicle 390 from the left edge. For example, if the width of vehicle 390 is 8.5 feet, which is 102 inches, in this embodiment second fixed point 394 could be located at any point from being on the left edge, to being 25.5 inches to the right of the left edge. The same relationships may be applied to third fixed point 395 and the right edge of vehicle 390. However, these examples are illustrative only. and the fixed points on vehicle 390 may be located anywhere consistent with the principles of the method for location of an object using offset as described herein Second fixed point 394 has a first known offset 396 from first fixed point 393. Similarly, third fixed point 395, if present, has a second known offset 397 from first fixed point 393.

First image sensor 398 is positioned on vehicle 390 so that its field of view 400 includes second fixed point 394 and a portion of first mobile platform 391. Image data from first image sensor 398 is provided to a data collection system. The image data may be processed to determine the distance between second fixed point 394 and a selected point on, or area of, the portion of first mobile platform 391 that is within the field of view of first image sensor 398. The location of first fixed point 393, the first known offset 396 between first fixed point 393 and second fixed point 394, and the image data may be used to calculate the location of the selected point on or area of first mobile platform 391. The calculated (or "actual") location of the selected point on or area of first mobile platform 391 may then be compared to a desired location, which may be absolute coordinates (such as GPS coordinates) or a relative location in relation to the first fixed point and/or the second fixed point. If the difference between the actual location of the selected point on or area of first mobile platform 391 and the desired location exceeds a predetermined threshold, the position of either or both of the vehicle and the mobile platform may be adjusted to decrease the difference between the actual location and the desired location until that difference is equal to or less than the predetermined threshold.

Similarly, second image sensor 399 may be positioned on vehicle 390 so that its field of view 401 includes third fixed point 395 and a portion of second mobile platform 392. Image data from second image sensor 399 may be provided to a data collection system. The image data may be processed to determine the distance between third fixed point 395 and a point on or area of second mobile platform 392 that is within the field of view of second image sensor 399. The location of first fixed point 393, the second known offset 397 between first fixed point 393 and third fixed point 395, and the image data may be used to calculate the location of the selected point on or area of second mobile platform 391. The calculated (or "actual") location of the selected point on or area of second mobile platform 392 may then be compared to a desired location, which may be absolute coordinates (such as GPS coordinates) or a relative location in relation to the first fixed point and/or the third fixed point. If the difference between the actual location of the selected point on or area of second mobile platform 392 and the desired location exceeds a predetermined threshold, the position of either or both of the vehicle and the mobile platform may be adjusted to decrease the difference between the actual location and the desired location until that difference is equal to or less than the predetermined threshold.

The position of the vehicle, mobile platform, and/or portion of the mobile platform may be adjusted manually, as by a driver of the vehicle, who may be guided, for example, by streaming image data displaying the positions of the vehicle, mobile platform, portion of the mobile platform, and/or pavement on which the vehicle and/or mobile platform are located, or by a virtual display representing the positions of vehicle, mobile platform, portion of the mobile platform, and/or pavement on which the vehicle and/or mobile platform are located. The driver of the vehicle may be able to adjust the position of the mobile platform solely by adjusting the position of the vehicle, such as when the mobile platform is rigidly attached to the vehicle; and/or by adjusting the location of the mobile platform relative to the vehicle; and/or by adjusting the location of a portion of the mobile platform, such as a paint carriage or nozzle/nozzle assembly whose location relative to the main body of the mobile platform can be adjusted.

Alternatively, the position of the vehicle, mobile platform, and/or portion of the mobile platform may be adjusted automatically to decrease the difference between the actual location and the desired location, such as by using a feedback control loop. For example, the image data may be analyzed to calculate a difference in location between the second fixed point and the selected portion of the mobile platform represented in the image data; if that difference in location exceeds a predetermined threshold, an automated control system may be used to adjust the position of the selected portion of the mobile platform, the mobile platform, and/or the vehicle to change the difference in location; image data may again be analyzed to calculate a difference in location between the second fixed point and the selected portion of the mobile platform represented in the image data; that difference may again be compared to a predetermined threshold; and this cycle may be repeated as necessary until the difference in location is equal to or less than the predetermined threshold.

In referring to a "selected" portion of a mobile platform, it should be understood that the selected portion may be the entire portion of the mobile platform within the field of view of the imager; or, a smaller portion of the mobile platform, such as a paint carriage or nozzle assembly; or a point on the mobile platform, such as a material dispensing nozzle or an indicia on the platform, which may be a preexisting indicia such as a fastener or graphic mark or an indicia placed on the mobile platform specifically for capture by the imager, including but not limited to a ruled marking for distance measurement.

Figure 32:
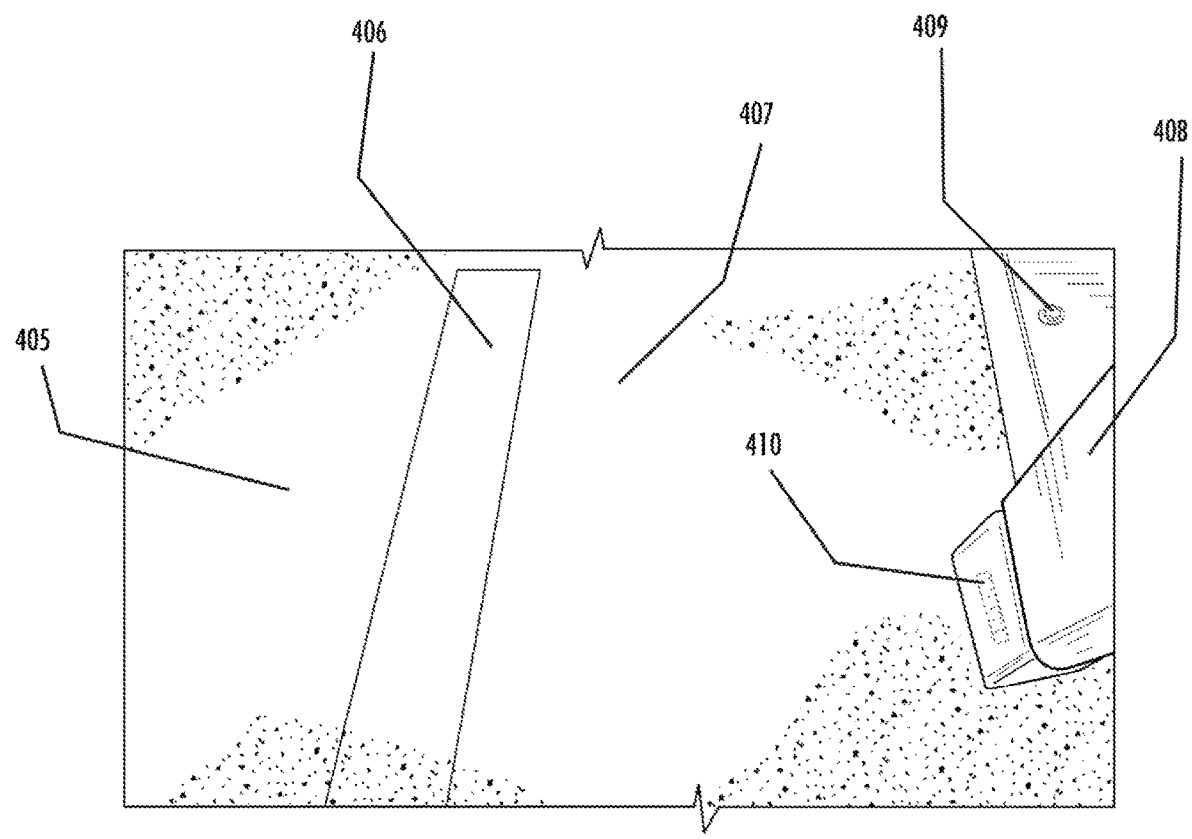
FIG. 32 is a representative view of a portion of a mobile platform located on a pavement surface, and a portion of a pavement surface bearing an actual or desired marking.

FIG. 32 is a representative view of a portion of a mobile platform on a pavement surface. Portion 408 of a mobile platform is shown as including selected portion 409 and reference marking 410. Selected portion 409 may be an integral part of the mobile platform, such as a rivet or other fastener or structural feature, or may be placed on the mobile platform for use in the present method. Reference marking 410 may be an indicium placed on the mobile platform for use in the present method, such as a ruled marking that can be used as a reference for measuring distances.

As noted above, FIG. 32 depicts a portion 408 of a mobile platform on a pavement surface. Shown for purposes of illustration only are a portion 405 of pavement surface that may represent a shoulder or lane of a roadway; marking 406; and pavement segment 407, which may represent another lane of a roadway. Marking 406 may be any marking used on pavement, including but not limited to roadways and runways, with common examples being such as an edge line marking the edge of a lane and a lane marking that marks the dividing line between two lanes of travel. The mobile platform may include a pavement surface modification module (not shown), which may extend over the area of road marking 406. The pavement surface modification module may be operable to deposit marking material on the pavement surface, such as paint and/or reflective beads; or to deposit cleaning material on the pavement surface, such as water or chemical cleaners; or to abrade the pavement surface, such as with high-pressure water jets or by bringing a grinding element into physical contact with the pavement surface.

Figure 33:
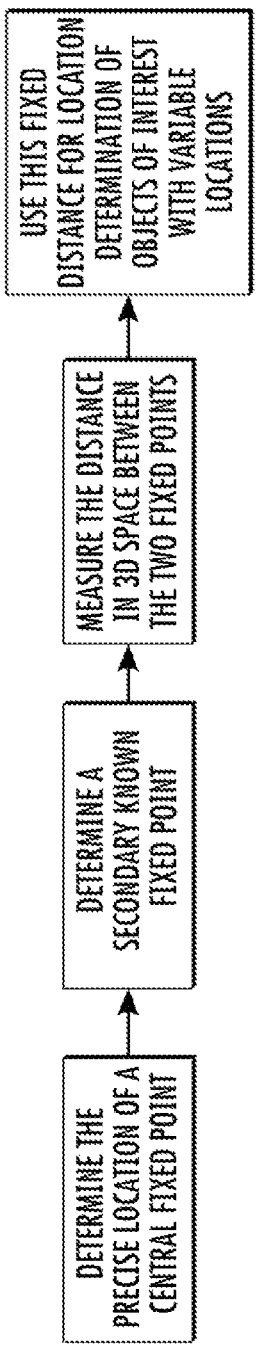
FIG. 33 is a representative flow chart showing a method for determining the location of objects of interest with variable locations.

FIG. 33 is a representative flow chart showing use of the present method to determine the location of an object of interest that may have a variable location, such as a mobile platform attached to or otherwise associated with a vehicle. First, the precise location of a central fixed point is determined; in this context, "central" may be relative to the edge of a vehicle bearing the central fixed point, and does not necessarily mean a fixed point located on the center of such a vehicle. Next, the location of a secondary known fixed point is determined. The distance in 3D space between the central fixed point and the secondary known fixed point is then measured, and this distance is used to determine the location of an object of interest that may have a variable location. By way of specific but non-limiting example, and in reference to FIG. 31, the central fixed point may be first fixed point 393; the secondary known fixed point may be secondary fixed point 394; and the distance in 3D space may be first known offset 396. Further, the objects of interest may be first mobile platform 391 or, with reference to FIG. 32, portion 408 of a mobile platform, a selected portion 409 of a mobile platform, or a reference marking 410 of a mobile platform.

Figure 34:
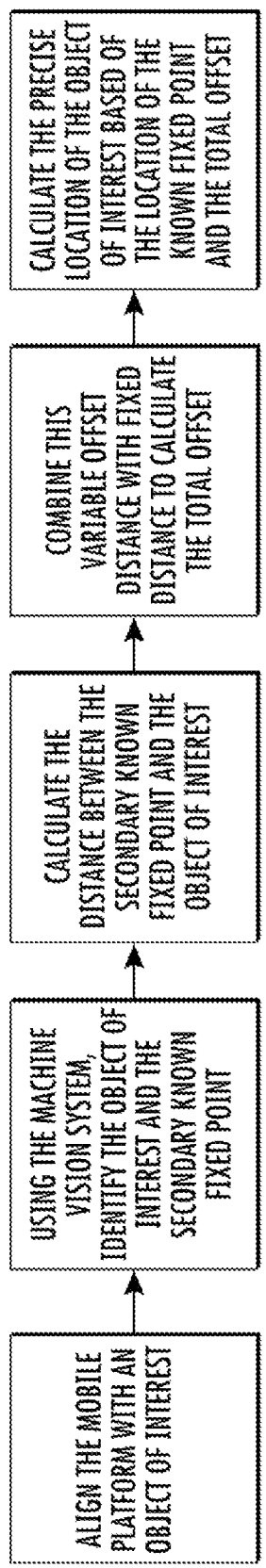
FIG. 34 is another representative flow chart showing a method for determining the location of objects of interest with variable locations.

FIG. 34 provides an illustrative flow chart showing use of the present method to calculate the precise location of an object of interest using, in part, the known offset between two fixed points. In the first step, a mobile platform is aligned with an object of interest as described herein. The object of interest may be, by way of example only, a pavement segment intended for marking, or a marked pavement segment intended for cleaning or removal of an existing marking. The object of interest may also be a pavement segment, marked or unmarked, from which data is to be collected. The data so collected may be used to plan modification of the pavement segment, such as marking or cleaning; or to calculate, using non-Euclidean geometry, a polynomial representation of a trajectory that can be used by a connected and autonomous vehicle in navigating the pavement segment.

After the mobile platform is aligned with the object of interest, a machine vision system is used to identify the object of interest, and a secondary (known) fixed point that is located on the vehicle. The machine vision system uses image data from an image sensor, also located on the vehicle, whose field of view includes the object of interest and the secondary fixed point. This information is used to calculate the distance between the secondary fixed point and the object of interest; because the vehicle and/or the object of interest may be moving relative to each other, that distance may be considered to be a variable offset. The vehicle also bears a first fixed point having a known, fixed offset from the secondary fixed point. The variable offset (between the object of interest and the secondary fixed point) and the fixed offset (between the secondary fixed point and the first fixed point) are used to calculate the total offset between the first fixed point and the object of interest. The precise location of the object of interest is then calculated using the location of at least one of the first fixed point and the secondary fixed point, and the total offset.

Figure 35:
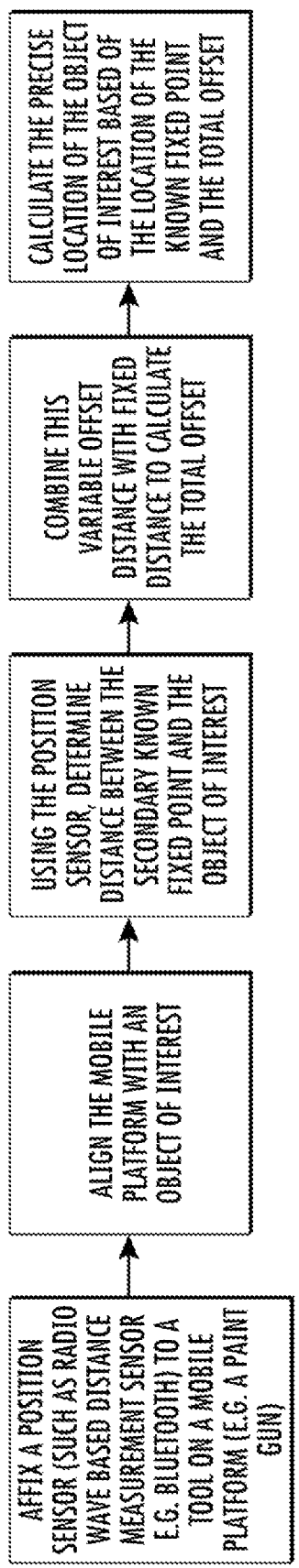
FIG. 35 is yet another representative flow chart showing a method for determining the location of objects of interest with variable locations.

FIG. 35 is another representative flow chart showing a use of the present method similar to that represented in FIG. 34, using position sensors. First a position sensor, such as a wireless position sensor, is affixed to a point on a mobile platform associated with a vehicle. Next, the mobile platform is aligned with an object of interest, as described elsewhere herein. The position sensor is then used to determine the distance between a secondary fixed point on the vehicle and the object of interest; because the vehicle and/or the object of interest may be moving relative to each other, that distance may be considered to be a variable offset. The vehicle also bears a first fixed point having a known, fixed offset from the secondary fixed point. The variable offset (between the object of interest and the secondary fixed point) and the fixed offset (between the secondary fixed point and the first fixed point) are used to calculate the total offset between the first fixed point and the object of interest. The precise location of the object of interest is then calculated using the location of at least one of the first fixed point and the secondary fixed point, and the total offset.

It may be seen that the embodiment illustrated in FIG. 35 is similar to that described in relation to FIG. 34, except that a wireless position sensor, rather than image data, is used to calculate the distance between a secondary fixed point on the vehicle and the object of interest. The position sensor may be, by way of non-limiting example, a radio wave-based distance/measurement sensor, such as Bluetooth. The position sensor may be affixed to any desired point on the mobile platform, including but not limited to a material dispensing nozzle assembly or an individual material dispending nozzle. The position sensor may also be placed at a known offset from a desired point on the mobile platform, and the known offset between the position sensor and the desired point on the mobile platform may be included in the calculation of the precise location of the object of interest.

While the present apparatus has been described with reference to particular embodiments, it will be understood by those skilled in the art that various changes may be made and equivalents may be substituted for elements thereof without departing from the intended scope. In addition, many modifications may be made to adapt a particular situation or material to these teachings without departing from the intended scope. In particular but without limitation, the present description has generally referred to pavement surfaces and environments such as roadways and runways; however, the processes and concepts disclosed herein may be applied in connection with other exterior and interior surfaces and environments, including but not limited to courts and fields used for sports, vehicle parking surfaces, roadway rest stops, and their respective environments.

Therefore, it is intended that the scope not be limited to the particular embodiments disclosed herein, but rather will include all embodiments falling within the scope and spirit of the appended claims.

The invention claimed is:

1. An apparatus comprising:
   (a) a vehicle comprising:
      i) a first position sensor configured to obtain and transmit first location data;
      ii) a first processor configured to receive first location data transmitted from said first position sensor;
      iii) non-volatile memory integrated with said first processor containing instructions executable by said first processor to calculate, from said first location data, a first location representing a first fixed point on said vehicle;
      iv) a first image sensor configured to transmit first image data and having a field of view that includes:
         A) a second fixed point which has a first known offset from the first fixed point, and
         B) a segment of a first pavement surface;
      v) a second processor configured to receive said first image data transmitted from said first image sensor;
      vi) non-volatile memory integrated with said second processor containing instructions executable by said second processor to calculate the location of the segment of the first pavement surface using the first location, the first known offset, and the first image data; and
(b) a first mobile platform located on the first pavement surface adjacent to said vehicle;
further wherein said first processor and said second processor may be the same or different.

2. The apparatus of claim 1 further comprising a second position sensor configured to obtain and transmit second location data, further wherein said processor is configured to receive second location data transmitted from said second position sensor.

3. The apparatus of claim 2 wherein said first position sensor is a Global Navigation Satellite System (GNSS) module and said second position sensor is a GNSS module, a real-time kinetic system, an inertial measurement unit, an inertial navigation system, a total station system, an accelerometer, or a gyroscope.

4. The apparatus of claim 1 wherein the second fixed point is on said vehicle.

5. The apparatus of claim 1 further comprising a transmitter operable to transmit the location of a first portion of said first mobile platform to non-transitory computer-readable storage media.

6. The apparatus of claim 3 where the first fixed point is located on the longitudinal midline of said vehicle and the second fixed point is located on an edge of said vehicle.

7. The apparatus of claim 1 further comprising:
(a) a second mobile platform located on a second pavement surface and adjacent to said vehicle;
(b) a second image sensor located on said vehicle, configured to transmit second image data and having a field of view that includes
  i) a third fixed point on said vehicle which has a second known offset from at least one of the first fixed point and the second fixed point, and
  ii) a segment of the second pavement surface;
(c) a third processor configured to receive second image data transmitted from said second image sensor;
(d) non-volatile memory integrated with said third processor containing instructions executable by said third processor to calculate the location of the segment of the second pavement surface using the first location, the second known offset, and the second image data.

8. The apparatus of claim 3 wherein at least one of said first mobile platform and said first portion of said first mobile platform is a pavement surface modification platform attached to said vehicle.

9. The apparatus of claim 8 wherein said pavement surface modification module is operable to perform at least one of
(a) placing paint on a pavement surface,
(b) placing reflective beads on a pavement surface,
(c) placing chemical cleaner on a pavement surface, and
(d) abrading a pavement surface.

10. The apparatus of claim 7 wherein said first mobile platform is a pavement surface modification platform which is attached to said vehicle, and said second mobile platform is a pavement segment alignment module which is attached to said vehicle; further wherein said first processor, said second processor, and said third processor are the same processor.

11. An apparatus comprising:
(a) a vehicle;
(b) a first mobile platform adjacent to said vehicle;
(c) a first image sensor, located on said vehicle, configured to transmit first image data and having a field of view that includes:
  i) at least a first portion of said first mobile platform, and
  ii) an object of interest located externally to both said vehicle and said first mobile platform;
(d) a first processor configured to receive first image data transmitted from said first image sensor;
(e) non-volatile memory integrated with said first processor containing instructions executable by said first processor to:
  i) calculate, from said first image data, the actual location of the object of interest in relation to the first portion of said first mobile platform;
  ii) compare the actual location of the object of interest in relation to the first portion of said first mobile platform to a desired location of the object of interest in relation to the first portion of said first mobile platform; and,
  iii) calculate the difference between the actual location and the desired location;
(f) a control system comprising at least one of a steering unit, a throttle, a brake unit, a sensor fusion algorithm, a computer vision system, a navigation system, a pathing system, and an obstacle avoidance system,
(g) said control system being configured, if the difference between the actual location and the desired location exceeds a predetermined threshold, to adjust the position of at least one of said vehicle and said first mobile platform to decrease the difference between the actual location and the desired location until that difference is equal to or less than the predetermined threshold.

12. The apparatus of claim 11 wherein said control system is a machine vision-based control system.

13. The apparatus of claim 11 further comprising a feedback control loop connected to a navigation system of at least one of said vehicle and said first mobile platform and operable to adjust the position of at least one of said vehicle and said first mobile platform to decrease the difference between the actual location and the desired location.

14. The apparatus of claim 13 wherein the desired location is represented by pre-determined GNSS coordinates.

15. The apparatus of claim 14 wherein said first mobile platform is attached to said vehicle, is located on a pavement surface, and comprises a pavement surface modification module which is operable to perform at least one of:
(a) placing paint on the pavement surface,
(b) placing reflective beads on the pavement surface,
(c) placing chemical cleaner on the pavement surface, and
(d) abrading the pavement surface,
further wherein the object of interest is a segment of the pavement surface.

16. The apparatus of claim 13 wherein the object of interest is a pavement segment, further comprising a second processor configured to use the actual location of the pavement segment to calculate, using non-Euclidean geometry, a polynomial representation of a trajectory that can be used by a connected and autonomous vehicle in navigating the pavement segment; further wherein said first processor and said second processor may be the same or different.

17. An apparatus comprising:
(a) a vehicle comprising a first position sensor configured to obtain and transmit first location data;
(b) a first processor configured to receive first location data transmitted from said first position sensor;

(c) non-volatile memory integrated with said first processor containing instructions executable by said first processor to calculate, from said first location data, a first location representing a first fixed point on said vehicle;
(d) a mobile platform adjacent to said vehicle;
(e) a second position sensor, configured to obtain and transmit second location data, located on said mobile platform and having a first known offset from a first selected portion of said mobile platform;
(f) a second processor configured to receive second location data transmitted from said second position sensor;
(g) non-volatile memory integrated with said second processor containing instructions executable by said second processor to calculate the location of the first selected portion of said mobile platform using the first location data, the second location data, and the first known offset;
further wherein said first processor and said second processor may be the same or different.

18. The apparatus of claim 17 wherein said first position sensor is a Global Navigation Satellite System (GNSS) module and said second position sensor is a (GNSS) module, a real-time kinetic system, an inertial measurement unit, an inertial navigation system, a total station system, an accelerometer, or a gyroscope.

19. The apparatus of claim 18 wherein said mobile platform is attached to said vehicle and comprises a pavement surface modification module operable to perform at least one of:
(a) placing paint on a pavement surface,
(b) placing reflective beads on a pavement surface,
(c) placing chemical cleaner on a pavement surface, and
(d) abrading a pavement surface.

20. The apparatus of claim 19 wherein further wherein said pavement surface modification module comprises a material dispensing nozzle operable to perform at least one of:
(a) placing paint on the pavement surface,
(b) placing reflective beads on the pavement surface,
(c) placing water on the pavement surface, and
(d) placing chemical cleaner on the pavement surface,
further wherein the first selected portion of said mobile platform is said material dispensing nozzle.

21. The apparatus of claim 18 wherein the first selected portion of said mobile platform is a pavement segment alignment module located on a pavement surface, further comprising:
(a) a third processor configured to calculate a location of a pavement segment of the pavement surface using the location of the pavement segment alignment module;
(b) a fourth processor configured to use the location of the pavement segment to calculate, using non-Euclidean geometry, a polynomial representation of a trajectory that can be used by a connected and autonomous vehicle in navigating the pavement segment; and,
(c) a transmitter to transmit at least one of the location of the pavement segment and the polynomial representation of a navigation trajectory to non-transitory computer-readable storage media;
further wherein said first, second, third, and fourth processor may be the same or different.

* * * * *